US012394548B2

(12) United States Patent
Ishida et al.

(10) Patent No.: US 12,394,548 B2
(45) Date of Patent: Aug. 19, 2025

(54) SOFT MAGNETIC POWDER AND INDUCTOR

(71) Applicant: Murata Manufacturing Co., Ltd., Kyoto-fu (JP)

(72) Inventors: Yuya Ishida, Nagaokakyo (JP); Koichi Ida, Nagaokakyo (JP); Tarou Kawaguchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 989 days.

(21) Appl. No.: 17/494,560

(22) Filed: Oct. 5, 2021

(65) Prior Publication Data

US 2022/0108818 A1 Apr. 7, 2022

(30) Foreign Application Priority Data

| | | |
|---|---|---|
| Oct. 5, 2020 | (JP) | 2020-168437 |
| Oct. 5, 2020 | (JP) | 2020-168442 |
| Oct. 5, 2020 | (JP) | 2020-168443 |
| Oct. 5, 2020 | (JP) | 2020-168444 |
| Oct. 5, 2020 | (JP) | 2020-168445 |
| Oct. 5, 2020 | (JP) | 2020-168446 |
| Oct. 5, 2020 | (JP) | 2020-168786 |
| Oct. 5, 2020 | (JP) | 2020-168787 |
| Dec. 1, 2020 | (JP) | 2020-199921 |
| May 31, 2021 | (JP) | 2021-091229 |

(51) Int. Cl.

| | |
|---|---|
| ***H01F 1/24*** | (2006.01) |
| ***H01F 1/14*** | (2006.01) |
| ***H01F 1/147*** | (2006.01) |
| ***H01F 27/28*** | (2006.01) |

(52) U.S. Cl.
CPC ........... *H01F 1/24* (2013.01); *H01F 1/14741* (2013.01); *H01F 27/2804* (2013.01)

(58) Field of Classification Search
CPC ..... H01F 1/24; H01F 1/14741; H01F 27/2804
See application file for complete search history.

(56) References Cited

U.S. PATENT DOCUMENTS

| | | | | |
|---|---|---|---|---|
| 2006/0118206 | A1* | 6/2006 | Sato | G11B 5/712 252/62.55 |
| 2020/0258667 | A1* | 8/2020 | Ikeda | C01B 33/14 |
| 2021/0142933 | A1* | 5/2021 | Herbert | C23C 4/11 |
| 2021/0183548 | A1 | 6/2021 | Ishida et al. | |
| 2021/0210259 | A1* | 7/2021 | Ye | H01F 27/255 |
| 2021/0257147 | A1* | 8/2021 | Misawa | H01F 1/24 |

FOREIGN PATENT DOCUMENTS

| | | | | |
|---|---|---|---|---|
| CA | 2990362 C | * 3/2020 | | B22F 1/00 |
| CN | 102132361 A | 7/2011 | | |
| CN | 102906865 A | 1/2013 | | |
| CN | 108699677 A | * 10/2018 | | C23C 14/06 |
| CN | 110178190 A | 8/2019 | | |
| WO | WO-2018131536 A1 | * 7/2018 | | B22F 1/102 |

* cited by examiner

*Primary Examiner* — Malcolm Barnes
(74) *Attorney, Agent, or Firm* — Studebaker Brackett PLLC

(57) ABSTRACT

A soft magnetic powder includes soft magnetic particles each having a nucleus that contains a soft magnetic metal and an insulating film on the surface of the nucleus. The insulating film contains Si and a hydrocarbon group having a C8 or longer linear-chain moiety, and the ratio by weight of Si to C in the insulating film is 7.6 or more and 42.8 or less (i.e., from 7.6 to 42.8).

16 Claims, 32 Drawing Sheets

| | | METALLURGICAL MICROSCOPE IMAGE | Sz (MAXIMUM HEIGHT) |
|---|---|---|---|
| LT PLANE | AFTER SHAPING |  | 25 μm |
| | AFTER GRINDING |  | 50 μm |
| WT PLANE | AFTER SHAPING |  | 28 μm |
| | AFTER GRINDING |  | 43 μm |

SOFT MAGNETIC POWDER AND INDUCTOR

CROSS-REFERENCE TO RELATED APPLICATIONS

This application claims benefit of priority to Japanese Patent Application No. 2020-168437, filed Oct. 5, 2020, to Japanese Patent Application No. 2020-168442, filed Oct. 5, 2020, to Japanese Patent Application No. 2020-168443, filed Oct. 5, 2020, to Japanese Patent Application No. 2020-168444, filed Oct. 5, 2020, to Japanese Patent Application No. 2020-168445, filed Oct. 5, 2020, to Japanese Patent Application No. 2020-168446, filed Oct. 5, 2020, to Japanese Patent Application No. 2020-168786, filed Oct. 5, 2020, to Japanese Patent Application No. 2020-168787, filed Oct. 5, 2020, to Japanese Patent Application No. 2020-199921, filed Dec. 1, 2020, and to Japanese Patent Application No. 2021-091229, filed May 31, 2021, the entire content of each is incorporated herein by reference.

BACKGROUND

Technical Field

The present disclosure relates to a soft magnetic powder and an inductor made therewith.

Background Art

Inductors (coil components) made with a magnetic metal material have been used in smartphones and many more kinds of electrical equipment. An example is chip inductors, which can be mounted on the surface of a circuit board. A known type of magnetic metal material used in chip inductors is a dust core, or body, formed by compression molding of a soft magnetic powder as a collection of particles of a soft magnetic metal with added resin.

International Publication No. 2018/131536 describes magnetic particles composed of very small cores (nuclei) made of a magnetic material and an insulating coating on the surface of the cores. The insulating coating is the product of a sol-gel reaction between an organic phosphoric acid having a C5 or longer hydrocarbon group and a metal alkoxide. Such magnetic particles have improved lubricity when shaped into a magnetic metal material by compression molding, and therefore pack densely in the magnetic metal material. As a result, the finished magnetic metal material has increased magnetic permeability.

Improving the lubricity of the magnetic particles, however, can affect the strength of the finished magnetic metal material because it means reducing the force of binding between the magnetic particles and the resin present therearound. This known type of magnetic particles, therefore, has room for improvement in terms of the balance between the magnetic permeability and mechanical strength of metal magnetic materials shaped therefrom.

SUMMARY

Accordingly, the present disclosure provides a soft magnetic powder that gives a magnetic metal material having sufficient mechanical strength and high magnetic permeability when shaped by compression molding.

According to preferred embodiments of the present disclosure, a soft magnetic powder includes soft magnetic particles each having a nucleus that contains a soft magnetic metal and an insulating film on a surface of the nucleus. The insulating film contains Si and a hydrocarbon group having a C8 or longer linear-chain moiety, and a ratio by weight of Si to C in the insulating film is 7.6 or more and 42.8 or less (i.e., from 7.6 to 42.8).

With the soft magnetic powder according to preferred embodiments of the present disclosure, a magnetic metal material shaped therefrom by compression molding can have high magnetic permeability with a limited loss of mechanical strength.

Other features, elements, characteristics and advantages of the present disclosure will become more apparent from the following detailed description of preferred embodiments of the present disclosure with reference to the attached drawings.

DETAILED DESCRIPTION

Overall Structure of the Inductor

Figure 1:
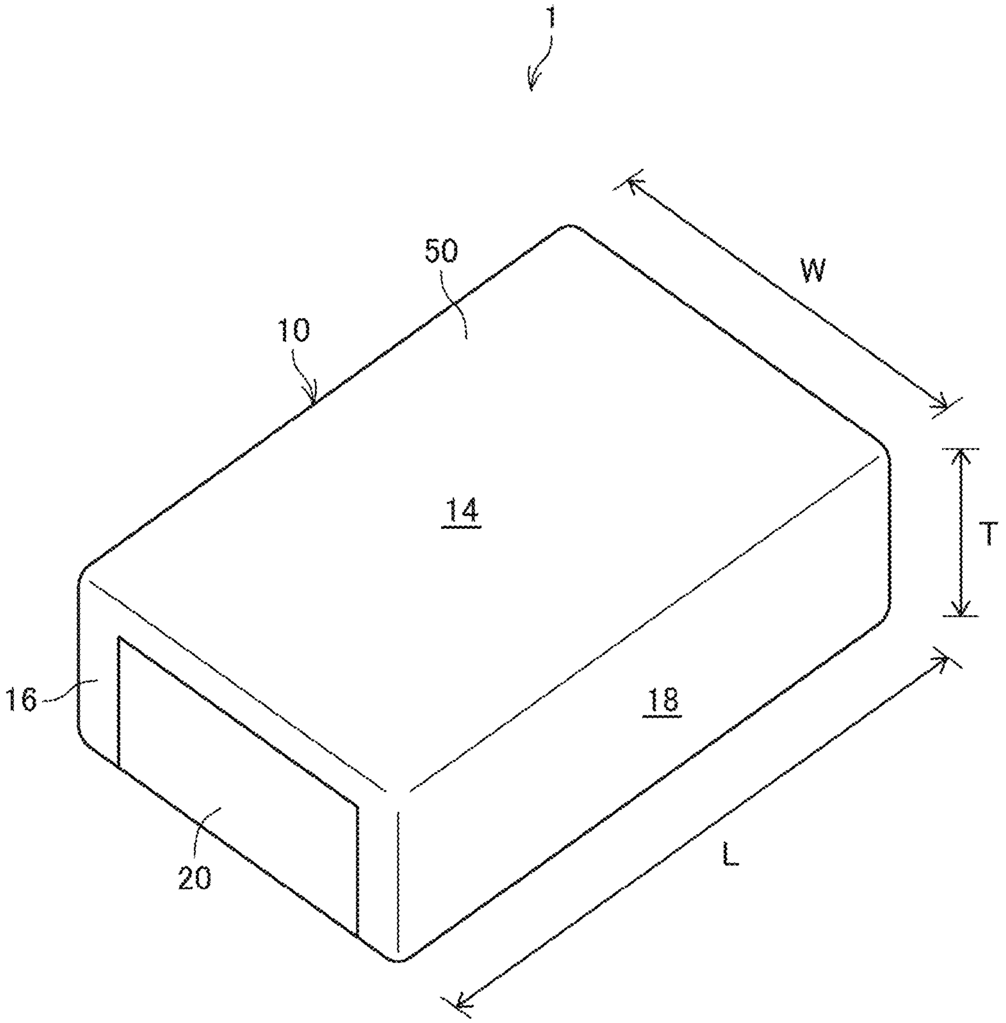
FIG. 1 is a diagram schematically illustrating the structure of an inductor according to an embodiment of the present disclosure, presenting a perspective view of the top side of the inductor.
Figure 2:
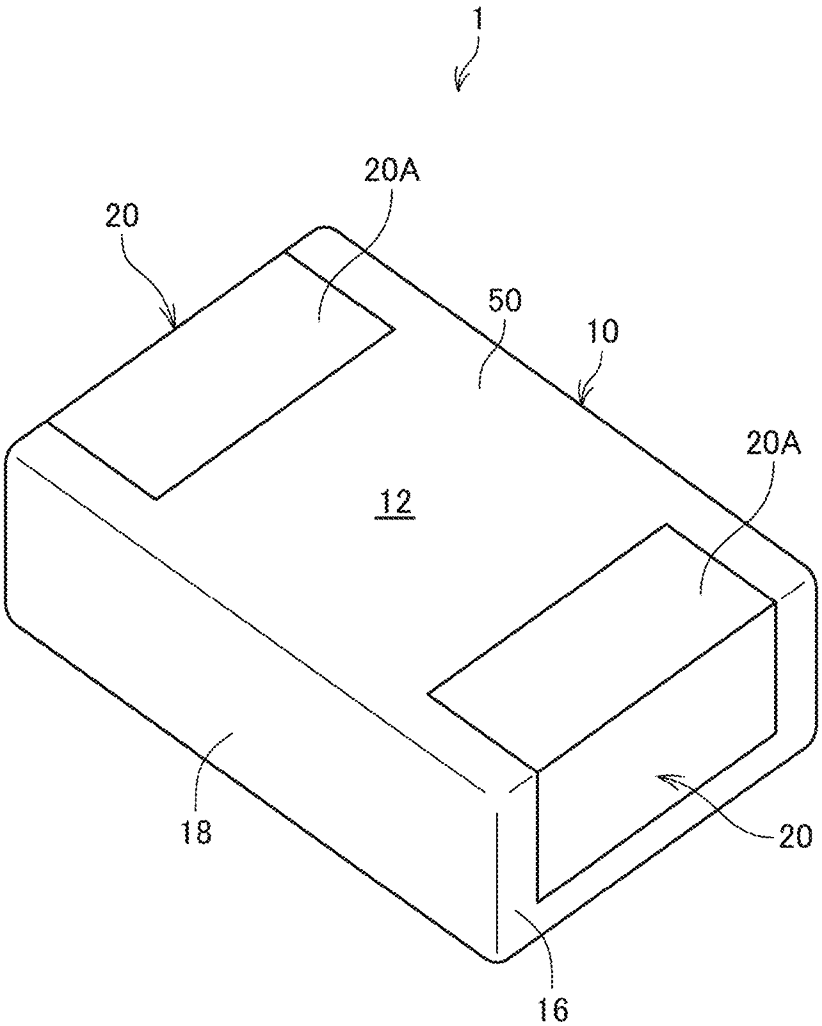
FIG. 2 is a diagram schematically illustrating the structure of the same inductor, presenting a perspective view of the mount surface side of the inductor.

FIGS. 1 and 2 are diagrams schematically illustrating the structure of an inductor 1 according to an embodiment. FIG. 1 is a perspective view of the top surface 14 side of the inductor 1, and FIG. 2 is a perspective view of the mount surface 12 side of the inductor 1.

Constructed as a surface-mount electronic component, the inductor 1 according to this embodiment has a substantially rectangular-parallelepiped body 10 and a pair of outer electrodes 20 on the surface of the body 10. One side of the body 10 is the mount surface 12 (FIG. 2), on which the body 10 is mounted on the surface of a circuit board (not illustrated). The body 10 is covered with a protective film 50 except where it has the outer electrodes 20 on.

The side of the body 10 opposite the mount surface 12 is the top surface 14 (FIG. 1). Of the four sides other than the mount surface 12 and the top surface 14, the pair of sides on which the body 10 has extensions 34 (described later) of a coil 30 are the first side surfaces 16, and the other pair are the second side surfaces 18. The first and second side surfaces 16 and 18 can also be described as the sides of the body 10 located radially around the wound section 32 of the coil 30 (described later). The mount surface 12 and the top surface 14, opposite each other, are also referred to as the primary sides.

As illustrated in FIG. 1, the distance from the mount surface 12 to the top surface 14 is defined as the thickness T of the body 10. The length of the short side of the top surface 14 is defined as the width W of the body 10, and the length of the long side of the top surface 14 is defined as the length L of the body 10.

Figure 3:
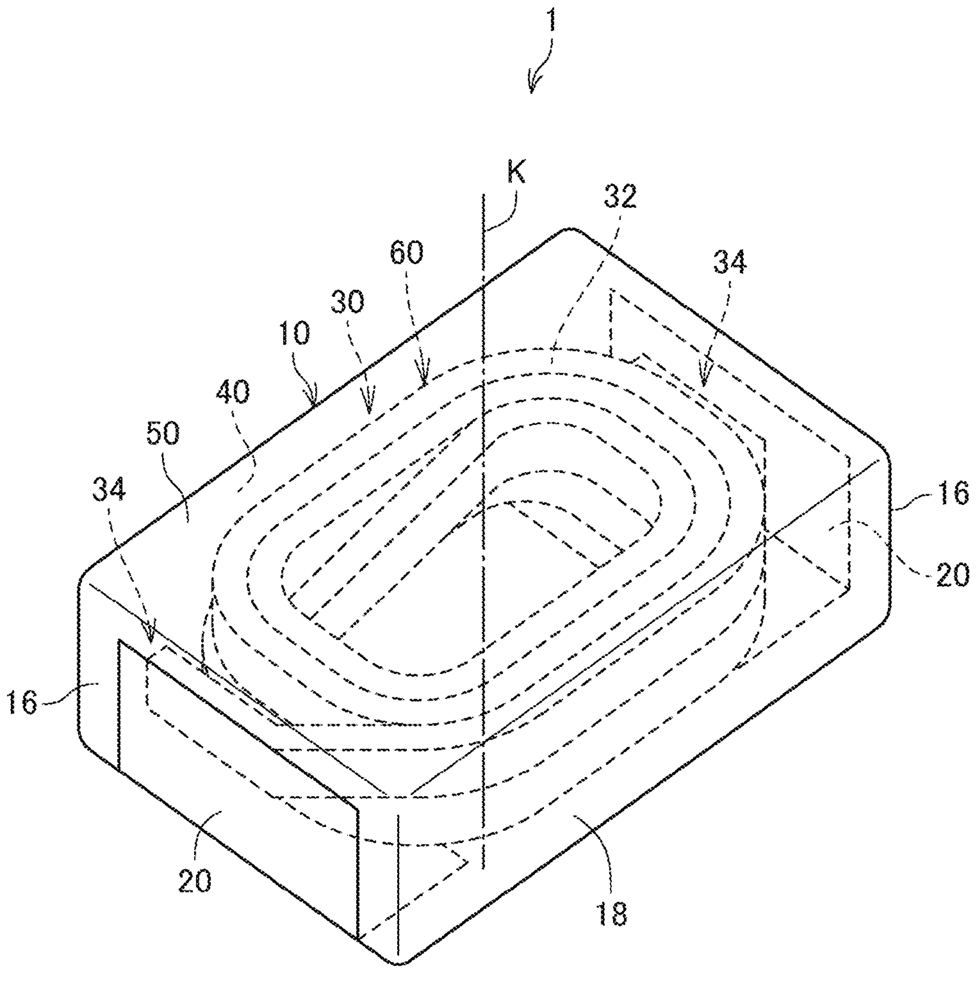
FIG. 3 is a perspective view of the internal structure of the same inductor.

FIG. 3 is a perspective view of the internal structure of the inductor 1 according to this embodiment.

The body 10 has a coil 30 and a core 40 in which the coil 30 is embedded; the body 10 is a magnetic component with a built-in coil, in which a coil 30 is built in a core 40.

The coil 30 is an air-core coil component, i.e., simply a coil of wire 31.

The core 40 is a substantially rectangular-parallelepiped article formed by shaping a mixture of soft magnetic powder and resins, or powder mix, by compression molding with the coil 30 therein.

The coil 30 has a wound section 32 formed by a length of wound wire 31 and a pair of extensions 34 from the wound section 32. The wound section 32 is formed by winding a length of wire 31 substantially into a spiral shape in such a manner that the wire 31 will have both of its ends outside and be continuous inside. Inside the body 10, the coil 30 is embedded in the core 40 with the central axis K of its wound section 32 parallel with the thickness T of the body 10. The extensions 34 extend from the wound section 32 to the pair of first side surfaces 16, one extension 34 to one side 16.

Figure 4:
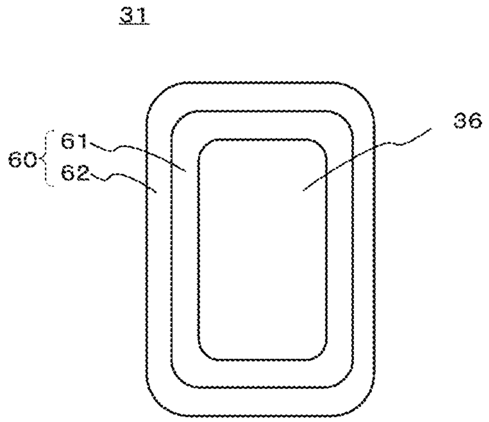
FIG. 4 is a cross-sectional view of a wire used for a coil, illustrating a cross-section perpendicular to the length.

FIG. 4 is a cross-sectional view of the wire 31 forming the coil 30, illustrating a cross-section perpendicular to the length. The wire 31 forming the coil 30 is composed of copper wire 36 and an insulating coating 60 that covers the copper wire 36. The insulating coating 60 has an electrically insulating coating layer 61 and a fuser layer 62 on the coating layer 61. In the formation of the coil 30, the wire 31 is heated while it is wound. The fuser layer 62 melts, fastening together the portions of the wire 31 forming the wound section 32. The wound section 32 of the finished coil 30, therefore, will not lose their shape easily. In addition, the insulating coating layer 61 provides reliable electrical insulation between the coil 30 and the core 40.

The pair of outer electrodes 20 are substantially L-shaped elements extending from the first side surfaces 16 of the body 10 to reach the mount surface 12, one electrode 20 from one side 16. Each of the outer electrodes 20 is coupled to one extension 34 of the coil 30 at one first side surface 16, and its portion 20A reaching the mount surface 12 (FIG. 2) is electrically coupled to wiring of a circuit board, for example by soldering.

An example of an inductor 1 having such a structure is a power inductor and is used as a choke coil, for example in a high-current DC-DC converter or power-supply circuit, in PCs, DVD players, digital cameras, TV sets, cellular phones, smartphones, automotive electronics, medical and industrial machinery, and other types of electronic equipment. These, however, are not the only possible applications of the inductor 1; it can be used in tuned circuits, filter circuits, rectifier/smoothing circuits, etc.

Overview of the Production of the Inductor

Figure 5:
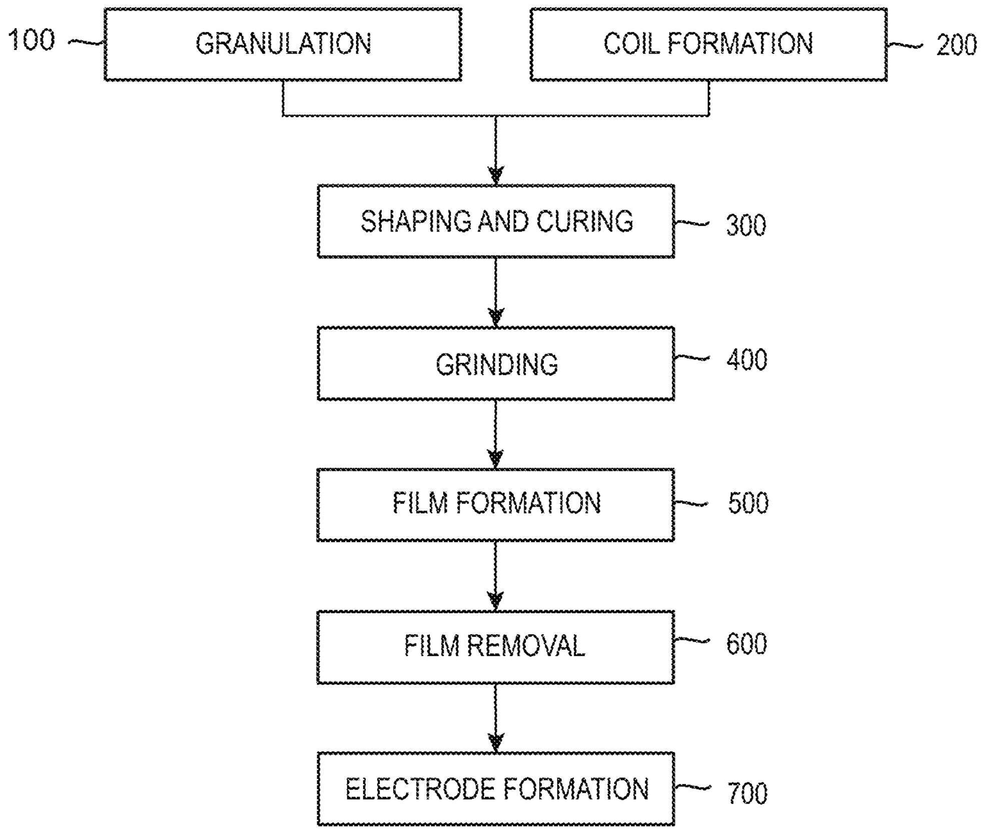
FIG. 5 is an outline of the production of an inductor.

FIG. 5 is an outline of the production of the inductor 1.

As illustrated, the production of the inductor 1 includes granulation (Step 100), coil formation (Step 200), shaping and curing (Step 300), grinding (Step 400), film formation (Step 500), film removal (Step 600), and electrode formation (Step 700).

First, a mixture of the soft magnetic powder and resins to be contained in the core 40 (hereinafter powder mix) is granulated (Step 100). The soft magnetic powder is a collection of particles having a surface coated with an insulating film.

Separately, a coil 30 is formed from a piece of wire 31 covered with an insulating coating 60. To ensure the resulting coil 30 will have the aforementioned wound section 32 and pair of extensions 34, the wire 31 is wound by the method called "α winding," a technique of winding in which the piece of wire 31, which will serve as a conductor, is wound substantially into a two-tier spiral shape in such a manner that the resulting coil 30 will have its starting and ending extensions 34 outside. The number of turns in the coil 30 is not critical. For example, the coil 30 may have about 6.5 turns.

Then an article that will later become the body 10 is shaped and cured.

The material for the shaped article is the granulated powder mix.

Prior to this, the powder mix is shaped into tablets (solids in a predetermined shape). Putting the tablets and the coil 30 into a cavity in a mold and pressing them with a punch while heating the cavity will give a shaped article with the coil 30 therein. The cured article is removed from the cavity and polished. Barrel polishing will give the article rounded corners.

Figure 6:
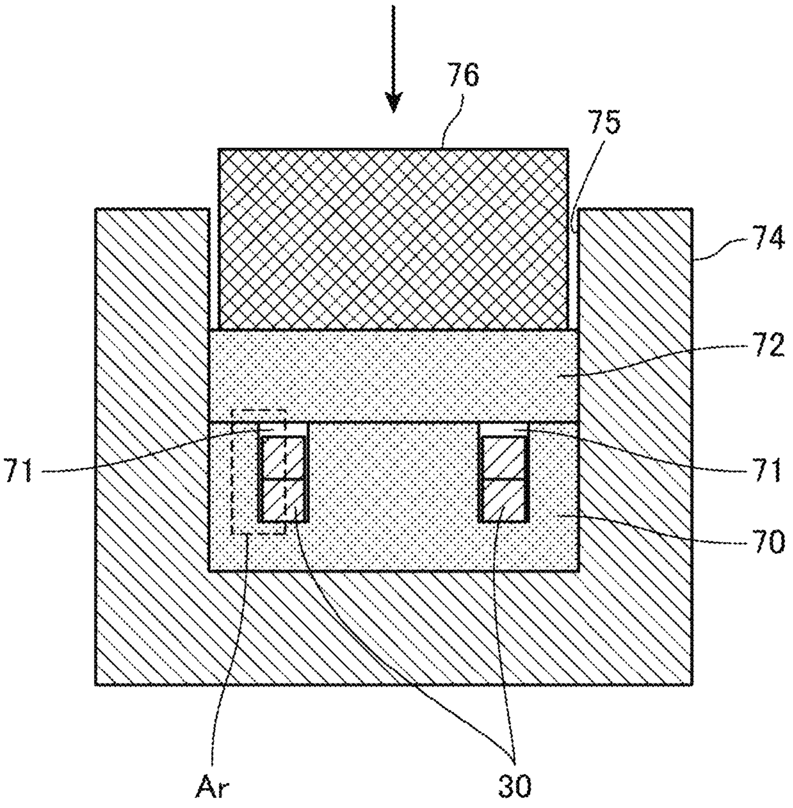
FIG. 6 is a diagram illustrating the shaping of a body from tablets of powder mix.

As illustrated in FIG. 6, two types of tablets are used: a first tablet 70 in an appropriate shape (e.g., substantially E-shaped) having a groove 71 for putting the coil 30 in, and a second tablet 72 in an appropriate shape (e.g., substantially I-shaped or flat-plate) that covers the groove 71 in the first tablet 70. In the compression molding, the first tablet 70 with the coil 30 slotted in the groove 71 and the second tablet 72 are stacked in the cavity 75 in the mold 74. The first and second tablets 70 and 72 are then heated and at the same time pressed with a punch 76 in the direction of stacking from the first tablet 70 or/and second tablet 72 side (in the example in FIG. 6, from the second tablet 72 side). This will combine the first tablet 70, coil 30, and second tablet 72 into a one-piece structure.

Alternatively, the granulated powder mix may be put directly into the cavity and shaped by compression molding.

Figure 7:
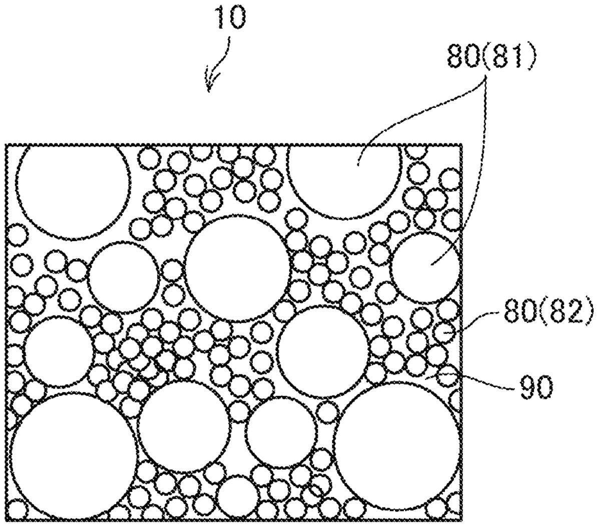
FIG. 7 is a schematic diagram illustrating the core of a shaped body.

Preferably, the pressure P for the compression molding is lower than usual so that the individual particles 80 forming the soft magnetic powder will not break but maintain their original shape in the shaped body 10 as illustrated in FIG. 7. This will limit damage to the insulating film on the surface of the individual particles 80 forming the soft magnetic powder, thereby limiting the associated lowering of the insulating performance (i.e., voltage resistance) of the film.

Preferably, the soft magnetic powder is a collection of two or more sets of particles 80 with different sizes as illustrated in FIG. 7 (in the example in FIG. 7, first soft magnetic particles 81 having a relatively large average diameter, or "larger particles," and second soft magnetic particles 82 having a relatively small average diameter, or "smaller particles"). Shaping such a soft magnetic powder by compression molding will give an article (body 10) densely packed with particles 80 of the powder because the smaller, second soft magnetic particles 82 penetrate between the larger, first soft magnetic particles 81 together with resin 90 as illustrated in FIG. 7 during the compression molding. Embodiments of the first and second soft magnetic particles 81 and 82 as a component of the core 40 will be described later.

Then the second side surfaces 18 of the article are scraped away (i.e., ground) with an abrasive to a predetermined width W.

This will trim the body 10 to a predetermined width W. The trimming will reduce the distances between the coil 30 inside the body 10 and the second side surfaces 18 (also referred to as the side gaps), thereby increasing the occupancy of the body 10 by the coil 30 in the radial direction with respect to the wound section 32 of the coil 30. Shaping (Step 300) the body 10 by compression molding and then grinding (Step 400) it to a predetermined size is advantageous over controlling the size of the body 10 by compression molding alone in terms of size variations between bodies 10.

Polishing (e.g., barrel polishing) may follow to round the corners of the second side surfaces 18 produced by the grinding.

The entire surface of the body 10, now ground to a predetermined size, is then covered with a protective film 50.

The material for the protective film 50 is a thermosetting resin, such as an epoxy, polyimide, or phenolic resin, or thermoplastic resin, such as a polyethylene or polyamide resin. A resin containing filler, such as silicon oxide or titanium oxide, may also be used.

The material for the protective film 50 is applied to the entire surface of the body 10, for example by coating or dipping, and the applied material is cured to form a protective film 50.

The body 10, now entirely covered with the protective film 50, is then irradiated with a laser to remove the protective film 50 from the areas in which the outer electrodes 20 will be formed (hereinafter also electrode areas; in this embodiment, predetermined areas of the first side surfaces 16 and mount surface 12) and also to remove the insulating coating 60 on the extensions 34 of the coil 30 exposed in the electrode areas.

After the laser-assisted removal of the insulating coating 60, etching may follow to clean the surface of the electrode areas.

Then outer electrodes 20 are formed (Step 200) by plating the electrode areas, from which the protective film 50 has been removed. The formation of the outer electrodes 20 may precede the formation of the protective film 50.

The outer electrodes 20 are formed by plating the soft magnetic powder and extensions 34 of the coil 30 exposed on the surface of the body 10 with a layer of copper (Cu).

On the copper (Cu) layer, nickel (Ni) and tin (Sn) plating layers may be stacked in this order. A layer of aluminum (Al), silver (Ag), gold (Au), or palladium (Pd) may be used instead of the layer of copper (Cu).

Outer electrodes formed by sputtering or sheets of electrically conductive resin or copper, for example, may also be used. The outer electrodes 20, furthermore, do not need to be substantially L-shaped as in the drawings; they may be so-called "five-side electrodes" or bottom electrodes.

An inductor 1 produced as described above is highly reliable and achieves good voltage resistance, magnetic permeability, saturation flux density, and characteristics under applied DC current. Its core 40 is better than that of known inductors in terms of specific resistance, the percentage of soft magnetic metal, etc., but at the same time has mechanical strength comparable to that of the core of known inductors.

The following describes embodiments and examples of inductors 1.

In each embodiment or example, the inductor 1 has dimensions of about 2.0 mm±about 0.2 mm in length L, about 1.2 mm±about 0.2 mm in width W, and about 0.7 mm±about 0.1 mm in thickness T and a withstand voltage of about 20 V unless specified otherwise.

The inductor 1 can be constructed using any of the configurations described in each of the following chapters, A-1-1. First Soft Magnetic Particles, A-1-2. Second Soft Magnetic Particles, A-2. Resins, B. Coil, C. Magnetic Paths, D. Grinding, and E. Protective Film, and can be made as any combination of such configurations.

A. Powder Mix

The powder mix used to form the core 40 contains soft magnetic powder and resins.

A-1. Soft Magnetic Powder

The soft magnetic powder in the powder mix is a collection of particles of a soft magnetic metal. The soft magnetic powder includes, for example, first soft magnetic particles

81 (larger particles) and second soft magnetic particles 82 (smaller particles), which have a smaller average diameter than the first soft magnetic particles 81. As mentioned herein, the average diameter of particles refers to the median diameter by volume.

The average diameter of the first soft magnetic particles 81 and that of the second soft magnetic particles 82 can be measured using a particle size analyzer before the particles 81 and 82 are mixed together. If they are measured in the core 40 shaped from the powder mix by compression molding, the measurement can be performed by analyzing an electron microscope image of a cross-section of soft magnetic particles obtained by polishing the core 40. For example, the equivalent circular diameter of the cross-section of each soft magnetic particle in the electron microscope image is determined, and then the volume of imaginary spheres having this equivalent circular diameter is determined. The median diameter in the distribution of volumes is the average diameter of the particles.

The average diameter of the first soft magnetic particles 81 is about 20 μm or more and about 28 μm or less (i.e., from about 20 μm to about 28 μm), preferably about 21.4 μm or more and about 27.4 μm or less (i.e., from about 21.4 μm to about 27.4 μm). The average diameter of the second soft magnetic particles 82 is about 1 μm or more and about 6 μm or less (i.e., from about 1 μm to about 6 μm), preferably about 1.5 μm or more and about 1.8 μm or less (i.e., from about 1.5 μm to about 1.8 μm). Using such a powder mix containing first and second soft magnetic particles 81 and 82 with different average diameters helps improve relative permeability. The first soft magnetic particles 81, having a larger average diameter, increases the saturation flux density, and therefore improves the characteristics under applied DC current, of the finished core 40. The second soft magnetic particles 82, which have a smaller average diameter, penetrate into the gaps between the first soft magnetic particles 81, thereby improving the packing of soft magnetic particles in the core 40.

The amount of the second soft magnetic particles 82 in the powder mix is about 15% by weight or more and about 30% by weight or less (i.e., from about 15% by weight to about 30% by weight), preferably about 20% by weight or more and about 30% by weight or less (i.e., from about 20% by weight to about 30% by weight), of the total weight of soft magnetic particles in the powder mix. When the amount of the second soft magnetic particles 82 in the soft magnetic powder is in any of these ranges, the packing of soft magnetic particles in the core 40 shaped from the powder mix is further improved.

The soft magnetic metal composition of the second soft magnetic particles 82 may be the same as that of the first soft magnetic particles 81, but preferably, the two sets of soft magnetic particles have different compositions and substantially equal hardness. The hardness of the first and second soft magnetic particles 81 and 82 can be measured by nanoindentation. The hardness of the first soft magnetic particles 81 is, for example, about 600 HV ($kgf/mm^2$) or more and about 1200 HV or less, desirably about 800 HV or more and about 1000 HV or less (i.e., from about 800 HV to about 1000 HV). The hardness of the second soft magnetic particles 82 is, for example, about 900 HV ($kgf/mm^2$) or more and about 1400 HV or less, desirably about 900 HV or more and about 1100 HV or less (i.e., from about 900 HV to about 1100 HV).

Desirably, the ratio of the hardness of the second soft magnetic particles 82 to that of the first soft magnetic particles 81 is about 0.7 or more and about 1.2 or less (i.e., from about 0.7 to about 1.2). This helps prevent the core 40 from losing its insulation resistance because this prevents the first or second soft magnetic particles 81, or 82, whichever has the lower hardness, from deforming when the powder mix is shaped into the core 40 by compression molding.

A-1-1. First Soft Magnetic Particles

A-1-1-1. Embodiment of the First Soft Magnetic Particles

Figure 8:
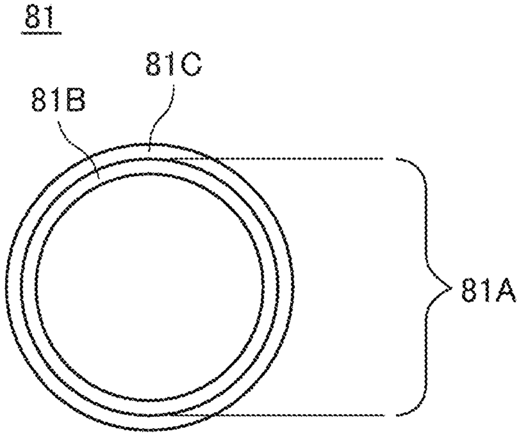
FIG. 8 is a diagram illustrating the structure of first soft magnetic particles as a component of powder mix.

FIG. 8 is a diagram illustrating the structure of the first soft magnetic particles 81. The first soft magnetic particles 81 are each composed of a nucleus 81A made of a soft magnetic metal and an insulating film 81C on the surface of the nucleus 81A. The nucleus 81A has an oxide film 81B produced by the oxidation of the soft magnetic metal forming the nucleus 81A on the surface of the nucleus 81A.

In order for the core 40 to withstand high voltages consistently, the insulating film 81C needs to be adhering to the underlying oxide film 81B firmly enough that it will not detach from the oxide film 81B. Once the insulating film 81C detaches from the oxide film 81B, a decrease in the insulation resistance of the core 40 will affect the voltage resistance of the inductor. When the oxide film 81B forms, however, the nucleus 81A loses some amount of soft magnetic metal therein, and the core 40 will have reduced relative permeability because of the use of such nuclei 81A. In view of relative permeability, therefore, it is preferred that the oxide film 81B be as thin as possible.

The inventors have found that when the nuclei 81A are made of a Cr-containing soft magnetic metal, the oxide film 81B that forms on their surface tend to be thin and smooth, and this can prevent the insulating film 81C from adhering to the oxide film 81B firmly enough. A possible solution reached is to limit the Cr content of the nuclei 81A and at the same time select the thickness of the oxide film 81B that forms on the surface of the nuclei 81A within a particular range. This enables firm adhesion of the insulating film 81C to the oxide film 81B to be combined with limited loss of the relative permeability of the core 40 made using the nuclei 81A.

Specifically, an iron-based soft magnetic metal containing about 1.5% by weight or less Cr is used as the soft magnetic metal forming the nuclei 81A. Setting the Cr content in this range helps strengthen the adhesion between the insulating film 81C and the oxide film 81B. In that case the nuclei 81A have high relative permeability by virtue of high iron content, and also form uneven passivation film on their surface. The uneven passivation film makes the oxide film 81B nonuniform, thereby increasing the area of contact between the oxide film 81B and the insulating film 81C.

The nuclei 81A may be particles of a Cr-free (containing no Cr) iron-based soft magnetic metal. As mentioned herein, being Cr-free means the material is substantially free of Cr; the material may contain Cr, but its amount is very small, as small as that of a potential contaminant from the environment in which the nuclei 81A are produced (e.g., about 500 ppm or less).

More specifically, the nuclei 81A are particles of an Fe—Si—Cr alloy containing Cr in the above range or Fe—Si alloy in amorphous (non-crystalline) or crystalline magnetic metal form. The Fe—Si—Cr or Fe—Si alloy contains, for example, about 87% by weight or more Fe and about 3% by weight or more Si, optionally with B (boron).

The nuclei 81A of the first soft magnetic particles 81, however, do not need to be particles of such an Fe—Si—Cr or Fe—Si alloy; they only need to be made with an iron-based soft magnetic metal. An example of another iron-based soft magnetic metal is an amorphous or crystalline Fe—Si—Cr—Al alloy containing Cr in the above range or an amorphous or crystalline Fe—Si—Al alloy.

Using particles of a Cr-free alloy as the nuclei 81A of the first soft magnetic particles 81 helps give the inductor better characteristics under applied DC current. The increased ratio by weight of Fe in the nuclei 81A further increases the saturation flux density of the core 40 made using the nuclei 81A.

The oxide film 81B can be formed through the oxidation of the soft magnetic metal present on the surface of the nuclei 81A during the production of the nuclei 81A. For example, the oxide film 81B can be formed when the nuclei 81A are exposed to water or an oxygen atmosphere during their production and/or by active oxidation, such as exposing the nuclei 81A to a hot oxygen atmosphere.

The oxide film 81B becomes thicker as the soft magnetic metal on the surface of the nuclei 81A is oxidized. The roughness of its surface increases at the same time, and the adhesion between the oxide film 81B and the insulating film 81C formed thereon becomes stronger accordingly. As the oxide film 81B becomes thicker with advancing oxidation of the soft magnetic metal, however, the metal content of the nuclei 81A decreases, affecting the relative permeability of the core 40 made using the nuclei 81A. To ensure that the insulating film 81C will adhere firmly with limited loss of relative permeability, it is desirable that the oxygen content of the nuclei 81A be about 900 ppm or more and about 2800 ppm or less (i.e., from about 900 ppm to about 2800 ppm).

The insulating film 81C formed on the oxide film 81B is, for example, an inorganic glass coating formed by mechanochemistry, such as a coating of phosphate glass, e.g., zinc phosphate or manganese phosphate, or a coating of glass. Alternatively, the insulating film 81C may be an organic polymer coating, an organic-inorganic hybrid coating, or an inorganic electrically insulating coating. Such an insulating film 81C can be formed by mechanochemistry, sol-gel reaction of a metal alkoxide, or any other process selected according to the material used.

The thickness of the insulating film 81C is about 10 nm or more and about 50 nm or less (i.e., from about 10 nm to about 50 nm). Setting the thickness of the insulating film 81C about 10 nm or more helps increase the resistivity of the first soft magnetic particles 81. Setting the thickness of the insulating film 81C about 50 nm or less will ensure a high percentage of metal in the first soft magnetic particles 81, thereby helping give good magnetic properties to the core 40 made using them.

First soft magnetic particles 81 configured as described above allow the core 40 to withstand high voltages consistently by virtue of sufficiently firm adhesion of the insulating film 81C formed on the oxide film 81B on their nuclei 81A, although the relative permeability of the core 40 remains high.

A-1-1-2. Production of the First Soft Magnetic Particles

The following describes the production of first soft magnetic particles 81 according to an embodiment of the present disclosure. The following is merely an example and is not the only method for producing first soft magnetic particles 81 according to an embodiment of the disclosure.

The nuclei 81A of the first soft magnetic particles 81 are obtained by, for example, gas atomization. That is, the metals from which the nuclei 81A will be made are melted in an electric induction furnace, and the resulting molten metal is sprayed through a nozzle with a jet of inert argon gas to give fine particles of the metals. After being cooled in water and dried, these fine particles are used as the nuclei 81A of the first soft magnetic particles 81. The average diameter of the nuclei 81A can be controlled by, for example, adjusting the velocity of the jet stream of argon gas and/or the diameter of the nozzle used to spray the molten metal in the gas atomization.

If, for example, nuclei 81A having an average diameter of about 20 μm or more are formed as particles of an amorphous metal, a possible option is the SWAP (spinning water atomization process), in which the fine particles of metals formed from molten metal are cooled rapidly in water spinning at a high speed.

The nuclei 81A are exposed to water and/or an oxygen atmosphere in the water cooling and the subsequent drying, forming an oxide film 81B on their surface. The oxide film 81B can be formed to a desired thickness by controlling the duration of the exposure to water or an oxygen atmosphere and/or the oxygen concentration of the environment in which the nuclei 81A are produced. Exposing the dried nuclei 81A to a hot oxygen atmosphere will further grow the oxide film 81B on the surface of the nuclei 81A. Here, it would be fair to assume that the formation of the oxide film 81B will make no substantial change in the average diameter of the nuclei 81A. The same also applies to the formation of the insulating film 81C, which will be described later.

The oxide film 81B formed on the surface of the nuclei 81A, furthermore, does not need to be uniform in terms of the distribution of metal oxide(s) therein. For example, if the metal or metals forming the nuclei 81A can form multiple oxides, the distribution of the oxides inside the oxide film 81B may be imbalanced, or the oxide film 81B may be formed by multiple layers of different oxides.

Then an insulating film 81C is formed on the oxide film 81B formed on the nuclei 81A. The insulating film 81C is, for example, a film of phosphate glass formed by mechanochemistry.

A-1-1-3. Examples of First Soft Magnetic Particles

Twenty-seven samples (samples A1-01 to A1-27) differing in the Cr content of the nuclei 81A and the thickness of the oxide film 81B on the surface of the nuclei 81A were prepared and characterized. A summary of the particles of samples A1-01 to A1-27 is presented in Table 1 along with characterization results. Samples A1-03 to A1-08, A1-12 to A1-16, and A1-20 to A1-24 are examples of first soft magnetic particles 81 according to an embodiment of the present disclosure.

The following describes the individual samples.

Sample A1-01

Production of Nuclei

For use as the nuclei 81A, fine particles of amorphous Fe—Si alloy containing no Cr (Cr-free) were prepared by the aforementioned SWAP. The Fe and Si contents of the nuclei 81A were 93% by weight and 3.5% by weight, respectively. The nuclei 81A also contained 3% by weight B, and the rest was C. The average thickness of the oxide film 81B, produced by surface oxidation of the nuclei 81A, was 5 nm. The hardness of the nuclei 81A was 953 HV.

The Fe and Si contents were measured by ICP-OES (spark optical emission spectrometry). The hardness of the nuclei 81A was measured by nanoindentation.

Formation of Insulating Film

On the surface of the nuclei 81A (with the oxide film 81B thereon), an insulating film 81C of zinc phosphate, which is a type of phosphate glass, was formed by mechanochemistry. The resulting soft magnetic particles covered with the insulating film 81C were used as sample A1-01 of first soft magnetic particles 81. The final thickness of the insulating film 81C was 23 nm.

The average (median) diameter of the first soft magnetic particles 81 was 25.3 μm.

The average diameter was measured using a particle size analyzer.

The average thickness of the oxide film 81B was measured as follows. In a broad sense, the average thickness of the oxide film 81B represents the average of the thickness of the oxide film 81B measured at multiple points in a cross-section of the nuclei 81A. In a narrow sense, it represents the value derived by the following procedure. First, one nucleus 81A was sliced with a focused ion beam (FIB). The slice could be cut from any point of the nucleus 81A. With an electron microscope (TEM) set to a magnification of ×100,000, the cross-section of the nucleus 81A was imaged at three regularly spaced points on the outer circumference for three fields of view. On each TEM image, the thickness of the oxide film 81B was measured at four regularly spaced points. This was repeated for three nuclei 81A, and the average of all thickness measurements (three fields of view× four points×three nuclei=36 measurements) was reported as the average thickness. The thickness of the insulating film 81C was also measured in the same way.

Oxide Film Unevenness and Oxygen Content

The difference between the largest and smallest thickness of the oxide film 81B in a cross-section of the nuclei 81A (hereinafter also referred to as the thickness gap of the oxide film 81B) was determined as a measure of the unevenness of the oxide film 81B. The difference between the largest and smallest thickness of the oxide film 81B was measured as follows. First, one nucleus 81A was sliced with a focused ion beam (FIB). The slice could be cut from any point of the nucleus 81A. With an electron microscope (TEM) set to a magnification of ×100,000, the cross-section of the nucleus 81A was observed along its outer circumference and imaged at three points where the oxide film 81B looked thin and three points where the oxide film 81B looked thick for three fields of view. On each TEM image, the largest and smallest thickness measurements were determined. The largest and smallest measurements across the three fields of view were reported as the largest thickness and the smallest thickness, respectively. The result is presented in Table 1.

In addition, as a potential indicator of the amount of oxide film 81B on the surface of the nuclei 81A after the formation of the insulating film 81C, the oxygen content of sample A1-01 was studied by measuring the amount of oxygen in one gram of the soft magnetic particles by inert gas fusion. The result is presented in Table 1.

Strength of the Adhesion of the Insulating Film

The strength of the adhesion of the insulating film 81C on the soft magnetic particles was evaluated as follows using a powder resistivity meter (Hiresta). First, a 10-g powder as a collection of the soft magnetic particles was put into a measuring cylinder (having an electrically insulating wall and an earthed metal bottom) that came with the resistivity meter. The top of the powder in the cylinder was covered with a top plate, which was a metal plate having the same diameter as the cylinder. A voltage was applied across the bottom and top plates, and a load was applied to the top plate in the direction from it to the bottom plate. The electrical current that flowed between the top and bottom plates was monitored while the load was increased. The load at which the current exceeded a predetermined threshold (in the unit of MPa [megapascals]) was reported as a measure of the strength of the adhesion of the insulating film 81C. The result was graded with ⊙, ○, or ×. If the reading was 60 MPa or more, the grade was ⊙. If the reading was 20 MPa or more and less than 60 MPa (i.e., from 20 MPa to less than 60 MPa, the grade was ○. If the reading was less than 20 MPa, the grade was ×. The result is presented in Table 1.

Production of Test Specimens

For the testing of the withstand voltage, relative permeability, and saturation flux density of articles shaped from the soft magnetic particles of sample A1-01, test specimens of sample A1-01 were produced. Ring-shaped test specimens were produced by compression molding of first soft magnetic particles 81 (sample A1-01), second soft magnetic particles 82, and epoxy resins. The second soft magnetic particles 82 were particles of sample A2-05, which will be described later.

The second soft magnetic particles 82 used to make the test specimens were ones having an average diameter of 3 μm obtained by forming a 2-nm-thick insulating film 82B (described later) containing an alkyl group having a C16 linear-chain moiety on nuclei 82A (described later) made of crystalline pure iron. In the test specimens, the ratio by weight between the first and second soft magnetic particles 81 and 82 was 75:25, and the ratio by weight between the first and second soft magnetic particles 81 and 82 combined and the epoxy resins was 100:3.1. As for shape, the test specimens were toroids measuring 8 mm in inner diameter, 13 mm in outer diameter, and 5 mm in thickness.

Withstand Voltage

A test specimen of sample A1-01 was tested for withstand voltage by measuring it using an AC/DC withstand voltage/insulation resistance tester. The result is presented in Table 1.

Magnetic Permeability

A test specimen of sample A1-01 was tested for relative permeability by measuring it using a BH analyzer and an impedance/material analyzer with a 1-MHz radiofrequency signal. The result is presented in Table 1.

Saturation Flux Density

A test specimen of sample A1-01 was tested for saturation flux density by measuring the change in its inductance under an applied DC current using an LCR meter and a DC power supply and determining the saturation flux density from the BH data obtained. The result is presented in Table 1.

Samples A1-02 to A1-27

Samples A1-02 to A1-27 were prepared and tested for the strength of adhesion, withstand voltage, relative permeability, and saturation flux density in the same way as sample A1-01. The Cr content of the nuclei 81A was as in Table 1, and the Fe and Si contents and the oxygen content were also changed. The average thickness of the oxide film 81B, produced by surface oxidation of the nuclei 81A, increased with increasing oxygen content when the Cr content was constant.

TABLE 1

| Sample No. | Cr (wt %) | Fe (wt %) | Si (wt %) | Oxygen (ppm) | Thickness gap of the oxide film (nm) | Strength of adhesion | Withstand voltage (V/mm) | Relative permeability | Saturation flux density (T) | Magnetic performance factor (μ × BS) |
|---|---|---|---|---|---|---|---|---|---|---|
| A1-01 | 0 | 93 | 3.5 | 500 | 17 | X | 32 | 36.0 | 1.20 | 43.20 |
| A1-02 | 0 | 93 | 3.5 | 800 | 18 | X | 35 | 35.0 | 1.21 | 42.35 |
| A1-03 | 0 | 93 | 3.5 | 900 | 26 | ⊙ | 38 | 35.5 | 1.23 | 43.67 |
| A1-04 | 0 | 93 | 3.5 | 1200 | 45 | ⊙ | 41 | 35.3 | 1.25 | 44.13 |
| A1-05 | 0 | 93 | 3.5 | 1500 | 59 | ⊙ | 53 | 33.8 | 1.25 | 42.25 |
| A1-06 | 0 | 93 | 3.5 | 2500 | 95 | ⊙ | 64 | 32.8 | 1.24 | 40.67 |
| A1-07 | 0 | 93 | 3.5 | 2600 | 130 | ⊙ | 70 | 31.8 | 1.21 | 38.48 |
| A1-08 | 0 | 93 | 3.5 | 2800 | 151 | ⊙ | 75 | 30.8 | 1.25 | 38.50 |
| A1-09 | 0 | 93 | 3.5 | 3000 | 155 | X | 77 | 29.0 | 1.20 | 34.80 |
| A1-10 | 0.5 | 92 | 3.5 | 500 | 12 | X | 30 | 36.7 | 1.05 | 38.54 |
| A1-11 | 0.5 | 92 | 3.5 | 800 | 16 | X | 33 | 36.5 | 1.05 | 38.33 |
| A1-12 | 0.5 | 92 | 3.5 | 900 | 19 | ○ | 36 | 36.2 | 1.05 | 38.01 |
| A1-13 | 0.5 | 92 | 3.5 | 1200 | 33 | ○ | 39 | 36.0 | 1.06 | 38.16 |
| A1-14 | 0.5 | 92 | 3.5 | 1500 | 45 | ○ | 50 | 34.5 | 1.09 | 37.61 |
| A1-15 | 0.5 | 92 | 3.5 | 2600 | 90 | ○ | 61 | 33.5 | 1.08 | 36.18 |
| A1-16 | 0.5 | 92 | 3.5 | 2800 | 114 | ○ | 67 | 32.4 | 1.10 | 35.64 |
| A1-17 | 0.5 | 92 | 3.5 | 3000 | 133 | X | 71 | 31.4 | 1.14 | 35.80 |
| A1-18 | 1.5 | 90 | 3.5 | 500 | 9 | X | 29 | 37.1 | 1.00 | 37.10 |
| A1-19 | 1.5 | 90 | 3.5 | 800 | 14 | X | 32 | 37.5 | 1.00 | 37.50 |
| A1-20 | 1.5 | 90 | 3.5 | 900 | 19 | ○ | 36 | 38.1 | 1.00 | 38.10 |
| A1-21 | 1.5 | 90 | 3.5 | 1200 | 25 | ○ | 37 | 37.9 | 1.01 | 38.28 |
| A1-22 | 1.5 | 90 | 3.5 | 1500 | 38 | ○ | 48 | 36.3 | 1.03 | 37.39 |
| A1-23 | 1.5 | 90 | 3.5 | 2600 | 81 | ○ | 58 | 35.2 | 1.07 | 37.66 |
| A1-24 | 1.5 | 90 | 3.5 | 2800 | 100 | ○ | 62 | 34.2 | 1.05 | 35.91 |
| A1-25 | 1.5 | 90 | 3.5 | 3000 | 120 | X | 68 | 33.0 | 1.08 | 35.64 |
| A1-26 | 2 | 89 | 5.2 | 500 | 4 | X | 30 | 36.0 | 0.95 | 34.20 |
| A1-27 | 2.5 | 88 | 5.5 | 500 | 3 | X | 30 | 37.9 | 0.90 | 34.11 |

Figure 9:
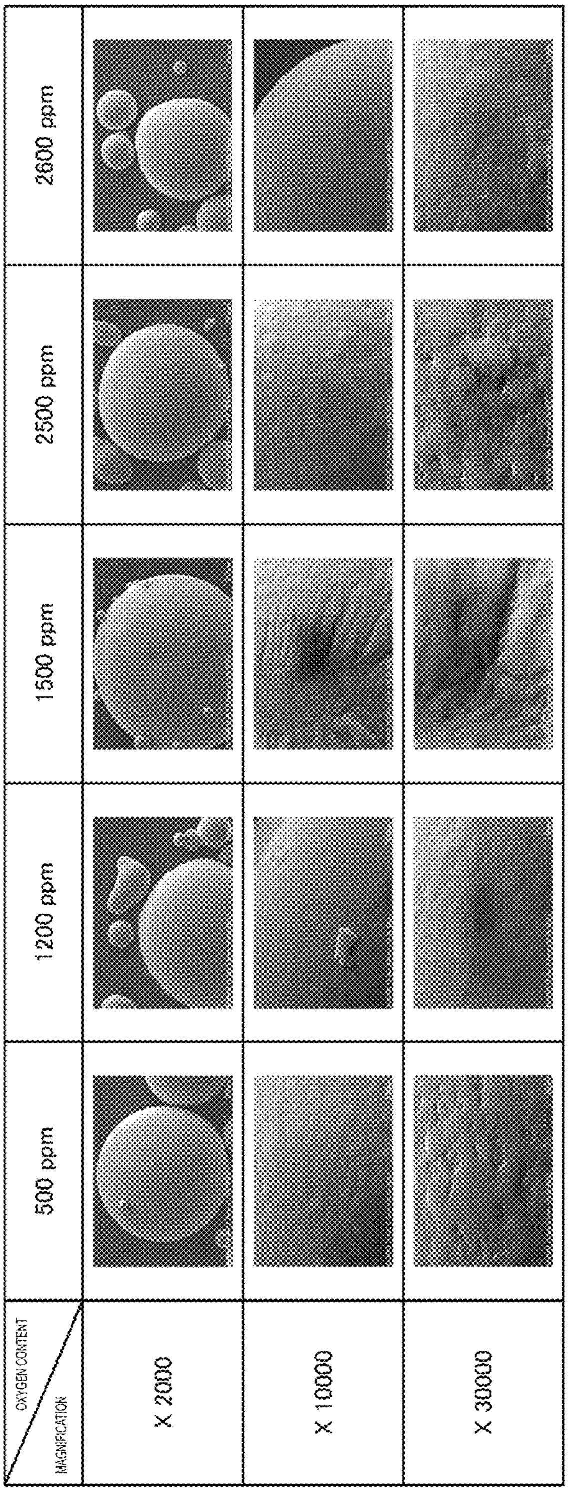
FIG. 9 presents electron microscope surface images of an oxide film on the nucleus for types of Cr-free first soft magnetic particles.

FIG. 9 presents electron microscope images of the surface of types of nuclei 81A that contained no Cr (Cr-free) and whose oxygen content was 500, 1200, 1500, 2500, or 2600 ppm, i.e., nuclei 81A of samples A1-01, A1-04, A1-05, A1-06, and A1-07. As can be seen from the difference between samples in the surface condition of the nucleus 81A shown in FIG. 9, undulations on the surface of the oxide film 81B became deeper with increasing thickness of the oxide film 81B, or with increasing oxygen content of the nuclei 81A before the formation of the insulating film 81C. A possible cause of this deepening of undulations on the oxide film 81B with increasing thickness, the inventors believe, is that the increase in the thickness of the oxide film 81B changed the status of contact between nuclei 81A, making a difference in the dryness of the surface of the nuclei 81A that resulted in variations in the tendency for oxidation of the Fe—Si alloy from place to place.

When the oxygen content was 900 ppm or higher, the average thickness of the oxide film 81B was large, and the thickness gap of the oxide film 81B was large enough that the strength of the adhesion of the insulating film 81C met its acceptance criteria. In view of the strength of the adhesion of the insulating film 81C, therefore, it is desirable that the oxygen content of the first soft magnetic particles 81 be about 900 ppm or more.

This strengthening of the adhesion of the insulating film 81C with increasing thickness of the oxide film 81B, the inventors believe, owes to an enhancement of anchoring effect as a result of the deepening of undulations on the surface of the oxide film 81B with increasing thickness of the oxide film 81B.

When the strength of adhesion with samples A1-26 and A1-27 is compared with that with samples A1-03 to A1-08, A1-12 to A1-16, and A1-20 to A1-24 in Table 1, furthermore, it is found that this strengthening of adhesion owing to increasing surface roughness was observed when the Cr content was 1.5% by weight or less, and was significant with the Cr-free (containing no Cr) samples A1-03 to A1-08.

Figure 10:
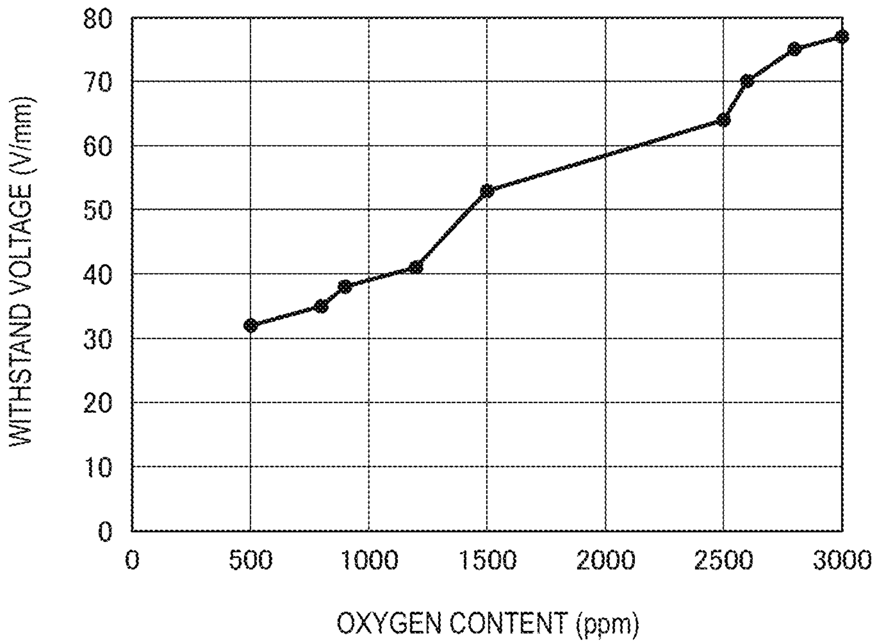
FIG. 10 is a graphical representation of how the oxygen content of first soft magnetic particles changes the withstand voltage of a shaped article.
Figure 11:
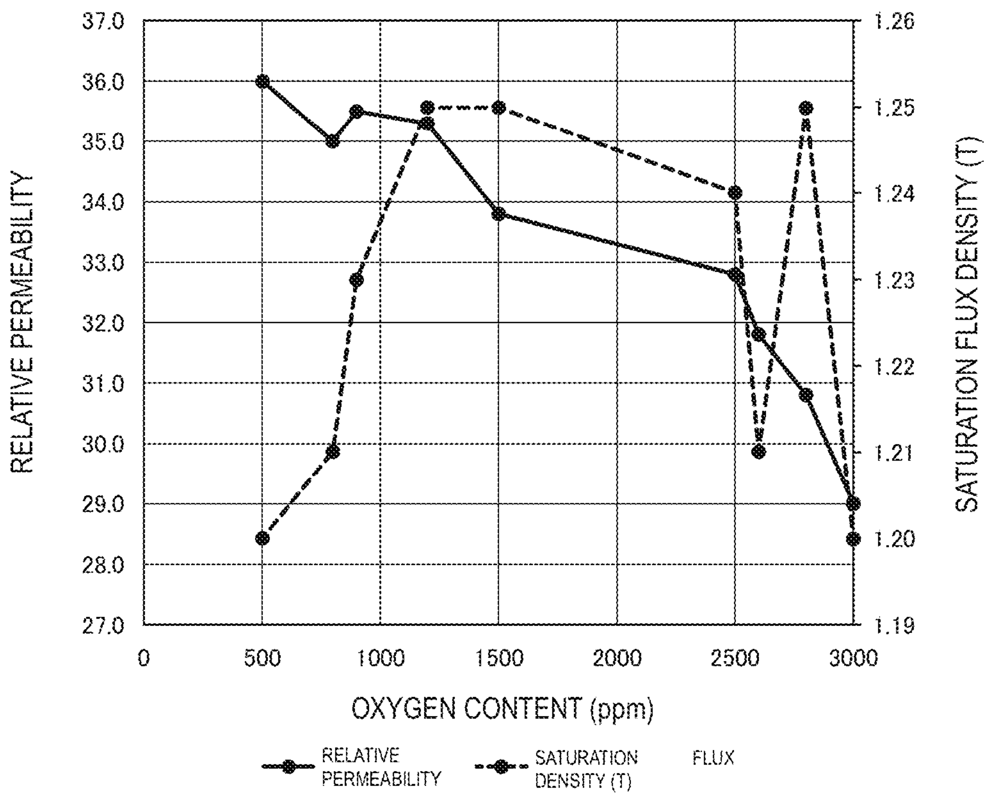
FIG. 11 is a graphical representation of how the oxygen content of first soft magnetic particles changes the relative permeability and saturation flux density of a shaped article.
Figure 12:
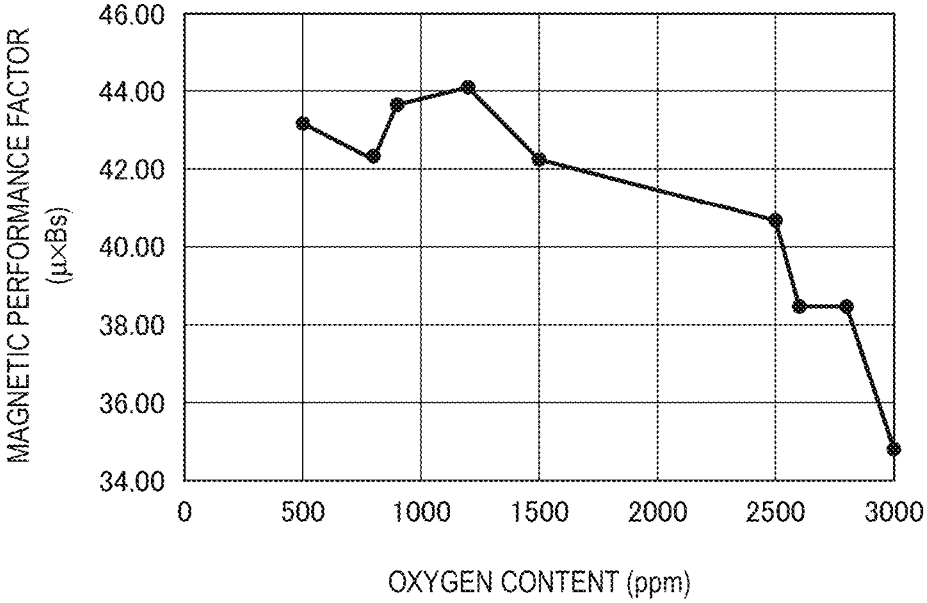
FIG. 12 is a graphical representation of how the oxygen content of first soft magnetic particles changes a magnetic performance factor of a shaped article.

FIG. 10 is a graphical representation of the dependence of withstand voltage on oxygen content for the Cr-free samples A1-01 to A1-09. FIG. 11 is a graphical representation of the dependence of relative permeability and saturation flux density on oxygen content for samples A1-01 to A1-09. FIG. 12 is a graphical representation of the dependence of a magnetic performance factor on oxygen content for samples A1-01 to A1-09.

The withstand voltage, in FIG. 10, increased with increasing oxygen content. The inventors believe this is because the adhesion of the insulating film 81C became stronger with increasing thickness of the oxide film 81B. As the strength of adhesion increased, the insulation resistance of the nuclei 81A of the first soft magnetic particles 81 to the surroundings increased. The resistivity of the test specimen (shaped article) also rose accordingly.

The relative permeability, in FIG. 11, decreased with increasing oxygen content. The inventors believe this is because the percentage of the Fe—Si alloy in the nuclei 81A, or the metal content of the soft magnetic particles, decreased with increasing oxygen content, or with increasing percentage of oxidized Fe—Si alloy in the nuclei 81A. The data also indicate that limiting the oxygen content to about 2800 ppm or less will reduce the decrease in relative permeability associated with the increase in the thickness of the oxide film 81B to approximately 15% of that at an oxygen content of about 500 ppm.

The saturation flux density increased with oxygen content. The inventors believe this is also because the percentage of the oxidized form of the Fe—Si alloy, the soft magnetic metal forming the nuclei 81A, increased. As the percentage of oxidized alloy increased, the cross-sectional area of the Fe—Si alloy moiety in the nuclei 81A decreased, resulting in a decrease in the proportion of effective magnetic fluxes, or the magnetic fluxes that passed through the Fe—Si alloy moiety of the nuclei 81A, to all magnetic fluxes through the test specimen. In FIG. 11, the falls in saturation flux density observed at oxygen contents of 2500, 2600, and 3000 ppm are attributable to factors such as the measuring conditions and the quality of the test specimen. A subsequent investigation has identified the cause of these outliers, revealing that the calculated volume of the test specimen was wrong at 2500 ppm, the test specimen heated because of mistakenly selected measuring conditions at 2600 ppm, and the test specimen was in an abnormal condition at 3000 rpm.

Based on these results, sufficiently strong adhesion of the insulating film 81C and a practically high withstand voltage are combined without great loss of relative permeability when the oxygen content of the first soft magnetic particles 81 as a component of the core 40 is about 900 ppm or more and about 2800 ppm or less (i.e., from about 900 ppm to about 2800 ppm). It is desirable that the oxygen content of the first soft magnetic particles 81 be in this range.

Overall, the soft magnetic powder in the powder mix used to form the core 40 contains first soft magnetic particles 81. The first soft magnetic particles 81 are composed of nuclei 81A containing a soft magnetic metal and an insulating film 81C on the surface of the nuclei 81A. The nuclei 81A have an oxide film 81B formed by oxide(s) of the soft magnetic metal under the insulating film 81C. The nuclei 81A contain no Cr or about 1.5% by weight or less Cr, and their oxygen content by weight is about 900 ppm or more and about 2800 ppm or less (i.e., from about 900 ppm to about 2800 ppm).

This configuration ensures the core 40 can withstand high voltages consistently with limited loss of magnetic permeability when the powder mix, containing the first soft magnetic particles 81, is shaped into the core 40 as a magnetic metal material by compression molding.

The soft magnetic metal in the nuclei 81A of the first soft magnetic particles 81 can be an iron-based soft magnetic metal containing Fe and Si. This arrangement makes it easier to form the oxide film 81B on the surface of the nuclei 81A.

The iron-based soft magnetic metal can be crystalline. This arrangement makes the formation of the oxide film 81B on the surface of the nuclei 81A even easier.

Besides the first soft magnetic particles 81, the soft magnetic powder as a component of the powder mix can contain second soft magnetic particles 82 that contain a soft magnetic metal and have an average diameter smaller than that of the first soft magnetic particles 81. Using second soft magnetic particles 82 as described below in addition to the first soft magnetic particles 81 helps achieve higher magnetic permeability as they improve the packing of soft magnetic particles in the core 40.

When a magnetic metal material shaped from soft magnetic powder containing first soft magnetic particles 81 according to any of the examples in this chapter is combined with a coil of wire 31, an inductor 1 is given. An inductor configured as such can be small yet highly reliable by virtue of its high withstand voltage.

A-1-2. Second Soft Magnetic Particles

A-1-2-1. Embodiment of Second Soft Magnetic Particles

Figure 13:
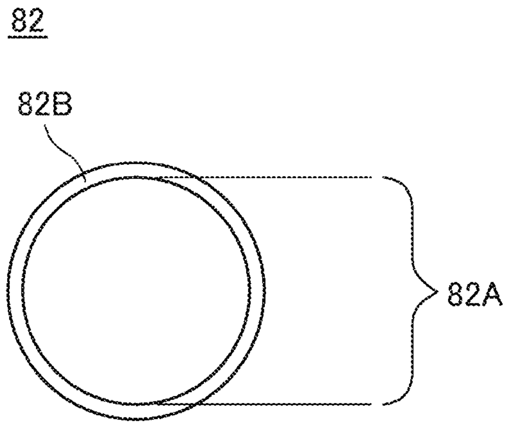
FIG. 13 is a diagram illustrating the structure of second soft magnetic particles as a component of powder mix.

FIG. 13 is a diagram illustrating the structure of the second soft magnetic particles 82. The second soft magnetic particles 82 are each composed of a nucleus 82A made of a soft magnetic metal and an insulating film 82B on the surface of the nucleus 82A. The soft magnetic metal forming the nucleus 82A is, for example, crystalline or amorphous iron (Fe). Specifically, the second soft magnetic particles 82 are particles of powdered carbonyl iron in onion-skin structure containing about 95% by weight or more and about 99.8% by weight or less (i.e., from about 95% by weight to about 99.8% by weight) Fe, preferably about 97% by weight or more and about 99.8% by weight or less (i.e., from about 97% by weight to about 99.8% by weight) Fe. The powdered carbonyl iron can contain carbon (C), oxygen (O), nitrogen (N), and/or sulfur (S) as impurity(ies). The powdered carbonyl iron to be used as the nuclei 82A may have an Fe oxide film on its surface.

Like that in the first soft magnetic particles 81, the soft magnetic metal forming the nuclei 82A of the second soft magnetic particles 82 does not need to be Fe; it can be an iron-based soft magnetic metal, which is Fe with other metal(s) contained therein.

The insulating film 82B on the second soft magnetic particles 82 is the product of a sol-gel reaction, for example involving silica, and contains a hydrocarbon group having a C8 or longer linear-chain moiety. Specific examples of hydrocarbon groups having a C8 or longer linear-chain moiety include alkyl groups, which are linear saturated hydrocarbon groups. The hydrocarbon group having a C8 or longer linear-chain moiety may be one or more hydrocarbon groups selected from the group consisting of the octyl, nonyl, decyl, undecyl, dodecyl, tridecyl, tetradecyl, pentadecyl, hexadecyl, heptadecyl, and octadecyl groups. Primary, secondary, and tertiary alkyl groups can all be used.

The long-chain hydrocarbon group can be formed as, for example, the product of a sol-gel reaction performed using a mixture of tetraethoxysilane (TEOS) and a silane coupling agent having the hydrocarbon group.

Adding a hydrocarbon group having a C8 or longer linear-chain moiety to the insulating film 82B on the second soft magnetic particles 82 can improve the packing of soft magnetic particles in the core 40 when the core 40 is shaped from the powder mix containing the first and second soft magnetic particles 81 and 82.

Without wishing to be bound by a particular theory, the inventors presume this improved packing of soft magnetic powder occurs through the following mechanism. As stated, the core 40 is formed by compression molding of powder mix that contains first soft magnetic particles 81, second soft magnetic particles 82, and epoxy resins (e.g., thermosetting resins). If the second soft magnetic particles 82 (smaller particles), for example, as one of the two sets of soft magnetic particles have a hydrocarbon group having a C8 or longer linear-chain moiety on their surface, the flowability (lubricity) of the second soft magnetic particles 82 during the compression molding can improve because the hydrocarbon group weakens the hydrogen bonds and/or bipolar interactions between the second soft magnetic particles 82 and the polar groups on the epoxy resins (e.g., epoxy and/or hydroxyl groups).

The highly lubricated second soft magnetic particles 82, as a result, are able to penetrate into the spaces between the first soft magnetic particles 81 (larger particles). The inventors believe such is a mechanism behind the improved packing of soft magnetic particles in the core 40 from that without a long-chain hydrocarbon group on the soft magnetic particles. Improved packing of soft magnetic particles leads to an increased density of soft magnetic powder in the core 40, thereby helping increase the relative permeability of the core 40.

The lubricity of the second soft magnetic particles 82 can be measured using a direct shear testing machine as used in JIS Z8835. More specifically, it can be measured by the following procedure using a direct shear tester with a moving base (Nano Seeds Corporation NS-S500 powder bed shear stress analyzer). The inner diameter of the upper cell (ring) and that of the lower cell (base) are both set to 15 mm, and the ring-to-base distance (slit) is set to 0.2 mm Before the powder is loaded, a lid is placed on the ring and base to define the zero point so that the thickness of the powder bed can be measured using a laser sensor. A 10-g sample powder of the second soft magnetic particles 82 is loaded into the two-part cell to fill the cell uniformly, the lid is placed gently, and an indentation load of 150 N is applied with a vertical servo motor. The applied 150-N indentation load will hold the position of the load cell of the vertical servo motor. The rate of indentation is set to 0.2 mm/sec. One hundred seconds after the holding of the load cell of the vertical servo motor, horizontal shear is induced; the delay of the start of horizontal shear is set to 100 seconds. After the horizontal servo motor starts inducing horizontal shear, the pressure is measured every 0.1 seconds. The rate of horizontal shear is set to 5 μm/sec. For each sample, the measurement is carried out at 50 or more points (N≥50) continuously during the operation of the horizontal servo motor and ended when the coefficient of variation (CV) of the measurements falls below 0.4%. The thickness of the powder bed at the end of consolidation (final thickness of the powder bed) is measured with a laser sensor.

From the load on the load cell of the vertical servo motor measured when it is held (maximum load of indentation), the load on the load cell measured at the start of operation of the horizontal servo meter (indentation load at the start of horizontal shear), and the final thickness of the powder bed, the lubricity can be determined according to the equation below (for details, see, for example, Japanese Patent Application No. 2019-224678).

[Equation 1]

$$\text{Stress relaxation (\%)} = \frac{\text{Maximum load of indentation} - \text{Indentation load at the start of horizontal shear}}{\text{Maximum load of indentation}} \times 100$$

$$\text{Lubricity (\%/mm)} = \frac{\text{Stress relaxation (\%)}}{\text{Final thickness of the powder bed (mm)}}$$

As stated, adding a hydrocarbon group having a C8 or longer linear-chain moiety to the surface of the second soft magnetic particles 82 will improve the packing of soft magnetic particles in the core 40 during the formation of the core 40 by lubricating the second soft magnetic particles 82, thereby helping increase the magnetic permeability of the core 40. Lubricating the second soft magnetic particles 82 by introducing a long-chain hydrocarbon group to their surface, however, can at the same time affect the mechanical strength of the core 40 because it means weakening the adhesion or binding between second soft magnetic particles 82 and the resin present therearound or other soft magnetic particles (the first soft magnetic particles 81 and/or another collection of second soft magnetic particles 82).

The inventors have found that the mechanical strength of the shaped core 40 can be improved by controlling the lubricity of the second soft magnetic particles 82 by reducing the number of long-chain hydrocarbon groups, or hydrocarbon groups having a C8 or longer linear chain-moiety, on the surface of their nuclei 82A.

An example of a way to control the number of long-chain hydrocarbon groups on the surface of the second soft magnetic particles 82 is to adjust the proportions of tetraethoxysilane and the silane coupling agent in the mixture for sol-gel reaction used when the insulating film 82B is formed on the surface of the nuclei 82A.

The number of long-chain hydrocarbon groups on the surface of the second soft magnetic particles 82 can be evaluated based on the proportions of silicon (Si) and carbon (C) in the insulating film 82B. If the nuclei 82A of the second soft magnetic particles 82 are free of both Si and C, the number of long-chain hydrocarbon groups can be evaluated on the basis of the ratio by weight of Si to C (Si/C weight ratio) in the second soft magnetic particles 82 as a whole. To maintain high magnetic permeability with limited loss of the mechanical strength of the core 40, it is desirable that the Si/C weight ratio of the second soft magnetic particles 82 be about 7.6 or more and about 42.8 or less (i.e., from about 7.6 to about 42.8).

In this embodiment, of the first and second soft magnetic particles 81 and 82, differing in average diameter, in the powder mix, the second soft magnetic particles 82, which have the smaller average diameter, have a long-chain hydrocarbon group on the surface of their nuclei 82A. The long-chain hydrocarbon group, however, does not need to be on the second soft magnetic particles 82. For example, an insulating film 82B containing a hydrocarbon group having a C8 or longer linear-chain moiety as described above may be formed on the surface of the first soft magnetic particles 81 or the surface of both the first and second soft magnetic particles 81 and 82 instead of the second soft magnetic particles 82. This will lubricate the surface of the first soft magnetic particles 81 or the surface of both the first and second magnetic particles 81 and 82. In this case, too, the core 40 will have high magnetic permeability with limited loss of mechanical strength.

A-1-2-2. Production of the Second Soft Magnetic Particles

The following describes the production of second soft magnetic particles 82 according to an embodiment of the present disclosure. The following is merely an example and is not the only method for producing second soft magnetic particles 82 according to an embodiment of the disclosure.

Preparation of Nuclei of Soft Magnetic Metal

First, fine particles of metal as a precursor to the nuclei 82A of the second soft magnetic particles 82 are prepared. The details of the second soft magnetic particles 82, such as average diameter and the composition of the nuclei 82A, are as described above. It would be fair to assume that the surface treatment, described below, will make no substantial change in the average diameter of the nuclei 82A.

Formation of Insulating Film on the Surface of the Nuclei

Then an insulating film 82B containing a hydrocarbon group having a C8 or longer linear-chain moiety is formed on the surface of the nuclei 82A. The insulating film 82B can be formed through, for example, a sol-gel reaction of a surface treatment agent that contains tetraethoxysilane, which is an alkoxide, and a silane coupling agent. This will produce, on the nuclei 82A, an insulating film 82B having a hydrocarbon group with a linear-chain moiety as the product of the sol-gel reaction.

The alkoxide does not need to be tetraethoxysilane; any metal alkoxide represented by the chemical formula $M\text{-}(OR)_n$ can be used. Preferably, the metal(s) M in the metal alkoxide is one or more selected from the group consisting of Li, Na, Mg, Al, Si, K, Ca, Ti, Cu, Sr, Y, Zr, Ba, Ce, Ta, and Bi. The alkoxy group(s) OR in the metal alkoxide can be of any kind, such as the methoxy, ethoxy, and/or propoxy groups.

A silane coupling agent is represented by the chemical formula $R'\text{—}Si(OR)_3$. R' represents a hydrocarbon group having a C8 or longer linear-chain moiety and may be one or more selected from the group consisting of, for example, the octyl, nonyl, decyl, undecyl, dodecyl, tridecyl, tetradecyl, pentadecyl, hexadecyl, heptadecyl, and octadecyl groups. OR represents an alkoxy group and preferably is a methoxy or ethoxy group. If, for example, the manufacturer wants to form a hydrocarbon group having a C16 or longer linear-chain moiety, hexadecyltrimethoxysilane can be used.

The lubricated second soft magnetic particles 82 obtained in such a way help make the core 40 a magnetic material (magnetic core) of high relative permeability. When shaped into the core 40 by compression molding together with the first soft magnetic particles 81 and epoxy resins, the second soft magnetic particles 82 are not restricted by the epoxy resins excessively but fill the spaces between the first soft magnetic particles 81 efficiently by virtue of their imparted lubricity.

Desirably, the formation of the insulating film 82B on the nuclei 82A includes forming a tetraethoxysilane film on the surface of the nuclei 82A and forming a film containing a long-chain hydrocarbon group, or hydrocarbon group having a C8 or longer linear-chain moiety, on the tetraethoxysilane film through a sol-gel reaction between the tetraethoxysilane and a silane coupling agent. This helps reduce the amount of silane coupling agent used to form the insulating film 82B; the long-chain hydrocarbon groups will be distributed on the surface of the insulating film 82B effectively, with only a limited fraction of them buried inside the insulating film 82B.

The surface treatment agent can be one that contains a surfactant during the formation of a tetraethoxysilane film. Adding a surfactant to the surface treatment agent will help lubricate the entire surface of the second soft magnetic particles 82. The surfactant forms micelles, and the hydrophilic moiety of the micelles will form hydrogen bonds with silanol groups produced by the hydrolysis of the tetraethoxysilane. During the formation of a tetraethoxysilane, therefore, the micelles will be distributed on the surface of the soft magnetic metal nuclei 82A, creating dense and sparse populations of tetraethoxysilane molecules on the surface of the nuclei 82A. The subsequently formed long-chain, C8 or longer, hydrocarbon groups will be spaced apart from one another and, as a result, will disperse widely on the surface of the insulating film 82B.

A-1-2-3. Examples of Second Soft Magnetic Particles

Twenty-seven samples of soft magnetic particles differing in the number of carbon atoms in the linear-chain moiety of the hydrocarbon group in the insulating film 82B and the ratio by weight of Si to C (Si/C weight ratio) in the insulating film 82B were prepared as samples A2-01 to A2-27 and characterized. A summary of samples A2-01 to A2-27 is presented in Table 2. Samples A2-01 to A2-09, A2-15 to A2-18, and A2-24 to A2-27 are examples of second soft magnetic particles 82 according to an embodiment of the present disclosure. Table 2 also presents data on the silane coupling agent used to produce the insulating film 82B for each of samples A2-01 to A2-27.

TABLE 2

| Sample No. | Linear-chain carbon atoms | Si/C weight ratio in the insulating film | Silane coupling agent |
|---|---|---|---|
| A2-01 | 16 | 6.5 | Hexadecyltrimethoxysilane |
| A2-02 | 16 | 7.6 | Hexadecyltrimethoxysilane |
| A2-03 | 16 | 8.1 | Hexadecyltrimethoxysilane |
| A2-04 | 16 | 9.7 | Hexadecyltrimethoxysilane |
| A2-05 | 16 | 10.7 | Hexadecyltrimethoxysilane |
| A2-06 | 16 | 13.4 | Hexadecyltrimethoxysilane |
| A2-07 | 16 | 17.8 | Hexadecyltrimethoxysilane |
| A2-08 | 16 | 42.8 | Hexadecyltrimethoxysilane |
| A2-09 | 16 | 81.1 | Hexadecyltrimethoxysilane |
| A2-10 | 0 | 7.6 | Tetraethoxysilane |
| A2-11 | 1 | 7.6 | Methyltrimethoxysilane |
| A2-12 | 2 | 7.6 | Ethyltrimethoxysilane |
| A2-13 | 3 | 7.6 | n-propyltrimethoxysilane |
| A2-14 | 6 | 7.6 | Hexyltrimethoxysilane |
| A2-15 | 8 | 7.6 | Octyltrimethoxysilane |
| A2-16 | 10 | 7.6 | Decyltrimethoxysilane |
| A2-17 | 12 | 7.6 | Dodecyltrimethoxysilane |
| A2-18 | 18 | 7.6 | Octadecyltrimethoxysilane |
| A2-19 | 0 | 42.8 | Tetraethoxysilane |
| A2-20 | 1 | 42.8 | Methyltrimethoxysilane |
| A2-21 | 2 | 42.8 | Ethyltrimethoxysilane |
| A2-22 | 3 | 42.8 | n-propyltrimethoxysilane |
| A2-23 | 6 | 42.8 | Hexyltrimethoxysilane |
| A2-24 | 8 | 43.8 | Octyltrimethoxysilane |
| A2-25 | 10 | 44.8 | Decyltrimethoxysilane |
| A2-26 | 12 | 45.8 | Dodecyltrimethoxysilane |
| A2-27 | 18 | 45.8 | Octadecyltrimethoxysilane |

The following describes the individual samples.

Sample A2-01

Preparation of Nuclei

For use as the nuclei 82A of the second soft magnetic particles 82, particles of powdered carbonyl iron containing 97% by weight or more and 99.8% by weight or less (i.e., from 97% by weight to 99.8% by weight) iron were selected. The hardness of the nuclei 82A was 952 HV, substantially equal to that of the nuclei 81A of the first soft magnetic particles 81 used in samples A1-01 to A1-08.

Formation of Insulating Film Containing a Long-Chain Hydrocarbon Group

On the surface of the nuclei 82A, an insulating film 82B containing an alkyl group having a C16 linear-chain moiety was formed. The surface treatment agent for the formation of the insulating film 82B was a liquid mixture of tetraethoxysilane as an alkoxide, hexadecyltrimethoxysilane as a silane coupling agent, and a phosphate anionic surfactant as a surfactant.

Specifically, the procedure was as follows. The tetraethoxysilane and hexadecyltrimethoxysilane were KBE04 (Shin-Etsu Chemical Co., Ltd.) and X-88-422 (Shin-Etsu Chemical Co., Ltd.), respectively. The phosphate anionic surfactant was PLYSURF AL (DKS Co., Ltd.).

First, a tetraethoxysilane film was formed on the surface of the nuclei 82A. Isopropyl alcohol, aqueous ammonia, and an aqueous solution of PLYSURF AL were mixed together and stirred (liquid dispersion 1). Isopropyl alcohol was added to a predetermined weight of the nuclei 82A, and the powder of the nuclei 82A was dispersed by sonication (liquid dispersion 2). Liquid dispersion 2 was stirred with liquid dispersion 1 using a stirrer (liquid dispersion 3).

Then tetraethoxysilane was mixed into isopropyl alcohol (surface treatment solution 1). Surface treatment solution 1 was added to liquid dispersion 3 (reaction solution 1). Stirring reaction solution 1 with a stirrer produced a tetraethoxysilane film on the surface of the nuclei 82A.

On the surface of the resulting tetraethoxysilane film, a film containing an alkyl group having a C16 linear-chain moiety was formed. First, isopropyl alcohol, hexadecyltrimethoxysilane, and tetraethoxysilane were mixed together (surface treatment solution 2). Surface treatment solution 2 was added to reaction solution 1 (reaction solution 2). Stirring reaction solution 2 with a stirrer produced a film containing an alkyl group having a C16 linear-chain moiety on the surface of the tetraethoxysilane film.

Then reaction solution 2 was suction-filtered through a membrane filter to isolate particles covered with the insulating film 82B. The isolated particles were washed with acetone as needed, air-dried at room temperature, and classified through a metal mesh sieve. The particles left on the sieve were used as sample A2-01 of second soft magnetic particles 82.

The average (median) diameter of the resulting second soft magnetic particles 82 was 1.7 μm. The average diameter was measured using a particle size analyzer.

Si/C Weight Ratio of the Nuclei Covered with the Insulating Film

As an indicator of the number of hydrocarbon groups having a C16 linear-chain moiety on the surface of the insulating film 82B, the Si/C weight ratio of sample A2-01 was checked as follows after the formation of the insulating film 82B.

First, the second soft magnetic particles 82 covered with the insulating film 82B was irradiated with x-rays using an x-ray photoelectron spectrometer, and information on the intensity of the peaks for the chemical elements contained in the insulating film 82B was obtained by measuring what is called a wide-scan spectrum. Then the integrated intensity of the peaks for Si and C in the insulating film 82B was determined by measuring what is called a narrow-scan spectrum. Normalizing the determined intensities based on the relative sensitivity factors of elemental orbitals gave the concentrations of the elements in atm % with the total as 100%. These atm % concentrations were multiplied by the atomic weight of the respective elements, and the products were used to calculate the ratio by weight between Si and C.

Lubricity

Sample A2-01 was tested for lubricity by analyzing 10 g of the soft magnetic particles of the sample using a direct shear tester with a moving base (Nano Seeds Corporation NS-S500 powder bed shear stress analyzer). The inner diameter of the upper cell (ring) and that of the lower cell (base) were both set to 15 mm, and the indentation load was set to 150 N. The result is presented in Table 3.

Production of Test Specimens

For the testing of articles shaped from the soft magnetic particles of sample A2-01, test specimens of sample A2-01 were produced. Ring-shaped test specimens were produced by compression molding of first soft magnetic particles 81, second soft magnetic particles 82 (sample A2-01), and epoxy resins.

The first soft magnetic particles 81 were particles of sample A1-04, which were particles of Cr-free amorphous Fe—Si alloy having an average diameter of 25.3 μm coated with a 5-nm-thick oxide film 81B and a 23-nm-thick insulating film 81C. The proportions (ratio by weight) of the first and second soft magnetic particles 81 and 82 were 75:25, and those of the first and second soft magnetic particles 81 and 92 combined and the epoxy resins were 100:3.1. As for shape, the test specimens were toroids measuring 8 mm in inner diameter, 13 mm in outer diameter, and 4 mm in thickness.

Magnetic Permeability

A test specimen of sample A2-01 was tested for relative permeability by measuring it using a BH analyzer and an impedance/material analyzer with a 1-MHz radiofrequency signal. The result was graded with ○ or ×. If the reading was equal to or higher than the acceptance limit of 30, the grade was ○. If the reading was lower than the acceptance limit of 30, the grade was ×. The measured relative permeability and the grade are presented in Table 3.

Radial Crushing Strength

A test specimen of sample A2-01 was tested for radial crushing strength by applying a radial pressure to the toroidal test specimen and measuring the pressure at which the test specimen was broken. The result was graded with ○ or ×. If the reading was equal to or higher than the acceptance limit of 85 $N/mm^2$, the grade was ○. If the reading was lower than the acceptance limit of 85 $N/mm^2$, the grade was ×. The measured radial crushing strength and the grade are presented in Table 3.

Withstand Voltage

A test specimen of sample A2-01 was tested for withstand voltage by measuring it using an AC/DC withstand voltage/insulation resistance tester. The result was graded with ○ or ×. If the reading was equal to or higher than the acceptance limit of 50 V/mm, the grade was ○. If the reading was lower than the acceptance limit of 50 V/mm, the grade was ×. The grade is presented in Table 3.

Samples A2-02 to A2-27

Samples A2-02 to A2-27 were prepared and tested for lubricity in the same way as sample A2-01. The silane coupling agent specified in Table 2 was used, the number of carbon atoms in the linear-chain moiety of the hydrocarbon group in the insulating film 82B was as in Table 2, and the Si/C weight ratio of the insulating film 82B was as in Table 2. The procedure for the formation of the insulating film 82B was the same as that for sample A2-01. For each of samples A2-02 to A2-27, test specimens similar to those of sample A2-01 were produced using the soft magnetic particles of the sample as second soft magnetic particles 82. Using these test specimens, the samples were tested for relative permeability, radial crushing strength, and withstand voltage and graded in the same way as with sample A2-01.

In the production of samples A2-01 to A2-27, the Si/C weight ratio was adjusted by changing the proportions of the tetraethoxysilane and the silane coupling agent used to form the insulating film 82B.

The test results for samples A2-01 to A2-09 are presented in Table 3, those for samples A2-10 to A2-18 are presented in Table 4, and those for samples A2-19 to A2-27 are presented in Table 5.

TABLE 3

| Sample No. | Linear-chain carbon atoms | Si/C weight ratio in the insulating film | Lubricity (%/mm) | Relative permeability | Radial crushing strength ($N/mm^2$) | Withstand voltage grade | Relative permeability grade | Radial crushing strength grade |
|---|---|---|---|---|---|---|---|---|
| A2-01 | 16 | 6.5 | 3.0 | 35.3 | 82 | ○ | ○ | X |
| A2-02 | 16 | 7.6 | 2.8 | 34.5 | 100 | ○ | ○ | ○ |
| A2-03 | 16 | 8.1 | 2.5 | 34.2 | 94 | ○ | ○ | ○ |
| A2-04 | 16 | 9.7 | 2.4 | 32.7 | 110 | ○ | ○ | ○ |
| A2-05 | 16 | 10.7 | 2.8 | 34.4 | 120 | ○ | ○ | ○ |

TABLE 3-continued

| Sample No. | Linear-chain carbon atoms | Si/C weight ratio in the insulating film | Lubricity (%/mm) | Relative permeability | Radial crushing strength ($N/mm^2$) | Withstand voltage grade | Relative permeability grade | Radial crushing strength grade |
|---|---|---|---|---|---|---|---|---|
| A2-06 | 16 | 13.4 | 2.0 | 33.4 | 120 | ○ | ○ | ○ |
| A2-07 | 16 | 17.8 | 1.8 | 30.4 | 120 | ○ | ○ | ○ |
| A2-08 | 16 | 42.8 | 2.4 | 30.3 | 122 | ○ | ○ | ○ |
| A2-09 | 16 | 81.1 | 0.9 | 27.7 | 115 | ○ | X | ○ |

TABLE 4

| Sample No. | Linear-chain carbon atoms | Si/C weight ratio in the insulating film | Lubricity (%/mm) | Relative permeability | Radial crushing strength ($N/mm^2$) | Withstand voltage grade | Relative permeability grade | Radial crushing strength grade |
|---|---|---|---|---|---|---|---|---|
| A2-10 | 0 | 7.6 | 1.5 | 22.6 | 120 | X | X | ○ |
| A2-11 | 1 | 7.6 | 1.6 | 23.2 | 120 | X | X | ○ |
| A2-12 | 2 | 7.6 | 2.1 | 23.8 | 120 | ○ | X | ○ |
| A2-13 | 3 | 7.6 | 2.1 | 24.2 | 120 | ○ | X | ○ |
| A2-14 | 6 | 7.6 | 2.2 | 25.4 | 120 | ○ | X | ○ |
| A2-15 | 8 | 7.6 | 2.2 | 30.1 | 120 | ○ | ○ | ○ |
| A2-16 | 10 | 7.6 | 2.7 | 30.4 | 120 | ○ | ○ | ○ |
| A2-17 | 12 | 7.6 | 2.8 | 32.3 | 120 | ○ | ○ | ○ |
| A2-18 | 18 | 7.6 | 3.2 | 36.4 | 85 | ○ | ○ | ○ |

TABLE 5

| Sample No. | Linear-chain carbon atoms | Si/C weight ratio in the insulating film | Lubricity (%/mm) | Relative permeability | Radial crushing strength ($N/mm^2$) | Withstand voltage grade | Relative permeability grade | Radial crushing strength grade |
|---|---|---|---|---|---|---|---|---|
| A2-19 | 0 | 42.8 | 1.5 | 22.6 | 125 | X | X | ○ |
| A2-20 | 1 | 42.8 | 1.6 | 23.0 | 125 | X | X | ○ |
| A2-21 | 2 | 42.8 | 1.8 | 23.4 | 125 | X | X | ○ |
| A2-22 | 3 | 42.8 | 2.1 | 24.8 | 125 | ○ | X | ○ |
| A2-23 | 6 | 42.8 | 2.1 | 25.4 | 125 | ○ | X | ○ |
| A2-24 | 8 | 43.8 | 2.2 | 29.5 | 125 | ○ | X | ○ |
| A2-25 | 10 | 44.8 | 2.2 | 29.6 | 125 | ○ | X | ○ |
| A2-26 | 12 | 45.8 | 2.3 | 29.7 | 125 | ○ | X | ○ |
| A2-27 | 18 | 45.8 | 2.5 | 32.0 | 84 | ○ | ○ | X |

As can be seen from the measured lubricity and magnetic permeability grades in Tables 3 to 5, the presence of a hydrocarbon group having a C8 or longer linear-chain moiety in the insulating film 82B on the surface of the nuclei 82A improves the lubricity of the soft magnetic particles. The improved lubricity of the soft magnetic particles leads to improved density and, therefore, improved relative permeability of the shaped article (test specimen).

For a given Si/C weight ratio, there is a trade-off between relative permeability and radial crushing strength. If the hydrocarbon group in the insulating film 82B has a C8 or longer linear-chain moiety, the resulting core combines high relative permeability with practically high mechanical strength as long as the Si/C weight ratio is about 7.6 or more and about 42.8 or less (i.e., from about 7.6 to about 42.8); in that case the radial crushing strength is about 85 or more and the relative permeability is about 30 or more, despite the trade-off therebetween. In view of repeatability in production, it is more preferred that the Si/C weight ratio be about 9.7 or more and about 13.4 or less (i.e., from about 9.7 to about 13.4).

Overall, the soft magnetic powder as a component of the powder mix contains second soft magnetic particles 82. The second soft magnetic particles 82 are composed of nuclei 82A containing a soft magnetic metal and an insulating film 82B on the surface of the nuclei 82A. The insulating film 82B contains Si and also contains a hydrocarbon group having a C8 or longer linear-chain moiety. The ratio by weight of Si to C in the insulating film 82B is about 7.6 or more and about 42.8 or less (i.e., from about 7.6 to about 42.8).

This configuration ensures the core 40 will combine high mechanical strength and high magnetic permeability when the powder mix, containing the second soft magnetic particles 82, is shaped into the core 40 as a magnetic metal material by compression molding. The source of Si is, for example, a silane coupling agent used to produce the insulating film 82B.

The hydrocarbon group in the insulating film 82B on the second soft magnetic particles 82 can be alkyl group(s). This arrangement makes the formation of a hydrocarbon group having a C8 or longer linear-chain moiety on the surface of the nuclei 82A easier.

The nuclei 82A of the second soft magnetic particles 82 can be particles of carbonyl iron. This arrangement will give the core 40 higher magnetic permeability when the powder mix is shaped into the core 40 as a magnetic metal material.

Besides the second soft magnetic particles 82, the soft magnetic powder as a component of the powder mix can contain first soft magnetic particles 81 that contain a soft magnetic metal and whose nuclei 81A have an average diameter larger than that of the nuclei 82A of the second soft magnetic particles 82. This arrangement will improve the packing of soft magnetic particles in the core 40, thereby helping achieve higher magnetic permeability.

When a magnetic metal material shaped from soft magnetic powder containing second soft magnetic particles 82 according to any of the examples in this chapter is combined with a coil of wire 31, an inductor 1 is given. An inductor configured as such can be small yet highly reliable.

A-2. Resins

The percentage of the resins is about 2.0% by weight or more and about 3.5% by weight or less (i.e., from about 2.0% by weight to about 3.5% by weight) of the total weight of the soft magnetic powder and resins. The resins include at least a bisphenol-A epoxy resin and a rubber-modified epoxy resin, optionally with a phenol-novolac epoxy resin.

The inventors have identified proportions of the bisphenol-A and rubber-modified epoxy resins appropriate for the case when the powder mix contains no phenol-novolac epoxy resin (first resin formula; see the experimental test described later). The first resin formula is about 50% by weight or more and about 90% by weight or less (i.e., from about 50% by weight to about 90% by weight) bisphenol-A epoxy resin and about 10% by weight or more and about 50% by weight or less (i.e., from about 10% by weight to about 50% by weight) rubber-modified epoxy resin, both based on the total weight of resins in the powder mix.

The bisphenol-A epoxy resin is the most abundant resin in the powder mix, but if it is the only resin in the powder mix, the resulting body 10 will often be brittle. Adding a rubber-modified epoxy resin to the powder mix helps reduce the brittleness of the body 10 as it will give the body 10 toughness. Selecting the proportions of the bisphenol-A and rubber-modified epoxy resins to all resins in the powder mix according to the first resin formula and shaping and curing (Step 300 in FIG. 5) the powder mix into the body 10 with the coil 30 therein in the way as described above, furthermore, will give the inductor 1 improved body strength.

The inventors have also identified proportions of the bisphenol-A, rubber-modified, and phenol-novolac epoxy resins appropriate for the case when the powder mix contains a phenol-novolac epoxy resin (second resin formula; see the experimental test described later). The second resin formula is about 40% by weight or more and about 80% by weight or less (i.e., from about 40% by weight to about 80% by weight) bisphenol-A epoxy resin, about 10% by weight or more and about 50% by weight or less (i.e., from 10% by weight to about 50% by weight) rubber-modified epoxy resin, and about 1% by weight or more and about 30% by weight or less (i.e., from about 1% by weight to about 30% by weight) phenol-novolac resin, all based on the total weight of resins in the powder mix.

The function of the phenol-novolac epoxy resin is to adjust the flow viscosity of the powder mix when it is shaped and cured into the body and to improve the strength of the body at elevated temperatures by adjusting the glass transition temperature of the body. Mixing in a phenol-novolac epoxy resin according to the second resin formula, therefore, will give the inductor 1 improved body strength.

In addition, the inventors have noticed that shaping the body 10 as described above using a powder mix containing resins according to the first or second resin formula will give the inductor 1 specific configurations 1 to 3 below.

Specific configuration 1: In a cross-section of the body 10, the percentage of the area of voids to the total area of the soft magnetic particles (first and second soft magnetic particles) and resins is smaller in the region between about 1 μm and about 100 μm from the surface of the body 10 (surface region) than in the middle region of the body 10; the body 10 is denser in the surface region than in the middle region.

Specific configuration 2: Referring to FIGS. 1 to 3, the resin content is smaller near the ridges between the primary sides 12 and 14 and the second side surfaces 18 than near the ridges between the primary sides 12 and 14 and the first side surfaces 16.

Specific configuration 3: Referring to FIGS. 1 to 3, polished first or second soft magnetic particles are exposed out of the core 40, but these exposed particles are covered with the protective film 50. The roughness of the second side surfaces 18 is larger than that of the first side surfaces 16. The narrower of the distances between the second side surfaces 18 and the wound section 32 of the coil 30 is greater than about one time and smaller than about four times the diameter of the first soft magnetic particles.

The following describes the mechanism through which specific configurations 1 to 3 are obtained. As stated referring to FIG. 6, the body 10 is formed by setting the coil 30 into a first tablet 70, placing a second tablet 72 to sandwich the coil 30 with the first tablet 70, and combining the three components into a one-piece structure. The first and second tablets 70 and 72 are heated and at the same time pressed in the direction in which they are stacked. This will cause the powder mix to flow, giving a core with an embedded coil 30 therein.

Figure 14:
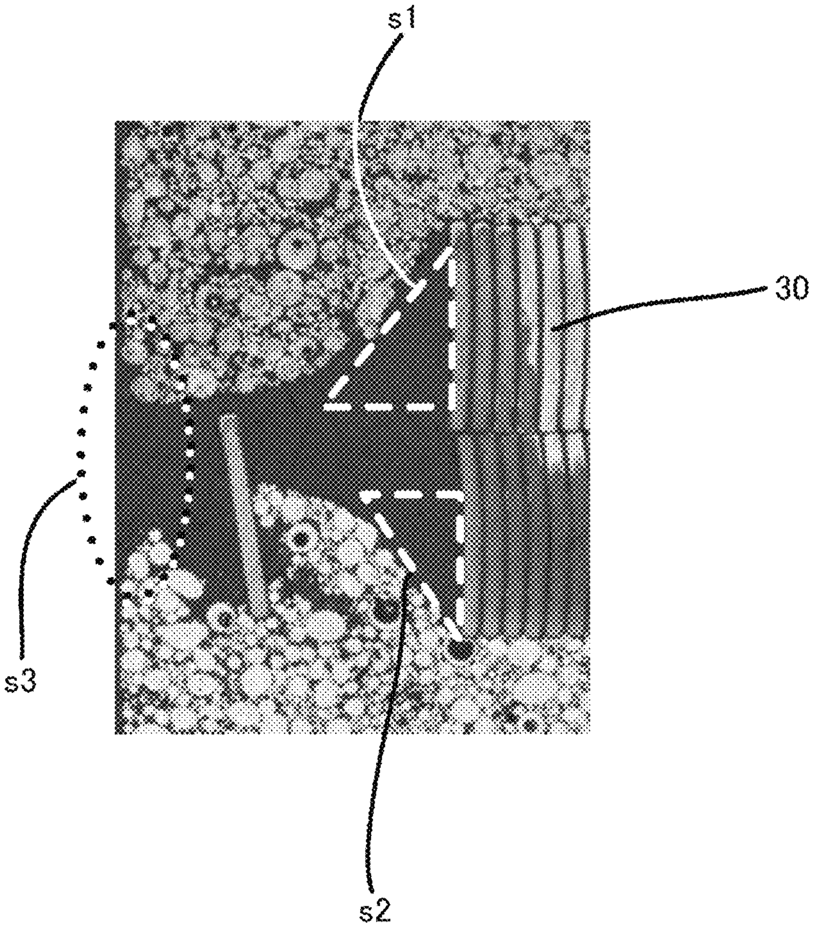
FIG. 14 is an image of near-coil flow of powder mix during shaping and curing.
Figure 15:
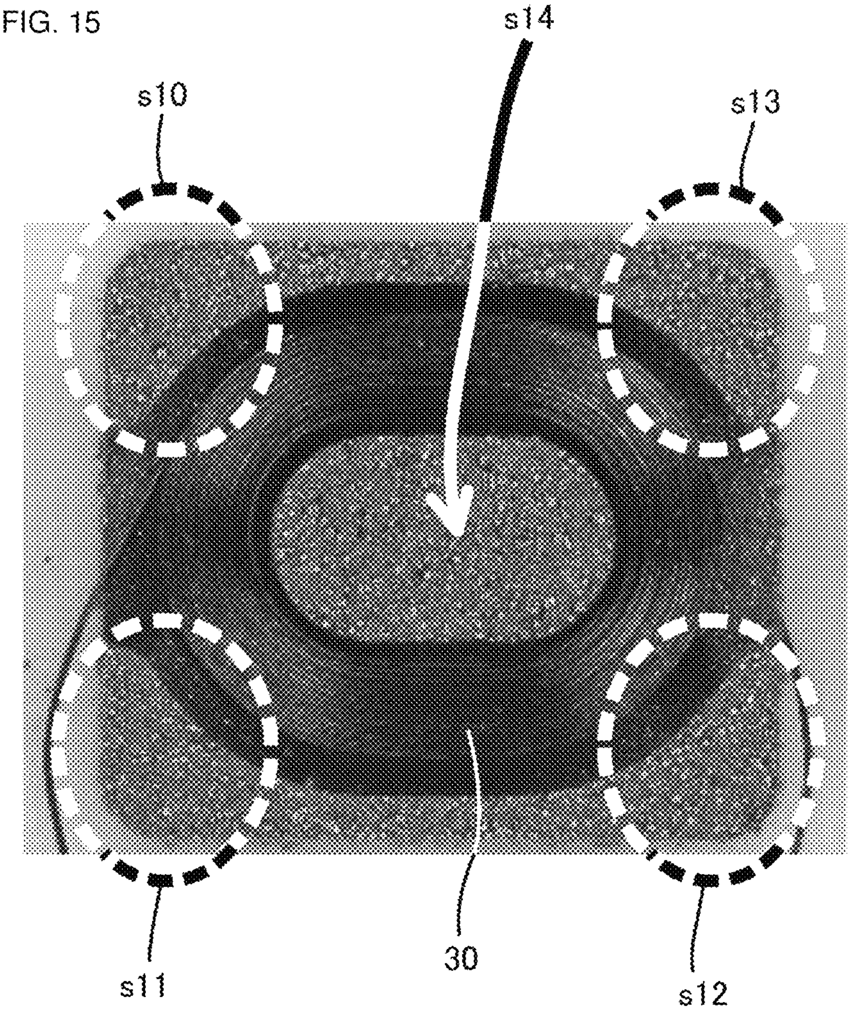
FIG. 15 is an image of voids in the surface and middle regions of a first tablet during the shaping and curing of a body.

FIG. 14 is an image from a coil 30 sandwiched between first and second tablets 70 and 72 as illustrated in FIG. 6, presenting a close-up of a region Ar around the coil 30 while being pressed in the direction of stacking. FIG. 15 is a cross-sectional image of the first tablet 70. As shown in FIG. 14, spaces s1, s2, and s3 are left alongside the coil 30. This indicates when the first and second tablets 70 and 72 are pressed in the direction of stacking, the powder mix fills the spaces in the outer region of the core first.

That is, outside the coil 30, the powder mix moves smoothly, spaces are filled easily, and, therefore, the density of packing tends to be high. Inside the coil 30, by contrast, the powder mix does not move smoothly, spaces are not filled easily, and, therefore, the density of packing tends to be low. The powder mix is therefore packed more densely in the outside s10 to s13 of the coil 30 than in the inside s14 of the coil 30 as in FIG. 15. As a result, the inductor 1 will have specific configuration 1.

Voids in the surface region of the body will affect the moisture resistance of the inductor because water in the air can come into the body through them. The voids will also accelerate the degradation of the body because plating solution can penetrate into the body through them during the formation of the outer electrodes. Increasing the density in the surface region of the body by this specific configuration helps prevent these problems.

Figure 16:
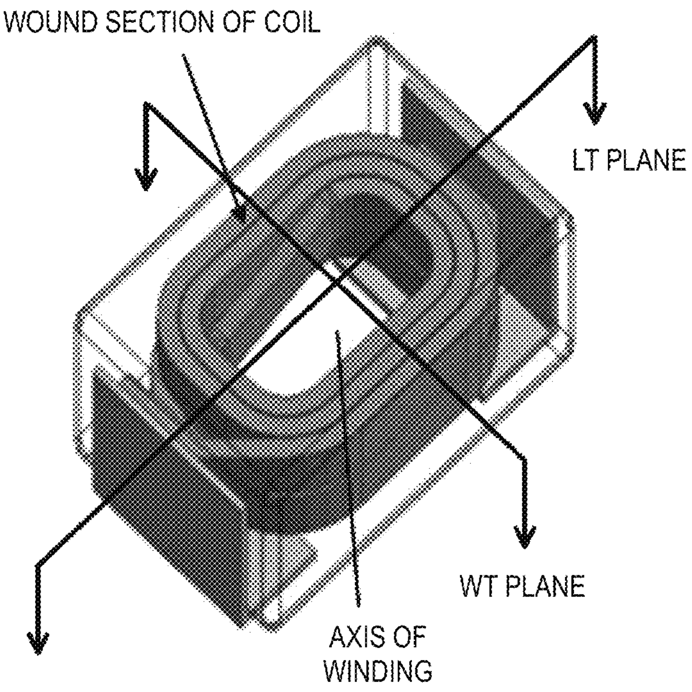
FIG. 16 is a diagram for the description of reference planes of an inductor.
Figure 17:
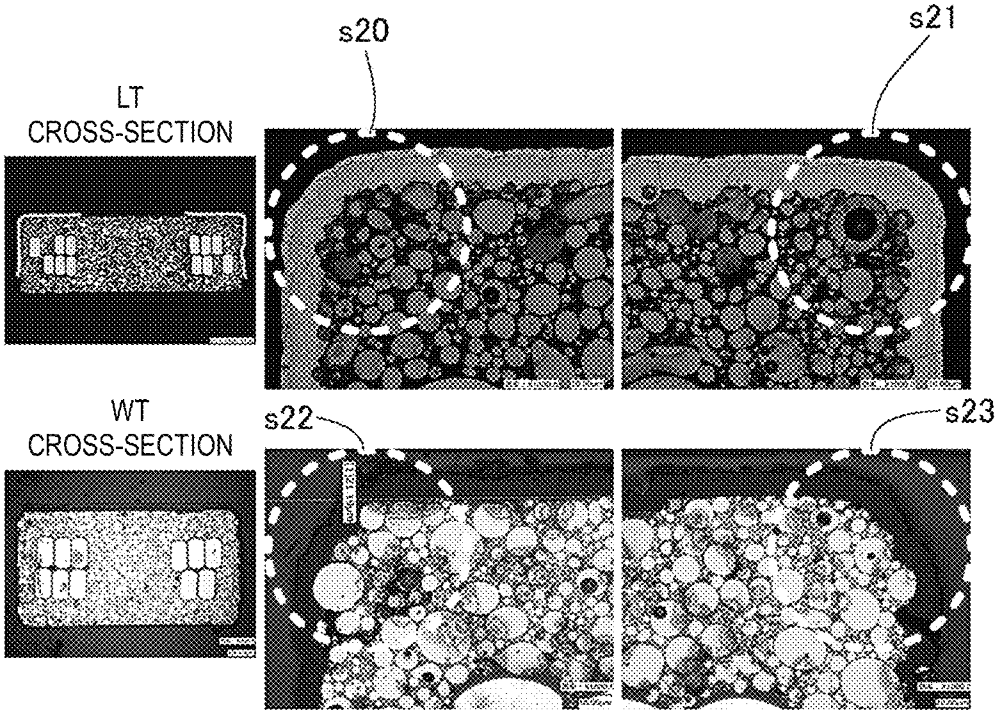
FIG. 17 presents images of resin packing beneath sides of a body.

FIG. 16 is a diagram for the description of the LT and WT planes, which are reference planes of the inductor 1. FIG. 17 presents LT and WT cross-sectional images of an inductor 1 made as illustrated in FIG. 16. As stated, the second side surfaces 18 of the body 10 are ground before the formation of the protective film. The first side surfaces 16, however, are not. Near the ridges s22 and s23 between a primary side (mount surface of the inductor 1 in the image) 12 and the second side surfaces 18, which are seen in the WT cross-sectional image, therefore, the soft magnetic powder is ground to be flush with the second side surfaces 18. The soft magnetic powder near the ridges s22 and s23 therefore becomes exposed over a large area, making the resin content near the ridges s22 and s23 smaller than that near the ridges s20 and s21 between a primary side 12 and the first side surfaces 16, which are seen in the LT cross-sectional image. As a result, the inductor 1 will have specific configuration 2. Specific configuration 2 helps prevent the inductor from losing its electrical insulation because of soft magnetic particles sticking out of the protective film; by virtue of the grinding (Step 400 in FIG. 5), there will be few protruding particles near the ridges between the primary sides 12 and the second side surfaces 18.

Figure 18:
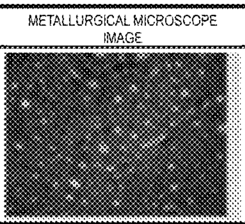
FIG. 18 is a summary of measured surface roughness of a body.
Figure 18:
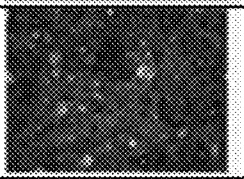
Figure 18:
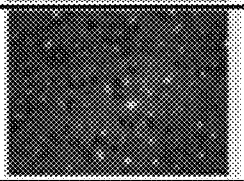
Figure 18:
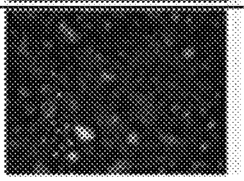

FIG. 18 is a tabulated representation of electron microscope images of the LT and WT surfaces after the shaping and curing and those after the grinding, along with the maximum heights of the surfaces. Maximum height Sz is a measure of surface roughness.

Greater Maximum Heights Sz Indicate Greater Surface Roughness.

In the grinding, the LT surfaces are scraped. Some of the first or second soft magnetic particles there are eliminated at the same time, increasing the roughness of the surfaces. The maximum height Sz of the LT surfaces (50 μm), therefore, becomes larger than that of the WT surfaces (43 μm), which are not ground. Increasing the roughness of the LT surfaces helps improve the adhesion between the protecting film and the core on these surfaces. The surface roughness in this context was determined by measuring the maximum height (Sz) longitudinally in the middle of the LT and WT surfaces using a 3D laser scanning microscope (Keyence VK-X250).

Figure 19:
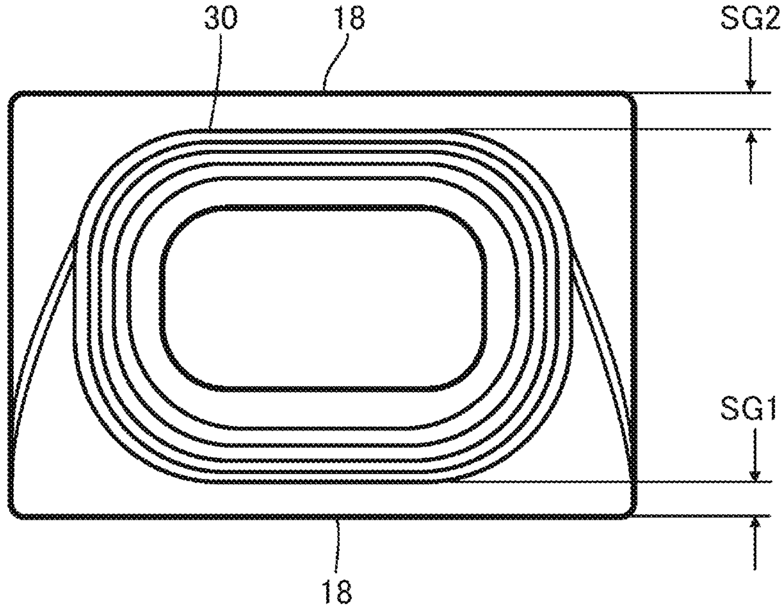
FIG. 19 is a diagram for the description of the distances between sides of a body and a coil.

In addition to this, the narrower of the distances SG1 and SG2 between the second side surfaces 18 and the coil 30, illustrated in FIG. 19, is set greater than the equivalent of about one first soft magnetic particle 81 and smaller than the equivalent of about four first soft magnetic particles 81. As a result, the inductor 1 will have specific configuration 3. Specific configuration 3 helps ensure the body is resistant to moisture even if small in size.

A-2-1. Embodiment with Resins According to the First Resin Formula

Sample bodies of inductors were prepared in the way as described above using a powder mix containing resins according to the first resin formula and tested. The shaping and curing were carried out at a temperature of 135° C. and with a pressure of 10 MPa.

Body Strength

Each sample was tested for strength by measuring load at failure in a three-point flexural test performed using a tester (Shimadzu AGS-5kNX universal precision tester). The sample was considered passing the test (Pass in tables) if the load at failure was 30 MPa or more, and failing (Fail in tables) if the load at failure was less than 30 MPa.

Density

The porosity of each sample was measured by detecting voids in a cross-sectional image and calculating the percentage of the total void area to the area of the cross-section.

Specifically, the sample body was cut at half its length, and the cross-section was imaged with a scanning electron microscope (SEM) set to a magnification of ×1000 at four points (one point per side) between 1 μm and 100 μm from the surface of the body. Then the voids in the cross-sectional images were measured, and the measurements were averaged. The porosity in the middle region of the body was also measured in the same way, by imaging the same cross-section at four points in the middle of the body with an SEM set to a magnification of ×1000, measuring the voids in the cross-sectional images, and averaging the measurements.

Excluding samples b4 to b8, b22, b23, and b27 (see the tables below), all sample bodies had a small average porosity across a total of eight points in the surface and middle regions. These sample bodies, furthermore, were denser in the surface region than in the middle region; the percentage of the void area in the surface region was smaller than that in the middle region.

Percentage of Resins in the Powder Mix

Figure 20:
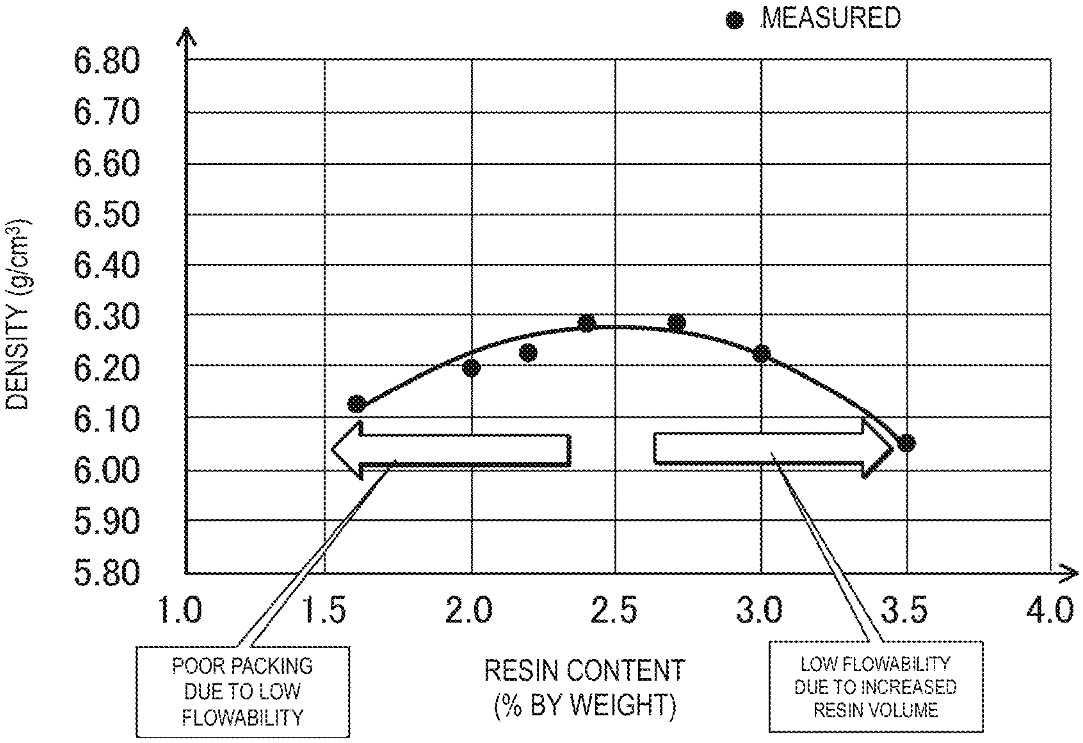
FIG. 20 is a diagram for the description of the relationship between the resin content of powder mix and the density of a body.

FIG. 20 is a graphical representation of the relationship between the resin content of the powder mix and the density of the body, with the density of the body (g/cm$^3$) on the vertical axis and the resin content (% by weight) of the powder mix on the horizontal axis. The body was shaped at a temperature of 180° C., with a pressure of 30 MPa, and for a duration of 100 seconds. In FIG. 20, the body has a reduced density when the resin content is smaller than about 2.0%. Presumably, the powder mix in this case was not packed densely when shaped into the body because of its low flowability.

TABLE 6

| | Resins contained | | | Test item |
|---|---|---|---|---|
| Sample No. | Bisphenol-A epoxy resin (% by weight) | Rubber-modified epoxy resin (% by weight) | Phenol-novolac epoxy resin (% by weight) | Body strength (flexural strength) |
| *b1 | 100 | 0 | 0 | Fail |
| b2 | 90 | 10 | 0 | Pass |
| b3 | 80 | 20 | 0 | Pass |
| b4 | 70 | 30 | 0 | Pass |
| b5 | 60 | 40 | 0 | Pass |
| b6 | 50 | 50 | 0 | Pass |
| *b7 | 40 | 60 | 0 | Fail |

The asterisked samples, b1 and b7, are comparative examples.

Based on the test results in Table 6, the inductor will have improved body strength when the powder mix has the following resin formula: about 50% by weight or more and about 90% by weight or less (i.e., from about 50% by weight to about 90% by weight) bisphenol-A epoxy resin and about 10% by weight or more and about 50% by weight or less (i.e., from about 10% by weight to about 50% by weight) rubber-modified epoxy resin (first resin formula).

A-2-2. Embodiment with Resins According to the Second Resin Formula

Sample bodies of inductors were prepared and tested in the same way as in the embodiment described in A-2-1 but using a powder mix containing resins according to the second resin formula. As in the embodiment in A-2-1, the percentage of resins in the powder mix was 2.0% by weight or more and 3.5% by weight or less (i.e., from 2.0% by weight to 3.5% by weight) of the powder mix.

TABLE 7

| | Resins contained | | | Test item |
|---|---|---|---|---|
| Sample No. | Bisphenol-A epoxy resin (% by weight) | Rubber-modified epoxy resin (% by weight) | Phenol-novolac epoxy resin (% by weight) | Body strength (flexural strength) |
| *b8 | 90 | 9 | 1 | Fail |
| b9 | 80 | 19 | 1 | Pass |
| b10 | 80 | 15 | 5 | Pass |
| b11 | 80 | 10 | 10 | Pass |
| b12 | 70 | 29 | 1 | Pass |
| b13 | 70 | 25 | 5 | Pass |
| b14 | 70 | 10 | 20 | Pass |
| b15 | 60 | 29 | 1 | Pass |
| b16 | 60 | 30 | 10 | Pass |
| b17 | 60 | 10 | 30 | Pass |
| b18 | 50 | 49 | 1 | Pass |
| b19 | 50 | 40 | 10 | Pass |
| b20 | 50 | 30 | 20 | Pass |
| b21 | 50 | 20 | 30 | Pass |
| *b22 | 50 | 10 | 40 | Fail |
| *b23 | 40 | 59 | 1 | Fail |
| b24 | 40 | 50 | 10 | Pass |
| b25 | 40 | 40 | 20 | Pass |
| b26 | 40 | 30 | 30 | Pass |
| *b27 | 40 | 20 | 40 | Fail |

The asterisked samples, b8, b22, b23, and b27, are comparative examples.

Based on the test results in Table 7, the inductor will have improved body strength when the powder mix has the following resin formula: about 40% by weight or more and about 80% by weight or less (i.e., from about 40% by weight to about 80% by weight) bisphenol-A epoxy resin, about 10% by weight or more and about 50% by weight or less (i.e., from about 10% by weight to about 50% by weight) rubber-modified epoxy resin, and about 1% by weight or more and about 30% by weight or less (i.e., from about 1% by weight to about 30% by weight) phenol-novolac epoxy resin (second resin formula).

A-2-3. Embodiment Regarding Side Gaps

To find the relationship between the distances (side gaps) SG1 and SG2 between the second side surfaces 18 and the coil 30, illustrated in FIG. 19, and the moisture resistance of the inductor 1, the samples listed in Tables 8 and 9 were prepared and tested for moisture resistance.

Moisture Resistance

Each sample was subjected to moisture resistance testing in a humidity chamber conditioned to a temperature of 85° C. and a humidity of 85%. The sample was considered passing the test (Pass in the tables) if the weight gain of the body associated with water absorption was 2% by weight or less, and failed (Fail in the tables) if the weight gain exceeded 2% by weight.

Powder Mix Specifications

The percentage of resins in the powder mix was 2.0% by weight or more and 3.5% by weight or less (i.e., from 2.0% by weight to 3.5% by weight), and the first resin formula was used. In the powder mix, the average diameter of the larger soft magnetic particles (first soft magnetic particles) was 21 μm (the samples in Table 8) or 28 μm (the samples in Table 9), and that of the smaller soft magnetic particles (second soft magnetic particles) was 2 μm.

The following describes the testing of samples b51 to b60, the samples listed in Table 8. Samples b54 to b60 are examples of an embodiment of the present disclosure, and samples b51 to b53 are comparative examples.

TABLE 8

| Average diameter of the larger particles, 21 μm; Average diameter of the smaller particles, 2 μm | | | | |
|---|---|---|---|---|
| Sample No. | Narrower side gap (μm) | Wider side gap (μm) | Inductance (μH) | Moisture resistance |
| *b51 | 0 | 110 | 0.412 | Fail |
| *b52 | 10 | 100 | 0.417 | Fail |
| *b53 | 18 | 92 | 0.420 | Fail |
| b54 | 25 | 85 | 0.423 | Pass |
| b55 | 29 | 81 | 0.424 | Pass |
| b56 | 33 | 77 | 0.425 | Pass |
| b57 | 40 | 70 | 0.427 | Pass |
| b58 | 45 | 65 | 0.428 | Pass |
| b59 | 50 | 60 | 0.429 | Pass |
| b60 | 55 | 55 | 0.429 | Pass |

The asterisked samples, b51, b52, and b53, are comparative examples.

Example Set A-2-3-1

Example A-2-3-11 (Sample b54)

A body was formed with a narrower side gap of 25 μm and a wider side gap of 85 μm. Test result: Passed the moisture resistance test.

Example A-2-3-12 (Sample b55)

A body was formed with a narrower side gap of 29 μm and a wider side gap of 81 μm. Test result: Passed the moisture resistance test.

Example A-2-3-13 (Sample b56)

A body was formed with a narrower side gap of 33 μm and a wider side gap of 77 μm. Test result: Passed the moisture resistance test.

Example A-2-3-14 (Sample b57)

A body was formed with a narrower side gap of 40 μm and a wider side gap of 70 μm. Test result: Passed the moisture resistance test.

Example A-2-3-15 (Sample b58)

A body was formed with a narrower side gap of 45 μm and a wider side gap of 65 μm. Test result: Passed the moisture resistance test.

Example A-2-3-16 (Sample b59)

A body was formed with a narrower side gap of 50 μm and a wider side gap of 60 μm. Test result: Passed the moisture resistance test.

Example A-2-3-17 (Sample b60)

A body was formed with equal side gaps of 55 μm. Test result: Passed the moisture resistance test.

Comparative Example Set A-2-3-1

Comparative Example A-2-3-11 (Sample b51)

A body was formed with a narrower side gap of 0 μm and a wider side gap of 110 μm. Test result: Failed the moisture resistance test.

Comparative Example A-2-3-12 (Sample b52)

A body was formed with a narrower side gap of 10 μm and a wider side gap of 100 μm. Test result: Failed the moisture resistance test.

Comparative Example A-2-3-13 (Sample b53)

A body was formed with a narrower side gap of 18 μm and a wider side gap of 92 μm. Test result: Failed the moisture resistance test.

Based on the test results in Table 8, with first soft magnetic particles having an average diameter of about 21 μm, the body is resistant to moisture when its smaller side gap is greater than the equivalent of about one first soft magnetic particle and smaller than the equivalent of about four first soft magnetic particles.

The following describes the testing of samples b61 to b70, the samples listed in Table 9. Samples b65 to b70 are examples of an embodiment of the present disclosure, and samples b61 to b64 are comparative examples.

TABLE 9

Average diameter of the larger particles, 28 μm; Average diameter of the smaller particles, 2 μm

| Sample No. | Narrower side gap (μm) | Wider side gap (μm) | Inductance (μH) | Moisture resistance |
|---|---|---|---|---|
| *b61 | 0 | 110 | 0.424 | Fail |
| *b62 | 10 | 100 | 0.430 | Fail |
| *b63 | 18 | 92 | 0.433 | Fail |
| *b64 | 25 | 85 | 0.436 | Fail |
| b65 | 29 | 81 | 0.437 | Pass |
| b66 | 33 | 77 | 0.439 | Pass |
| b67 | 40 | 70 | 0.440 | Pass |
| b68 | 45 | 65 | 0.441 | Pass |
| b69 | 50 | 60 | 0.442 | Pass |
| b70 | 55 | 55 | 0.442 | Pass |

The asterisked samples, b61, b62, b63, and b64, are comparative examples.

Example Set A-2-3-2

Example A-2-3-21 (Sample b65)

A body was formed with a narrower side gap of 29 μm and a wider side gap of 81 μm. Test result: Passed the moisture resistance test.

Example A-2-3-22 (Sample b66)

A body was formed with a narrower side gap of 33 μm and a wider side gap of 77 μm. Test result: Passed the moisture resistance test.

Example A-2-3-23 (Sample b67)

A body was formed with a narrower side gap of 40 μm and a wider side gap of 70 μm. Test result: Passed the moisture resistance test.

Example A-2-3-24 (Sample b68)

A body was formed with a narrower side gap of 45 μm and a wider side gap of 65 μm. Test result: Passed the moisture resistance test.

Example A-2-3-25 (Sample b69)

A body was formed with a narrower side gap of 50 μm and a wider side gap of 60 μm. Test result: Passed the moisture resistance test.

Example A-2-3-26 (Sample b70)

A body was formed with equal side gaps of 55 μm. Test result: Passed the moisture resistance test.

Comparative Example Set A-2-3-2

Comparative Example A-2-3-21 (Sample b61)

A body was formed with a narrower side gap of 0 μm and a wider side gap of 110 μm. Test result: Failed the moisture resistance test.

Comparative Example A-2-3-22 (Sample b62)

A body was formed with a narrower side gap of 10 μm and a wider side gap of 100 μm. Test result: Failed the moisture resistance test.

Comparative Example A-2-3-23 (Sample b63)

A body was formed with a narrower side gap of 18 μm and a wider side gap of 92 μm. Test result: Failed the moisture resistance test.

Comparative Example A-2-3-24 (Sample b64)

A body was formed with a narrower side gap of 25 μm and a wider side gap of 85 μm. Test result: Failed the moisture resistance test.

Based on the test results in Table 9, with first soft magnetic particles having an average diameter of about 28 μm, the body is resistant to moisture when its smaller side gap is greater than the equivalent of about one first soft magnetic particle and smaller than the equivalent of about four first soft magnetic particles.

A-2-4. Other Considerations

In the above embodiments, the resins contained in the powder mix are a bisphenol-A epoxy resin, a rubber-modified epoxy resin, and a phenol-novolac epoxy resin. The superordinate category of bisphenol-A epoxy resins is epoxy resins, and that of rubber-modified epoxy resins is flexible rubbers or resins.

Examples of resins that may potentially be used as an alternative to the bisphenol-A epoxy resin include bisphenol-A, -F, and -S phenoxy resins. Examples of resins or rubbers that may potentially be used as an alternative to the rubber-modified epoxy resin include urethane-modified, NBR (acrylonitrile butadiene rubber)-modified, and CTBN (carboxyl-terminated butadiene acrylonitrile) rubber-modified epoxy resins and CTBN rubber. Examples of resins that may potentially be used as an alternative to the phenol-novolac epoxy resin include cresol, dicyclopentadiene, phenol aralkyl, biphenyl, naphthol, xylylene, triphenylmethane, and tetrakisphenolethane epoxy resins if only novolac resins are considered. As for non-novolac resins, naphthalene, biphenyl, and triazine epoxy resins can be used.

B. Coil

The following describes the coil 30 component of an inductor 1 having a core 40 shaped from the powder mix of soft magnetic particles and resins described in A. Powder Mix.

Wire

The wire 31 that forms the coil 30 of the inductor 1 may be substantially round or may be substantially rectangular (in FIG. 3, it is substantially rectangular). Substantially rectangular wire 31 is easier to wind without space between portions thereof when forming the wound section 32.

The number of turns in the wound section 32 is selected according to the characteristics the inductor 1 should have.

Preferably, the wire 31 is copper wire 36.

In an inductor 1 measuring, for example, about 2.0 mm±about 0.2 mm in length L, about 1.2 mm±about 0.2 mm in width W, and about 0.7 mm±about 0.1 mm in thickness T, the dimensions of the wound section 32 of the coil 30 are about 0.4 mm in height and about 1.17 mm in outer diameter and about 0.55 mm in inner diameter, both in the direction of width W.

If the coil 30 is formed by substantially rectangular wire 31, the shorter side of its cross-section can be, for example, about 0.118 mm or less. Preferably, the shorter side of the cross-section measures about 0.052 mm or more.

The longer side of the cross-section of the substantially rectangular wire can be, for example, about 0.203 mm or less. Preferably, the longer side of the cross-section is about 0.141 mm or more.

The aspect ratio (longer side/shorter side) of the cross-section of the substantially rectangular wire can be, for example, between about 1.3 and about 3.4.

If the thickness T of an inductor 1 having the above dimensions is changed to about 0.55 mm±about 0.1 mm (or in a "low-profile" inductor 1), the dimensions of the wound section 32 of the coil 30 are, for example, about 1.17 mm in outer diameter and about 0.48 mm in inner diameter, both in the direction of width W, and about 0.30 mm in height. Wire 31 forming the coil 30 having such a wound section 32 of preferred size would be substantially rectangular wire having an aspect ratio (longer side/shorter side) of, for example, about 1.3 and a cross-section measuring about 0.11 mm along the shorter side and about 0.14 mm along the longer side.

Insulation Coating

The material for the coating layer 61 of the insulation coating 60 is not critical. Examples include polyurethane, polyester, epoxy, and polyimide-amide resins. Preferably, the coating layer 61 is made of polyimide-amide resin.

Preferably, the thickness of the coating layer 61 is about 4 μm.

As for the fuser layer 62 of the insulation coating 60, an example of a material is poly amide resin.

Preferably, the thickness of the fuser layer 62 is about 1 μm or more and about 25 μm or less (i.e., from about 1 μm to about 25 μm), more preferably about 2 μm or more and about 25 μm or less (i.e., from about 2 μm to about 25 μm), even more preferably about 2 μm or more and about 4 μm or less (i.e., from about 2 μm to about 4 μm).

Setting the thickness of the fuser layer 62 as such helps prevent shape defects in the coil 30. In that case the wound section 32 of the coil 30 will not be too large, but the bonding will be strong enough to prevent the outermost loops of the wound section 32 from disintegrating because of the springing back of the wire 31.

As stated, in the formation of the coil 30, the wire 31 is heated while it is wound. The fuser layer 62 melts, fastening together the portions of the wire 31 forming the wound section 32. The material for the fuser layer 62, therefore, can be selected so that the melting point of the layer will be, for example, about 180° C.

Such a melting point is close to the soldering temperature used when the finished inductor 1 is mounted on a printed circuit board by reflow soldering. The fuser layer 62, therefore, can melt during the reflow soldering again. The partial penetration into the body 10 and solidification there of the material for the fuser layer 62 that may usually be observed during the reflow soldering is not a problem. By virtue of its viscosity, the molten material for the fuser layer 62 will be confined to the vicinity of the coil 30.

If the side gaps Sg of the body 10 (distances between the coil 30 inside the body 10 and the second side surfaces 18) are about 50 μm or less, however, the material for the fuser layer 62 that melts during the reflow soldering can leach out through the second side surfaces 18.

If the body 10 is formed with second side surfaces thinner than about 50 μm or less, therefore, it is important that the fuser layer 62 not only have a melting point as specified above but also be made of a material having higher melt viscosity.

An example of such a material for the fuser layer 62 is one that contains multiple resins with different molecular weights. In general, resins have lower melt viscosity with decreasing molecular weight. Making the fuser layer 62 from a material containing multiple resins with different molecular weights, therefore, helps prevent the material for the fuser layer 62 from leaching out of the body 10 during the reflow soldering. The manufacturer in that case can adjust the melt viscosity of the fuser layer 62 by customizing the ratio by weight between the resins.

Such a material containing multiple resins with different molecular weights can be produced by, for example, mixing resins with different molecular weights together. Alternatively, it may be produced by polymerizing part of a resin of a low molecular weight in the presence of a catalyst or by depolymerizing a resin of a high molecular weight in the presence of a catalyst.

In an embodiment, the fuser layer 62 is made of, for example, two polyamides with different molecular weights.

C. Magnetic Paths

The following describes the structural relationship between the wire 31 forming the coil 30 and the magnetic powder forming the core 40 in an inductor 1 having a core 40 shaped from the powder mix of soft magnetic particles and resins described in A. Powder Mix. The wire 31 is substantially rectangular one.

C-1. Magnetic Powder Between Loops

Made of a soft magnetic powder formed by magnetic metal particles, the inductor 1 achieves better characteristics under applied DC current than if made of ferrite or similar magnetic materials.

Figure 21A:
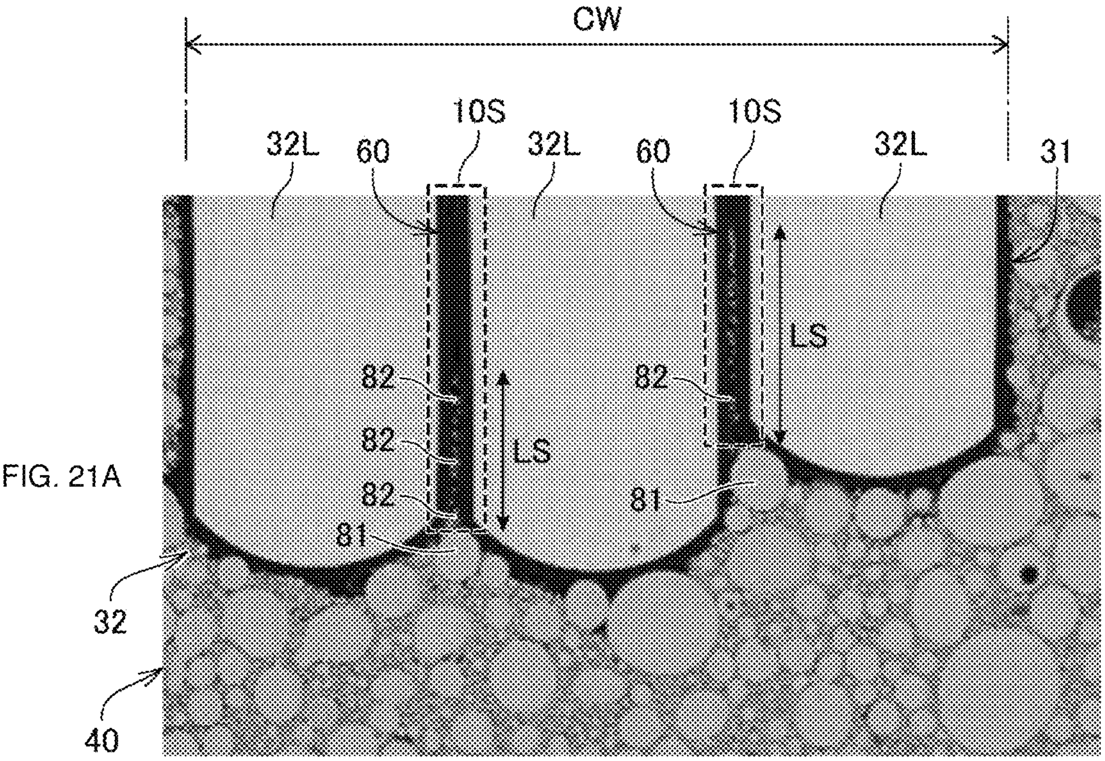
FIGS. 21A and 21B are images of lower and upper loops, respectively, of a coil together with materials therearound.
Figure 21B:
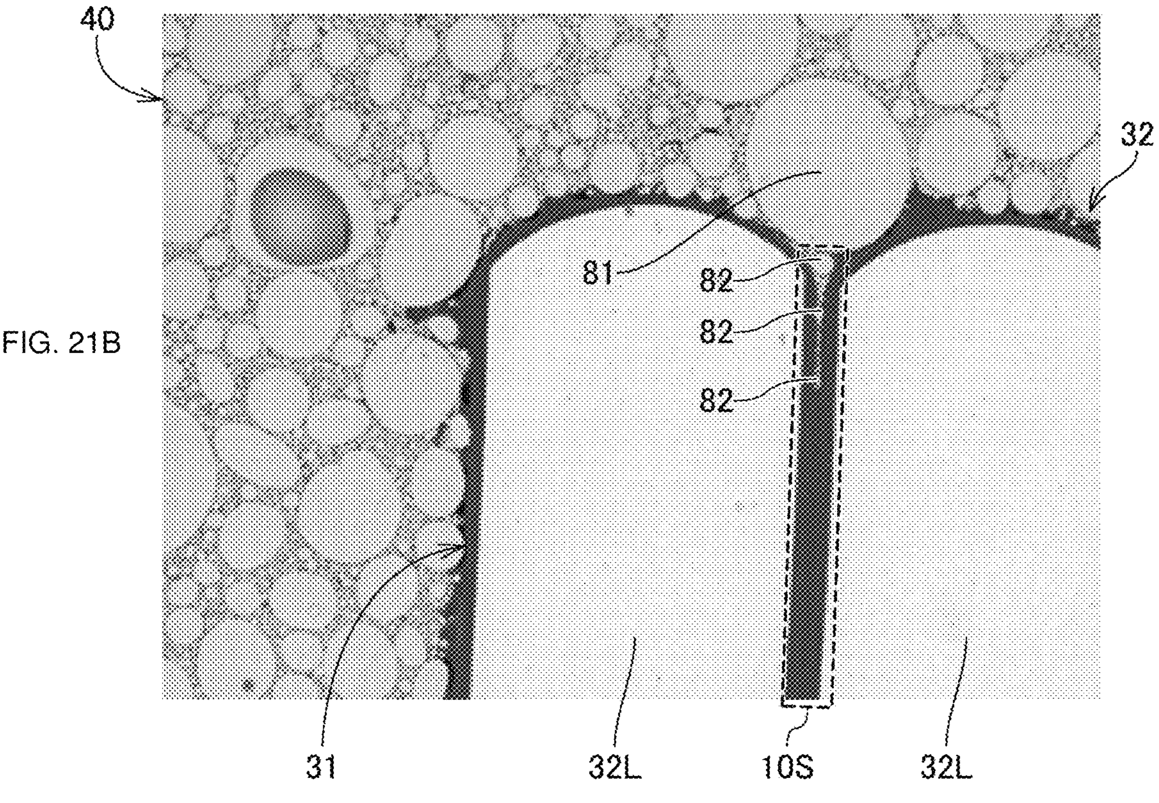

FIG. 21A is an image of the lower loops 32L of the coil 30 together with the materials therearound, and FIG. 21B is an image of the upper loops 32L of the coil 30 together with the materials therearound. In FIGS. 21A and 21B, the vertical direction of the image corresponds to the direction of thickness of the body 10, and the horizontal direction of the image corresponds to the radial direction with respect to the wound section 32. The length CW represents the coil width of the wound section 32.

In this configuration, as in FIGS. 21A and 21B, a subset of the second soft magnetic particles 82, which are the smaller particles, are between loops 32L. The subset of the second soft magnetic particles 82 is in the region 10S near the outside of the wound section 32. The second soft magnetic particles 82 present in this region 10S help prevent local saturation of magnetic flux density by creating magnetic paths near the loops 32L along the flow of the magnetic flux. In this configuration, the second soft magnetic particles 82 in this configuration also penetrate near the inside of the wound section 32 (not seen in the images). Their presence, however, is not limited to near the outside or inside of the wound section 32; the only requirement is that a subset of the second soft magnetic particles 82 be between loops 32L as described below. This structure, having second soft magnetic particles 82 between loops 32L, is hereinafter referred to as the powder-between-loops structure.

The following describes the powder-between-loops structure.

As in FIGS. 21A and 21B, the soft magnetic powder includes larger first soft magnetic particles 81 and smaller second soft magnetic particles 82.

The space between loops 32L is narrow, allowing the smaller, second soft magnetic particles 82 to enter while not allowing the larger, first soft magnetic particles 81 to enter. The second soft magnetic particles 82 have been formed to an average diameter smaller than the thickness of the fuser layer 62 on the loops 32L. By virtue of this, the second soft magnetic particles 82 can penetrate near the fuser layer 62 easily.

In this configuration, the compression molding for shaping and curing the powder mix containing first and second soft magnetic particles 81 and 82 into the body 10 with the coil 30 therein is carried out with a pressure P higher than usual to encourage the second soft magnetic particles 82 to penetrate between the loops 32L. The heating in the compression molding, furthermore, melts the fuser layer 62 in the insulation coating 60 on the surface of the loops 32L so that the second soft magnetic particles 82 can penetrate easily.

Figure 22:
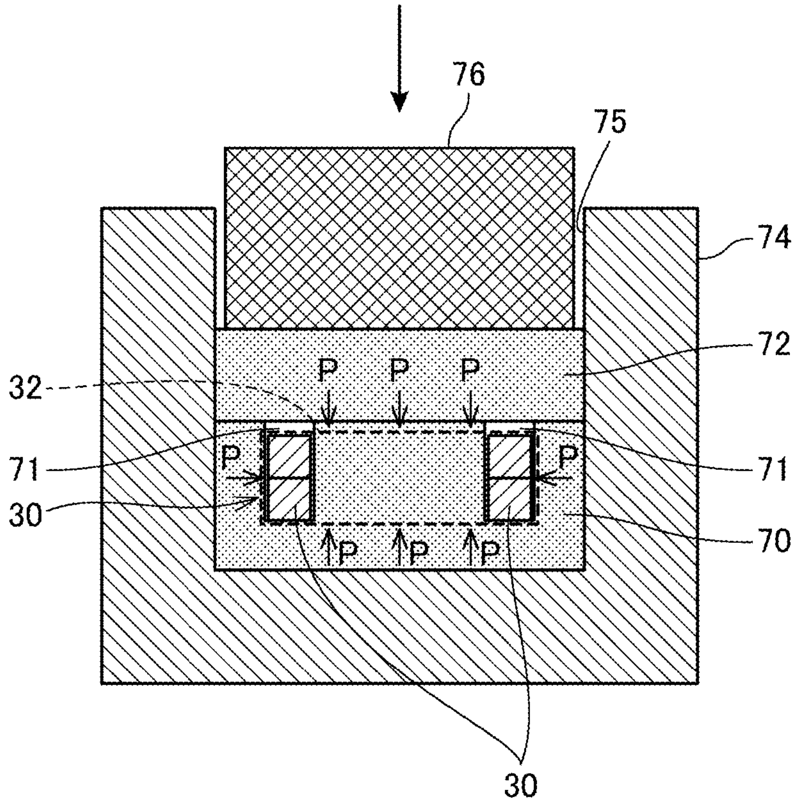
FIG. 22 is a diagram provided for the description of pressure applied during the shaping of a body.

More specifically, when pressure P acts from above as illustrated in FIG. 22, the wound section 32 of the coil 30 and its surroundings are exposed not only to the pressure P from above but also to pressure P from below and in the horizontal direction, for example because of the law of action and reaction. Pressure is therefore applied to the second soft magnetic particles 82 in the direction from the outside of the coil 30 to its loops 32L, helping the second soft magnetic particles 82 fill the gaps between the loops 32L.

The pressure P parameters may include not only the pressure P itself but also the duration of compression and other relevant parameters. Selecting appropriate parameters helps the second soft magnetic particles 82 fill the gaps between the loops 32L well. Other parameters, such as the heating conditions and the distance between the wound section 32 and the surrounding walls (the inner surfaces of the mold 74 and the punch 76), may also be customized to further encourage the filling of the gaps between the loops 32L with the second soft magnetic particles 82.

Introducing the second soft magnetic particles 82 between the loops 32L as in FIGS. 21A and 21B helps improve characteristics under applied DC current as it will prevent local saturation of magnetic flux density near the wound section 32.

The following describes the length LS of the second soft magnetic particles 82 between the loops 32L.

This length LS corresponds to the length of contact between the portions of the coil 30 forming the loops 32L and the second soft magnetic particles 82.

The inventors performed a study to determine the saturation current Isat with different lengths LS of the second soft magnetic particles 82 between the loops 32L with the following parameters: the line width of the loops 32L of the coil 30, 95 μm; the thickness of the loops 32L of the coil 30, 180 μm; the thickness of the fuser layer 62 between the loops 32L of the coil 30, 6 μm; the average diameter of the first soft magnetic particles 81, 10 μm or more; the average diameter of the second soft magnetic particles 82, 5 μm or less; pressure P, 300 kg/$cm^2$.

The saturation current Isat is the electric current at which the inductance decreases by a certain percentage from the initial inductance, or the inductance with no applied current, and is a measure of the maximum current that can be passed while avoiding magnetic saturation. The saturation current Isat was defined as the electric current at which the inductance decreases by about 30% from the initial inductance. The results are presented in Table 10.

TABLE 10

| | Length LS of second soft magnetic particles between loops | Isat |
|---|---|---|
| Comparative Example CK-1 | (no magnetic powder) | 100 |
| Comparative Example CK-2 | 5% of the length of contact between wires | 100.07 |
| Example C1-1 | 10% of the length of contact between wires | 100.14 |
| Example C1-2 | 50% of the length of contact between wires | 100.7 |
| Comparative Example CK-3 | 55% of the length of contact between wires | 100.77 |

Comparative Example CK-1 was an example in which the length LS of the second soft magnetic particles 82 between the loops 32L was zero in a cross-section of the portions of the coil 30 forming the loops 32L (e.g., the WT cross-section), i.e., there were no second soft magnetic particles 82 between the loops 32L. Comparative Example CK-2 was an example in which the length LS was 5% of the length of contact between the loops 32L in a cross-section of the coil, or, in other words, 5% of the length over which portions of the wire 31 forming the coil are in contact with each other in a cross-section of the coil. The proportion of the length LS of the second soft magnetic particles 82 between the loops 32L to the length of contact between the loops 32L was defined as (the total length LS of the second soft magnetic particles 82 between all loops 32L)/(the total length of contact between all loops 32L) in an image of the WT cross-section of the body 10 at the midpoint of its length L.

Example C1-1 represents a case in which the length LS is about 10% of the length of contact between the portions of the wire 31 in a cross-section of the coil. Example C1-2 represents a case in which the length LS is about 50% of the length of contact between the portions of the wire 31 in a cross-section of the coil. Comparative Example CK-3 represents a case in which the length LS is about 55% of the length of contact between the portions of the wire 31 in a cross-section of the coil. The saturation currents Isat in the table assume that the Isat in Comparative Example CK-1 is 100.

In the study conducted by the inventors, the saturation current Isat was large compared with that with a zero length LS when the LS was 10% or more of the length of contact between portions of the wire 31 in a cross-section of the coil. It is, therefore, preferred that the length LS be about 10% or more of the length of contact between portions of the wire 31. A length LS exceeding about 55% of the length of contact between portions of the wire 31 in a cross-section of the coil, however, can cause the loops 32L to disintegrate easily because of cracks in the fuser layer 62 joining the loops 32L together.

In light of these, the inventors have concluded if the manufacturer aims at the control of magnetic saturation and the resulting improvement in the characteristics under applied DC current, it is preferred that the length LS be about 10% or more of the length of contact between portions of the wire 31 in a cross-section of the coil. If the separation of loops 32L is also a concern, it is preferred that the length LS be about 10% or more and about 50% or less (i.e., from about 10% to about 50% or less) of the length of contact between portions of the wire 31 in a cross-section of the coil. Overall, it is preferred that the length LS be selected within the range of about 10% to about 50% of the length of contact between the portions of the wire 31 in a cross-section of the coil.

Figure 23:
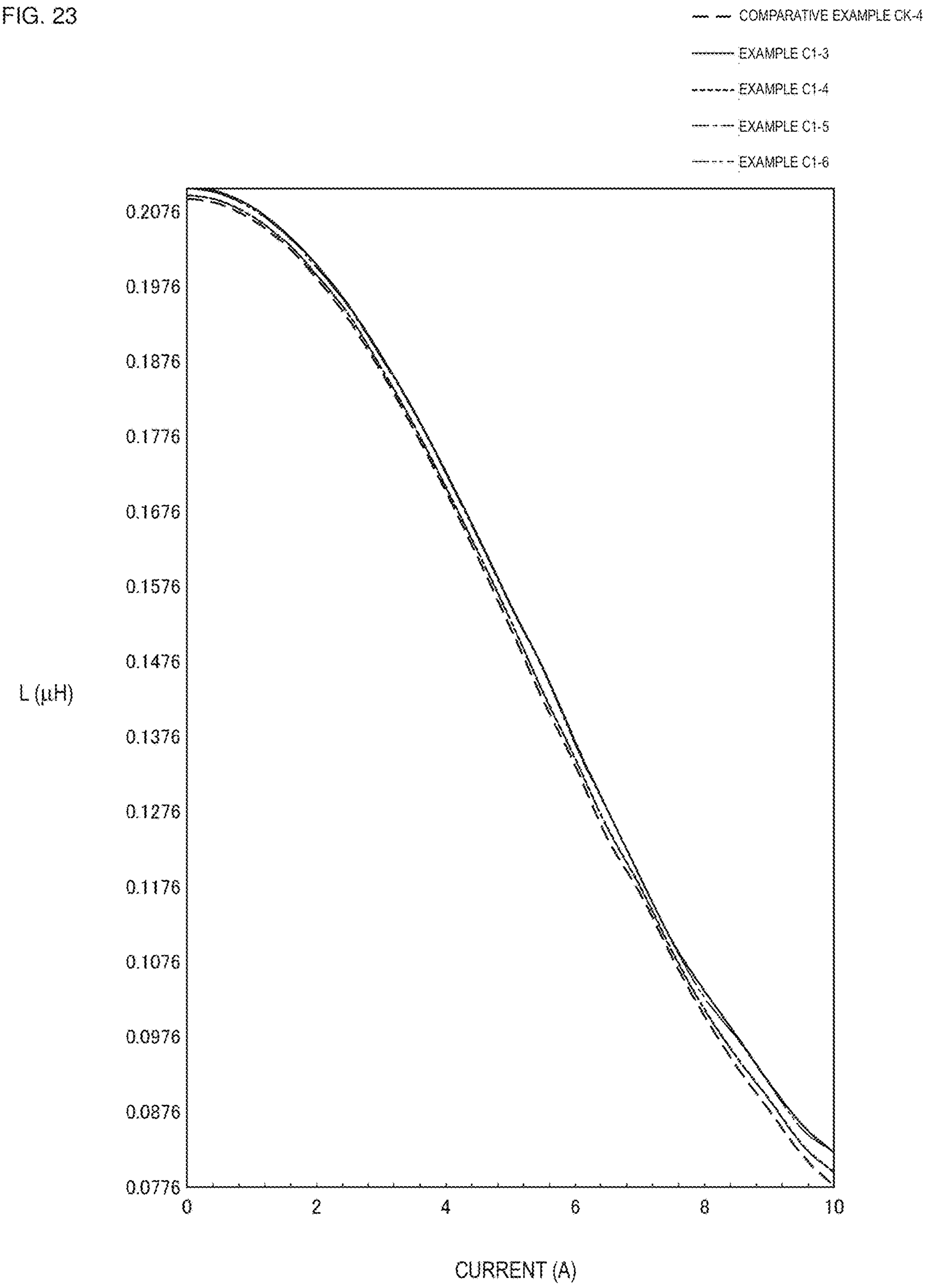
FIG. 23 presents simulated characteristic curves of a "powder-between-loops" structure.

FIG. 23 presents simulated characteristic curves of the powder-between-loops structure.

In FIG. 23, the horizontal axis indicates electric current, and the vertical axis indicates inductance (L). In FIG. 23, Comparative Example CK-4 represents a case in which no powder-between-loops structure is formed; there are no second soft magnetic particles 82 between the upper and lower tiers of the two-tier wound section 32, between the upper loops 32L, and between the lower loops 32L.

Example C1-3 represents a case in which some second soft magnetic particles 82 are present between the upper and lower tiers of the wound section 32, between the upper loops 32L, and between the lower loops 32L. The penetrating second soft magnetic particles 82 exist throughout the gaps in these regions.

Example C1-4 represents a case in which the penetrating second soft magnetic particles 82 are confined to the space between the outermost loops of the upper and lower tiers of the wound section 32, the upper half of the gaps between the upper loops 32L, and the lower half of the gaps between the lower loops 32L.

Example C1-5 represents a case in which the penetrating second soft magnetic particles 82 are present in the upper half of the gaps between the upper loops 32L and the lower half of the gaps between the lower loops 32L.

Example C1-6 represents a case in which the penetrating second soft magnetic particles 82 are present between the upper loops 32L and between the lower loops 32L, existing throughout the gaps in these regions.

Table 11 presents simulated initial inductance (initial L) and saturation current Isat in Comparative Example CK-4 and Examples C1-3 to C1-6. The parameters such as the line width and thickness of the coil 30 and the thickness of the fuser layer 62 are the same as in Table 10.

TABLE 11

| | Position of the magnetic powder between loops | Initial L | Lsat |
|---|---|---|---|
| Comparative Example CK-4 | (no magnetic powder) | 0.21 | 5.28 |
| Example C1-3 | All gaps between the upper and lower tiers, between the upper loops, and between the lower loops | 0.21 | 5.44 |
| Example C1-4 | The space between the outermost loops of the upper and lower tiers, the upper half of the gaps between the upper loops, and the lower half of the gaps between the lower loops | 0.21 | 5.32 |
| Example C1-5 | The upper half of the gaps between the upper loops and the lower half of the gaps between the lower loops | 0.21 | 5.32 |
| Example C1-6 | All gaps between the upper loops and between the lower loops | 0.21 | 5.44 |

As shown in FIG. 23, Examples C1-3 to C1-6 achieved high inductance compared with Comparative Example CK-4 in a broad range of electric currents, from 0 A to 10 A, indicating controlled magnetic saturation and the resulting improvement in the characteristics under applied DC current. As is clear from Table 11, furthermore, Examples C1-3 to C1-6 were superior to Comparative Example CK-4 in terms of saturation current Isat, too.

Examples C1-3 and C1-6, furthermore, were equally good in terms of characteristics (inductance and saturation current Isat) and achieved even higher inductance than Examples C1-4 and C1-5. A similarity between Examples C1-3 and C1-6 is that the penetrating second soft magnetic particles 82 are present between the upper loops 32L and between the lower loops 32L; presumably, this is advantageous in the control of magnetic saturation and the resulting improvement in the characteristics under applied DC current.

Overall, the core 40, with an embedded coil 30 therein, contains larger first soft magnetic particles 81 and smaller second soft magnetic particles 82, and a subset of the second soft magnetic particles 82 penetrate between the loops 32L of the coil 30 to create magnetic paths near the loops 32L. By virtue of this, local saturation of magnetic flux density is controlled even if the magnetic particles are ones that deliver good characteristics under applied DC current.

Setting the length LS of the second soft magnetic particles 82 between the loops 32L to about 10% or more of the length of contact between portions of the wire 31 in a cross-section of the coil, furthermore, will provide more effective control of the local saturation of magnetic flux density, or magnetic saturation, than when the length LS is less than about 10% of the length of contact between portions of the wire 31.

Setting the length LS of the second soft magnetic particles 82 between the loops 32L to about 50% or less of the length of contact between portions of the wire 31 in a cross-section of the coil helps avoid the separation between loops 32L caused by cracks in the fuser layer 62 joining the loops 32L together.

Adjacent loops 32L are joined together by a fuser agent supplied from the fuser layer 62, and the second soft magnetic particles 82 are formed to an average diameter smaller than the thickness of the fuser layer 62 so that a subset thereof will penetrate into the fuser layer 62 and create magnetic paths between the loops 32L. This helps control magnetic saturation effectively because the creation of magnetic paths between the loops 32L taking place simultaneously with the joining of adjacent loops 32L contributes to efficiency.

The penetration of a subset of the second soft magnetic particles 82 between the loops 32L, furthermore, is achieved by adjusting at least the pressure P when the materials for the core 40 (such as first and second soft magnetic particles 81 and 82) and the coil 30 are shaped into the body 10 by compression molding. It is therefore easy to create the magnetic paths between the loops 32L.

The customization of pressure P parameters, heating conditions, etc., is not the only possible way to make a subset of the second soft magnetic particles 82 penetrate between the loops 32L. Approaches may be combined to encourage some second soft magnetic particles 82 to penetrate between the loops 32L, such as adjusting the diameters of the first and second soft magnetic particles 81 and 82, adjusting the lubricity of the surface layers between the particles 81 and 82, and selecting appropriate resins.

If the coil 30 has a multitiered wound section 32 (having two or more tiers) formed by one continuous length of wire 31, it is preferred that there be a subset of the second soft magnetic particles 82 between the uppermost and/or lowermost loops 32L. This is an easy way to create magnetic paths effective in controlling magnetic saturation.

As long as a subset of the second soft magnetic particles 82 penetrate between the loops 32L, the materials for the core 40 or their amounts may be changed, and the shape of the coil 30, for example, may be changed. The penetration of a subset of second soft magnetic particles 82 between the loops 32L, furthermore, does not need to take place during the shaping and curing; it may be induced whenever possible.

The coil 30 does not need to be wound by α winding either. For example, the coil 30 may be wound edgewise. Even with edgewise or other winding techniques, effective control of magnetic saturation is easy to achieve as long as second soft magnetic particles 82 create magnetic paths between adjacent loops 32L joined together by the fuser layer 62.

C-2. Magnetic Gap

The inductor 1 may have a magnetic gap near the wound section 32 of the coil 30 to further control the saturation of the magnetic flux density near the wound section 32.

Figure 24:
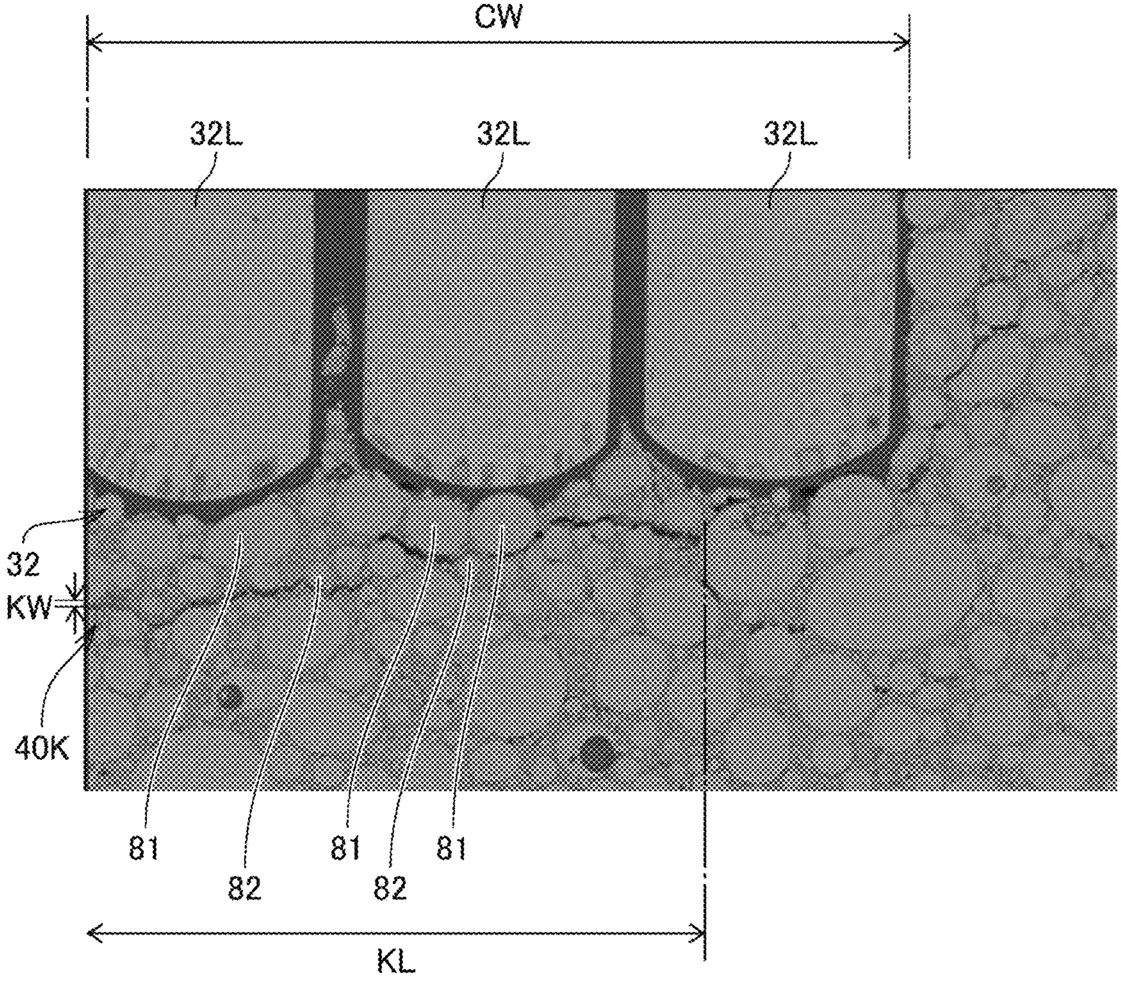
FIG. 24 is an image of the vicinity of a wound section with an air gap that serves as a magnetic gap.

FIG. 24 is an image of the vicinity of the wound section 32 with an air gap 40K that serves as a magnetic gap.

The air gap 40K extends along a row of loops 32L and substantially perpendicular to the magnetic flux. The creation of the air gap 40K takes place during the shaping and curing. To be more exact, air gaps 40K like that in FIG. 24 are created around the wound section 32 of the coil 30 by utilizing the springing back of (repulsive force in) the materials for the core, such as the first and second soft magnetic particles 81 and 82. In the shaping and curing, pressure P is applied horizontally and vertically to the coil 30 to compress the core materials, such as the first and second soft magnetic particles 81 and 82, near the wound section 32 of the coil 30 as illustrated in FIG. 22. Then the core materials are allowed to spring back, for example by quick retraction of the punch 76 quickly or removal of the body 10 from the mold before the core materials harden completely.

The springing back includes at least the repulsion between first soft magnetic particles 81, between second soft magnetic particles 82, or between first and second soft magnetic particles 81 and 82. Air gaps 40K that will serve as magnetic gaps are created by utilizing one or more of these types of repulsion as needed. The springing back may include the repulsion between the coil 30 and the core 40 (first and second soft magnetic particles 81 and 82).

In other words, compression molding carried out with appropriate adjustments to parameters, such as the pressure P, the rate and duration of pressing, the speed of retraction of the punch 76, and when the body 10 is removed, will create air gaps 40K that extend around and along the rows of loops 32L. Air gaps 40K that will serve as magnetic gaps are therefore easy to create, and these air gaps 40K help control the saturation of the magnetic flux density near the wound section 32 of the coil 30 and thereby improve the characteristics under applied DC current.

The following describes the position, length, and width of the air gaps 40K.

The inventors performed a study to determine the saturation current Isat with different positions, lengths, and widths of air gaps 40K with the following parameters: the line width of the loops 32L of the coil 30, 95 μm; the thickness of the loops 32L of the coil 30, 180 μm; the thickness of the fuser layer 62 on the loops 32L of the coil 30, 4 μm; the average diameter of the first soft magnetic particles 81, 10 μm or more; the average diameter of the second soft magnetic particles 82, 5 μm or less; pressure P, 300 $kg/cm^2$. The saturation current Isat was defined as the electric current at which the inductance decreases by about 30% from the initial inductance.

Table 12 presents the study results with regard to the position of the air gaps 40K. The saturation currents Isat in Table 12 assume that the Isat is 100 when the air gaps 40K are 11 μm away from the wound section 32.

TABLE 12

| Position of the airgaps | Isat |
|---|---|
| 0 μm from the wound section | 67 |
| 1 μm from the wound section | 70 |
| 2 μm from the wound section | 73 |
| 3 μm from the wound section | 76 |
| 4 μm from the wound section | 79 |
| 5 μm from the wound section | 82 |
| 6 μm from the wound section | 85 |
| 7 μm from the wound section | 88 |
| 8 μm from the wound section | 91 |
| 9 μm from the wound section | 94 |
| 10 μm from the wound section (equivalent of the average diameter of the first soft magnetic particles) | 97 |
| 11 μm from the wound section | 100 |
| 15 μm from the wound section | 113 |
| 20 μm from the wound section (equivalent of double the average diameter of the first soft magnetic particles) | 130 |
| 30 μm from the wound section (equivalent of three times the average diameter of the first soft magnetic particles) | 130 |
| 40 μm from the wound section (equivalent of four times the average diameter of the first soft magnetic particles) | 113 |
| 50 μm from the wound section (equivalent of five times the average diameter of the first soft magnetic particles) | 100 |

As shown in Table 12, when the air gaps 40K were 30 μm away from the wound section 32 or closer, the saturation current Isat increased with increasing distance between the air gaps 40K and the wound section 32. When the air gaps 40 were more than 50 μm away, the Isat was below 100. In the study conducted by the inventors, therefore, the air gaps 40K were effective in controlling magnetic saturation when they were 50 μm away from the wound section 32 or closer. In other words, for the control of magnetic saturation, it is preferred that the distance between the air gaps 40K and the wound section 32 be equal to or smaller than about five times the average diameter of the first soft magnetic particles 81. More preferably, the air gaps 40K are in the range of about 20 μm to about 30 μm away from the wound section 32.

Table 13 presents the study results with regard to the length KL (see FIG. 24) of the air gaps 40K. The saturation currents Isat in Table 13 assume that the Isat is 100 when the length KL of the air gaps 40K is 10% of the coil width CW of the wound section 32 (FIG. 24).

TABLE 13

| Length of the air gaps | Isat |
|---|---|
| 10% of the coil width of the wound section | 100 |
| 20% of the coil width of the wound section | 102 |
| 30% of the coil width of the wound section | 103 |
| 40% of the coil width of the wound section | 105 |
| 50% of the coil width of the wound section | 107 |
| 60% of the coil width of the wound section | 109 |

TABLE 13-continued

| Length of the air gaps | Isat |
|---|---|
| 70% of the coil width of the wound section | 111 |
| 80% of the coil width of the wound section | 113 |
| 90% of the coil width of the wound section | 114 |
| 100% of the coil width of the wound section | 116 |
| 110% of the coil width of the wound section | 118 |

As shown in Table 13, when the length KL of the air gaps 40K was equal to or smaller than 110% of the coil width CW of the wound section 32, the saturation current Isat increased with longer air gaps 40K. In the study conducted by the inventors, the air gaps 40K were effective in controlling magnetic saturation when their length KL was equal to or larger than the width of a single loop 32L (33% or more of the coil width CW).

Air gaps 40K whose length KL is much greater than the coil width CW, or, more specifically, exceeds about 110% of the coil width CW, can affect inductance.

The inventors have therefore concluded it is preferred that the length KL of the air gaps 40K be roughly equal to or larger than the width of a single loop 32L (about 33% or more of the coil width CW of the wound section 32) and about 110% or less of the coil width CW of the wound section 32. More preferably, the length of the air gaps 40K is equal to or larger than about 1.5 times the width of a single loop 32L (about 50% or more of the coil width CW of the wound section 32) and roughly equal to or smaller than (about 100% or less of) the coil width CW of the wound section 32.

Table 14 presents the study results with regard to the width KW (see FIG. 24) of the air gaps 40K. The width KW corresponds to the length of the air gaps 40K in the direction perpendicular to the rows of loops 32L. The saturation currents Isat in Table 14 assume that the Isat is 100 when the width KW of the air gaps 40K is less than 1 μm, which is smaller than the diameter of the smallest particles (defined as there being no air gap).

TABLE 14

| Width of the air gaps | Isat |
|---|---|
| Smaller than the smallest particles | 100 |
| 1 μm | 103 |
| 2 μm | 107 |
| 3 μm | 111 |
| 4 μm | 114 |
| 5 μm | 118 |
| 6 μm | 122 |
| 7 μm | 126 |
| 8 μm | 131 |
| 9 μm | 135 |
| 10 μm | 140 |
| 11 μm | 140 |

As shown in Table 14, when the width KW of the air gaps 40K was 10 μm or less, the saturation current Isat increased with increasing width KW. Widths KW of 10 μm and 11 μm resulted in equal Isat values. When the width KW of the air gaps 40K exceeded about 11 μm, which means the width KW was larger than the average diameter of the first soft magnetic particles 81, the body 10 easily cracked along the air gaps 40K because of weakened adhesion of the resins to the first soft magnetic particles 81.

It is, therefore, preferred that the width KW of the air gaps 40K be roughly equal to or larger than the average diameter of the second soft magnetic particles 82 (about 5 μm) and about 11 μm or less, more preferably as close to about 10 μm as can be without causing cracks in the body 10.

Figure 25:
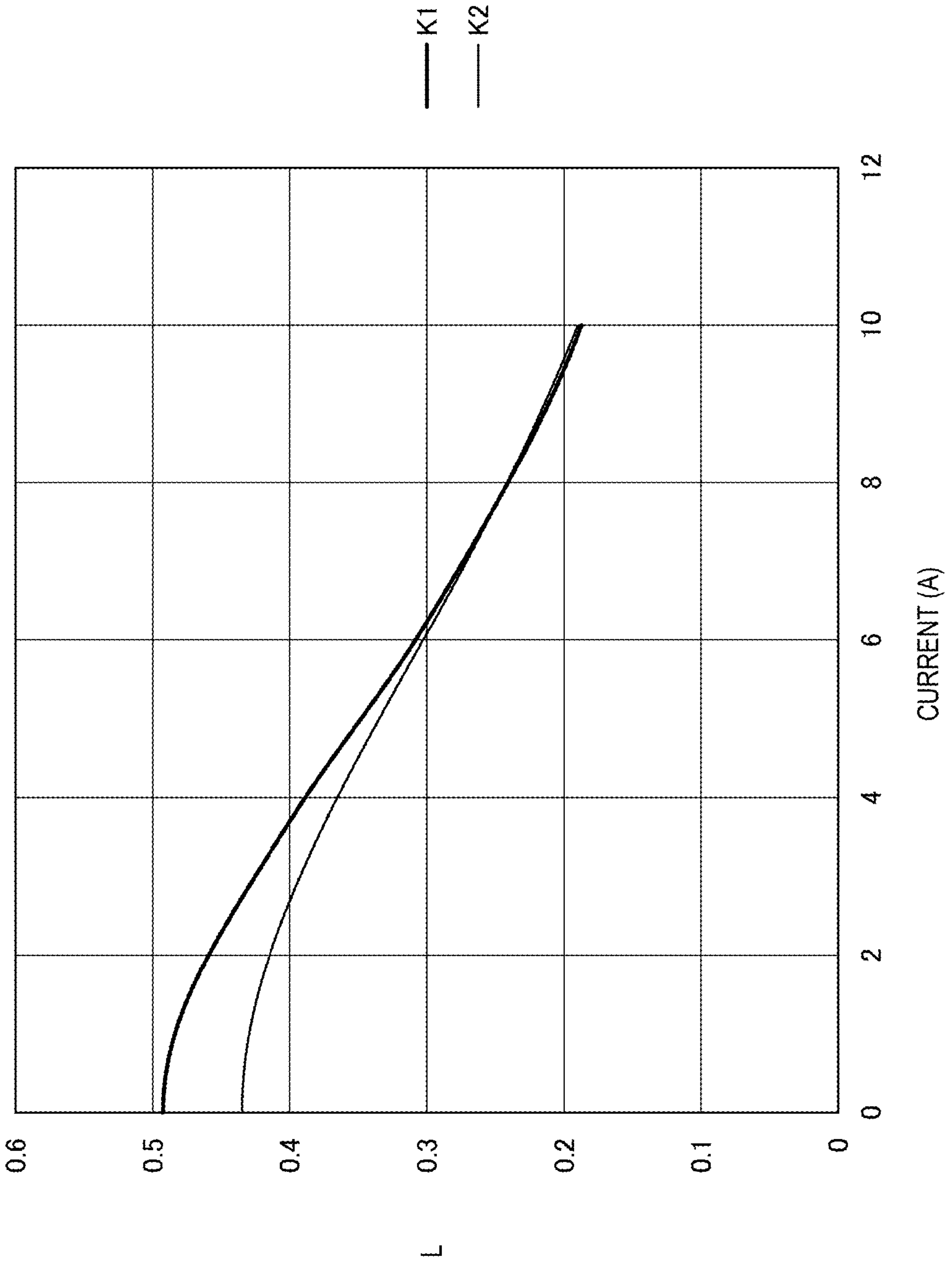
FIG. 25 presents simulated characteristic curves with and without air gaps.

FIG. 25 presents simulated characteristic curves with and without air gaps 40K. In FIG. 25, the horizontal axis indicates electric current, and the vertical axis indicates inductance (L). Curve K1 is from a simulation without air gaps 40K, and curve K2 is from a simulation with air gaps 40K extending above and below and inside and outside the wound section 32 of the coil 30 both longitudinally and transversely with respect to the wound section 32.

Table 15 presents simulated initial inductance (initial L) and saturation current Isat for each of curves K1 and K2. The parameters such as the line width and thickness of the coil 30 and the thickness of the fuser layer 62 are the same as in Tables 10 and 11.

TABLE 15

| | Air gaps (magnetic gaps) | Initial L | Isat |
|---|---|---|---|
| Curve K1 (comparative example) | No air gaps around the wound section | 0.49 | 5.06 |
| Curve K2 (example) | Air gaps present around the wound section | 0.43 | 5.92 |

As shown in FIG. 25 and Table 15, the simulation revealed magnetic saturation is controlled better with air gaps 40K than without them, particularly when the electrical current is in a range of about 0 A to about 6 A.

Overall, the body 10 has air gaps 40K extending along the rows of loops 32L of the coil 30 outside the wound section 32 of the coil 30 and within a distance of about five times the average diameter of the first soft magnetic particles 81 from the wound section 32. By virtue of this, magnetic saturation is controlled even if the magnetic particles are ones that deliver good characteristics under applied DC current.

The control of magnetic saturation provided by the air gaps 40K is highly effective. This is because their length, or the dimension along the rows of loops 32L, is roughly equal to or larger than the width of a single loop 32L and roughly equal to or smaller than the coil width CW of the wound section 32, and because their width, or the dimension in the radial direction with respect to the loops 32L, is roughly equal to or larger than the average diameter of the second soft magnetic particles 82 and about 10 μm or less.

The air gaps 40K, furthermore, are easy to create. The air gaps 40K are created by utilizing the springing back that occurs when the materials for the core 40 and the coil 30 are shaped into the body 10 by compression molding.

As long as the air gaps 40K can be created, the materials for the core 40 or their amounts may be changed, and the shape of the coil 30, for example, may be changed. The air gaps 40K, furthermore, do not need to be created during the shaping and curing of the body 10; they may be created whenever possible.

D. Grinding

The following describes the grinding of the body 10 of an inductor 1 having a core 40 shaped from the powder mix of soft magnetic particles and resins described in A. Powder Mix.

As stated, the body 10 of the inductor 1 is an article shaped from the powder mix by compression molding with an embedded coil 30 therein. The body 10 includes the coil 30 and a core 40.

As stated with reference to FIG. 5, the body 10 shaped by compression molding is subjected to the grinding of its second side surfaces 18 (FIG. 1) with an abrasive to a predetermined width W. This will trim the body 10 to a predetermined size, increasing the occupancy of the body 10 by the coil 30. This approach of trimming the body 10 to a predetermined size by grinding is advantageous over controlling the size of the body 10 by adjusting the dimensions of the cavity in the mold in terms of size variations between bodies 10. Barrel polishing, for example, may follow to round the corners of the second side surfaces 18 produced by the grinding.

Grinder

Figure 26:
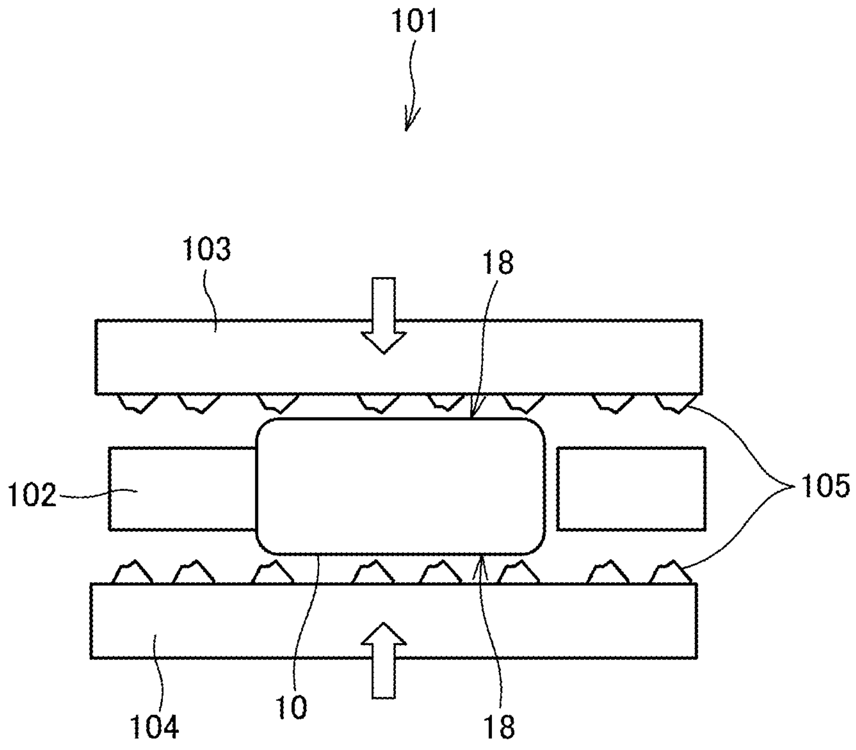
FIG. 26 is a diagram schematically illustrating an example of a grinder used in the grinding of a body.

FIG. 26 is a diagram schematically illustrating an example of a grinder 101 used in the grinding.

The grinder 101 includes a receptacle 102 for keeping the body 10 to be ground (workpiece) in and upper and lower grindstones 103 and 104 for sandwiching the body 10 kept in the receptacle 102 between. The body 10 is put into the receptacle 102 with its second side surfaces 18, or the surfaces to be ground, up and down.

During the grinding, the grinder 101 presses its upper and lower grindstones 103 and 104 against the upper and lower second side surfaces 18, respectively, with a predetermined load and moves the upper and lower grindstones 103 and 104 relative to the upper and lower second side surfaces 18 at the same time. An abrasive 105 on the upper and lower grindstones 103 and 104 grinds the upper and lower second side surfaces 18 simultaneously (double-side grinding).

Grit Size

The inventors have experimentally confirmed that the size of the abrasive 105 is proportional to the rate of grinding. As the abrasive 105 becomes larger, furthermore, the grinding eliminates more particles of the soft magnetic powder from the surfaces, and the ground surfaces will have greater roughness.

To be more exact, grinding an article shaped from soft magnetic powder will cause a considerable number of particles of the powder to be eliminated by the abrasive 105, which will leave hollows in the ground surfaces. If the soft magnetic powder contains larger and smaller particles, the grinding eliminates more of the larger particles than the smaller ones. As the size of the abrasive 105 increases, the grinding eliminates a greater number of larger particles, creating a greater number of relatively large hollows in the ground surfaces. As a result, the ground surfaces will have greater roughness.

As for surface roughness, the inventors have experimentally confirmed that there is no correlation between surface roughness and load.

In the examples described herein, surface roughness evaluations were based on arithmetic mean height. Specifically, multiple (e.g., three to four) measurement areas of a predetermined size (about 200 μm×about 290 μm) were defined on the surface of interest, the maximum height in each area was measured using a laser microscope, and the average was reported as the arithmetic mean height. The laser microscope was Keyence Corporation's VK-X250.

Grinding Speed

The inventors have experimentally confirmed that as the grinding speed (velocity of the movement of the upper and lower grindstones 103 and 104) increases, the grinding smoothens the exposed particles of the soft magnetic powder more effectively, and the ground surfaces will have smaller roughness. The grinding speed, furthermore, is proportional to the rate of grinding.

Rate of Grinding

A target rate of grinding is set, and the size of the abrasive 105 and the grinding speed are selected to achieve this target. As stated, the size of the abrasive 105 and the grinding speed are each related to the roughness of the ground surfaces. In the examples described herein, the size of the abrasive 105 and the grinding speed were selected to ensure that the grinding would increase the roughness of the second side surfaces 18 and make these sides rougher than the top surface 14 and the mount surface 12, which were not to be ground.

The increased surface roughness S a brought by the grinding will strengthen the adhesion of the protective film 50 on the second side surfaces 18 of the body 10. The body 10, except where it has the outer electrodes 20 on, is covered with a protective film 50 that protects the body 10 from moisture and corrosion and provides good electrical insulation.

Duration of Grinding

The duration of grinding is defined as the length of time from the start of grinding Ts to the end of grinding Te and is determined based on the difference between the initial and target widths W of the body 10 and the rate of grinding.

During the grinding, a controller (not illustrated) controls the operation of the grinder 101 based on a load profile and the determined duration of grinding, ensuring that the body 10 shaped by compression molding will be ground to a predetermined width W.

Side Gaps

Figure 27:
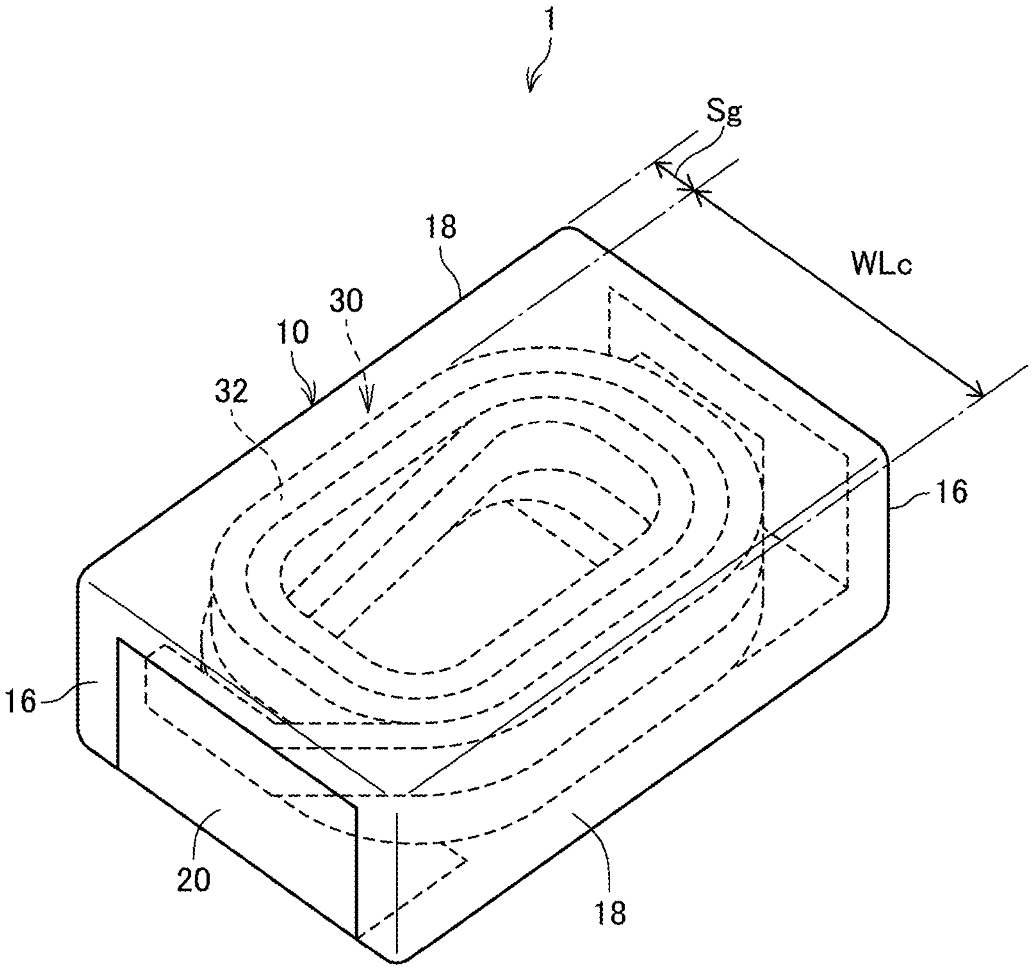
FIG. 27 is a diagram for the description of side gaps.

As illustrated in FIG. 27, a side gap Sg of the inductor 1 is defined as the thickness of the body 10 between the coil 30 therein and the closer second side surface 18. If the body 10 is covered with a protective film 50, the side gap Sg excludes the thickness of the protective film 50.

In the examples described herein, the side gaps Sg of the body 10 ground to a predetermined width W were wider than the equivalent of one larger particle of the soft magnetic powder and narrower than the equivalent of four larger particles of the soft magnetic powder. In other words, in the examples described herein, the target width of the body 10 in the grinding and/or the width WLc of the wound section 32 of the coil 30 (FIG. 27) were adjusted beforehand to ensure that the side gaps Sg of the body 10 ground to a predetermined width W would be such.

Setting the side gaps Sg of the ground body 10 wider than the equivalent of about one larger particle of the soft magnetic powder will prevent the coil 30 from being exposed. Even if the grinding eliminates particles from the second side surfaces 18, at least one large particle will remain between the second side surfaces 18 and the coil 30.

Limiting the side gaps Sg of the ground body 10 to narrower than the equivalent of about four larger particles of the soft magnetic powder will prevent loss of inductance. With such side gaps Sg, the body 10 is not too large, and, therefore, its occupancy by the coil 30 remains sufficiently high.

Tables 16 and 17 present measured inductance and moisture resistance of inductors 1 with different combinations of the maximum and minimum side gaps Sg.

The data in Table 16 are from inductors 1 made with a soft magnetic powder in which the average diameters of the larger and smaller particles were 21 μm and 2 μm, respectively. The data in Table 17 are from inductors 1 made with a soft magnetic powder in which the average diameters of the larger and smaller particles were 28 μm and 2 μm, respectively.

The soft magnetic powders were made with particles of chromium-free Fe—Si amorphous alloy and crystalline pure iron. The particles of chromium-free Fe—Si amorphous alloy were the larger particles, whereas the particles of pure iron were the smaller. The surface of the larger particles was covered with a SiO—$Fe_2SiO_4$ bilayer oxide film, and that of the smaller particles was covered with an Fe oxide film. By virtue of the oxide films, each individual particle was electrically insulated.

Powder mix of this soft magnetic powder and epoxy resins was shaped by compression molding to give bodies 10 for the inductors 1.

Actually, the larger particles were sample A1-04, a sample of first soft magnetic particles described above, and the smaller particles were any of samples A2-02 to -08, samples of second soft magnetic particles described above. The bodies 10, therefore, had resins, Fe or Fe oxide(s), phosphate glass, $SiO_2$, and an alkyl group having a C16 chain on their surface.

The inductance was measured using an LCR meter, and the moisture resistance was examined by exposing the inductors 1 to an environment at a temperature of 85° C. and a humidity of 85%. For moisture resistance, “Fail” means the inductor 1 failed to meet predetermined quality criteria.

TABLE 16

| Side gaps | | Inductance | Moisture |
|---|---|---|---|
| Minimum | Maximum | (μH) | resistance |
| 0 | 110 | 0.412 | Fail |
| 10 | 100 | 0.417 | Fail |
| 18 | 92 | 0.420 | Fail |
| 25 | 85 | 0.423 | Pass |
| 29 | 81 | 0.424 | Pass |
| 33 | 77 | 0.425 | Pass |
| 40 | 70 | 0.427 | Pass |
| 45 | 65 | 0.428 | Pass |
| 50 | 60 | 0.429 | Pass |
| 55 | 55 | 0.429 | Pass |

TABLE 17

| Side gaps | | Inductance | Moisture |
|---|---|---|---|
| Minimum | Maximum | (μH) | resistance |
| 0 | 110 | 0.424 | Fail |
| 10 | 100 | 0.430 | Fail |
| 18 | 92 | 0.433 | Fail |
| 25 | 85 | 0.436 | Fail |
| 29 | 81 | 0.437 | Pass |
| 33 | 77 | 0.439 | Pass |
| 40 | 70 | 0.440 | Pass |
| 45 | 65 | 0.441 | Pass |
| 50 | 60 | 0.442 | Pass |
| 55 | 55 | 0.442 | Pass |

As shown in Tables 16 and 17, the body 10 is sufficiently resistant to moisture when its minimum side gap Sg is wider than the equivalent of about one larger particle. The inductance, furthermore, decreases with increasing maximum side gap Sg.

The data also indicate that the inductor 1 performs well in both moisture resistance and inductance when both side gaps Sg are roughly equal (about 1:1) and wider than the equivalent of about one larger particle and narrower than the equivalent of about four larger particles.

Overall, an inductor 1 according to an embodiment of the present disclosure is composed of a substantially plate-shaped body 10 with an embedded coil 30 therein and a pair of outer electrodes 20 on the body 10. The body 10 has been shaped from powder mix of soft magnetic powder containing two sets of particles with different average diameters, namely larger and smaller particles, and resins. The body 10 has second side surfaces 18 in the radial direction with respect to the coil 30, and the side gaps Sg of the body 10, which are the thickness dimensions between the second side surfaces 18 and the coil 30, are wider than the equivalent of about one larger particle and narrower than the equivalent of about four larger particles.

By virtue of the side gaps Sg of the body 10 set wider than the equivalent of about one larger particle of the soft magnetic powder, the coil 30 is prevented from being exposed because there is at least one large particle between the second side surfaces 18 and the coil 30.

By virtue of the side gaps Sg of the body 10 limited to narrower than the equivalent of about four larger particles of the soft magnetic powder, loss of inductance is prevented because with such side gaps Sg, the body 10 is not too large, and, therefore, its occupancy by the coil 30 remains sufficiently high. Although small in size, the resulting inductor 1 is practical in terms of DC resistance and saturation flux density.

In this embodiment, the second side surfaces 18 of the body 10 of the inductor 1 are covered with a protective film 50 and are rougher than at least one of the other sides (the mount surface 12 and the top surface 14).

By virtue of this, the second side surfaces 18 and the protective film 50 adhere firmly to each other.

In this embodiment, the surface of the body 10 of the inductor 1 is covered with a protective film 50 except where it has the outer electrodes 20 on.

The protective film 50 protects the body 10 from moisture and corrosion and provides good electrical insulation, making the inductor 1 a quality one.

E. Protective Film

The following describes the protective film 50 formed on the surface of the body 10 of an inductor 1 having a core 40 shaped from the powder mix of soft magnetic particles and resins described in A. Powder Mix.

As stated, the body 10 of the inductor 1 is an article shaped from the powder mix by compression molding with an embedded coil 30 therein. The body 10 includes the coil 30 and a core 40.

The protective film 50 covers the entire surface of the body 10 excluding where it has the outer electrodes 20 on. The protective film 50 provides electrical insulation and protects the body 10 from moisture and corrosion. Even if the grinding eliminates larger particles of the soft magnetic powder from the ground surfaces (second side surfaces 18), covering the ground surfaces with the protective film 50 will compensate for the associated loss of electrical insulation and resistance to moisture and corrosion.

Formation of the Protective Film and the Device for it

As described with reference to FIG. 5, the protective film 50 is formed by applying a material containing a thermosetting resin to the entire surface of the body 10, for example by spraying or dipping.

Figure 28:
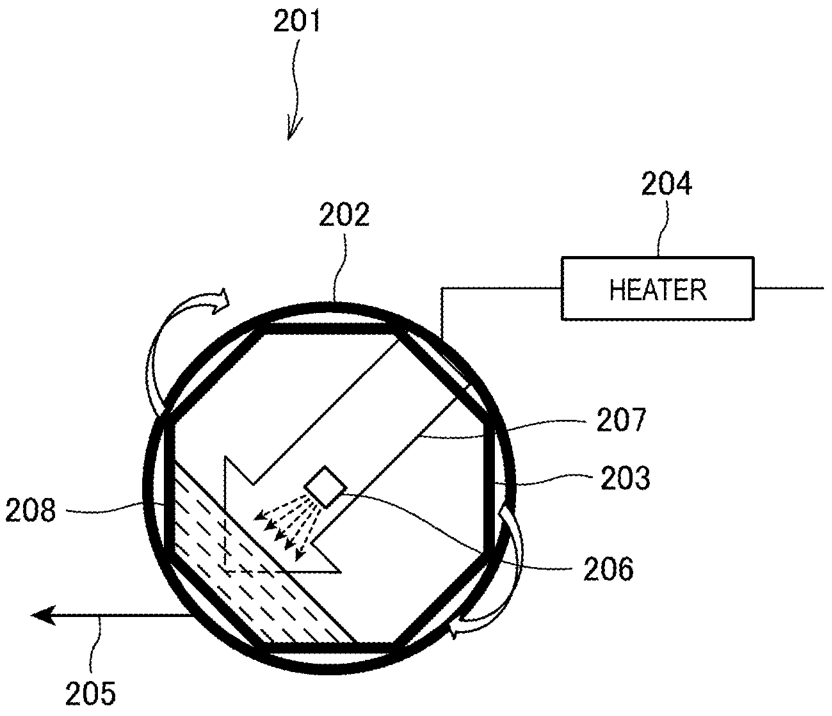
FIG. 28 is a diagram schematically illustrating an example of a film forming device used in the formation of a protective film.

FIG. 28 is a diagram schematically illustrating an example of a film forming device 201 used in the film formation (Step 500 in FIG. 5).

The film forming device 201 forms the protective film 50 on the surface of many bodies 10 (workpieces 208) by spraying the material thereonto. As illustrated in the drawing, the film forming device 201 includes an enclosure 202, a rotary drum 203 therein for putting the bodies 10 (workpieces 208) in, a heater 204 for heating the drum 203, a duct 205 as an exhaust for the drum 203, and a spray nozzle 206 inside the drum 203.

To carry out the film formation, the film forming device 201 first preheats the drum 203 with the bodies 10 therein. Using the heater 204, the drum 203 is heated to a temperature at which the material for the protective film 50 does not cure (e.g., about 30° C. to about 70° C.).

Then the film forming device 201 forms the protective film 50 on the surface of the bodies 10 by spraying the material for the protective film 50 onto the bodies 10 through the spray nozzle 206 and at the same time blowing hot air 207 onto the bodies 10 through an air nozzle (not illustrated) while rolling (barreling) the drum 203 to tumble the bodies 10. The tumbling of the bodies 10 and the blowing of hot air 207 onto the bodies 10 are continued until the protective film 50 on the bodies 10 dries to an appropriate degree. After the drying of the protective film 50, the bodies 10 are removed from the drum 203.

Insufficient drying will cause the protective film 50 to have pores (small holes) and/or swellings and will also affect the adhesion of the protective film 50 to the bodies 10. Excessive drying will make the protective film 50 a "discontinuous" film and will also affect the adhesion of the protective film 50 to the bodies 10. Preferably, the protective film 50 is dried to such a degree that it will be a "continuous" film and adhere to the bodies 10 well.

Material for the Protective Film

The material for the protective film 50 is a liquid mixture of a resin component as the base, a solvent component as a diluent for the resin component, and a filler component as an additive.

Resin Component

An example of a suitable resin component is an epoxy resin as the primary ingredient with added phenoxy and/or novolac resins. Adding a phenoxy resin will toughen the protective film 50. Adding a novolac resin will make the protective film 50 more resistant to heat.

Preferably, a resin in the resin component contains a pigment.

During the film removal (Step 600) and electrode formation (Step 700), described with reference to FIG. 5, a pigmented resin improves the workability of the bodies 10 when their surface is irradiated with a laser for the removal of the protective film 50 and when the outer electrodes 20 are formed. An example of a suitable pigment is carbon black.

Solvent Component

The solvent component includes solvent(s) that can be sprayed in mist form together with the resin component and then dries to an appropriate degree. An example of a suitable solvent component is one that contains methyl ethyl ketone (MEK), which is used as a diluent for resin paste.

Filler Component

The filler component includes filler(s) that reduces the gloss of the protective film 50, improves the quality of the protective film 50, and disperses in the solvent(s).

Reducing the gloss of the protective film 50 helps prevent errors caused by washed-out color when the inductors 1 are visually inspected with a camera. An example of a suitable filler is powdered silica ($SiO_2$).

As for the particle size, the smaller, the better. Small filler particles help prevent the spray nozzle 206, through which the material for the protective film 50 is sprayed, from clogging and reduce the damage to the surface of the bodies 10 from the barreling of the drum 203. If the filler is powdered silica, it is preferred to use nanosilica.

Nanosilica

The inventors have experimentally found that when the filler is nanosilica, there is a correlation between the rate of drying and the nanosilica content.

Figure 29:
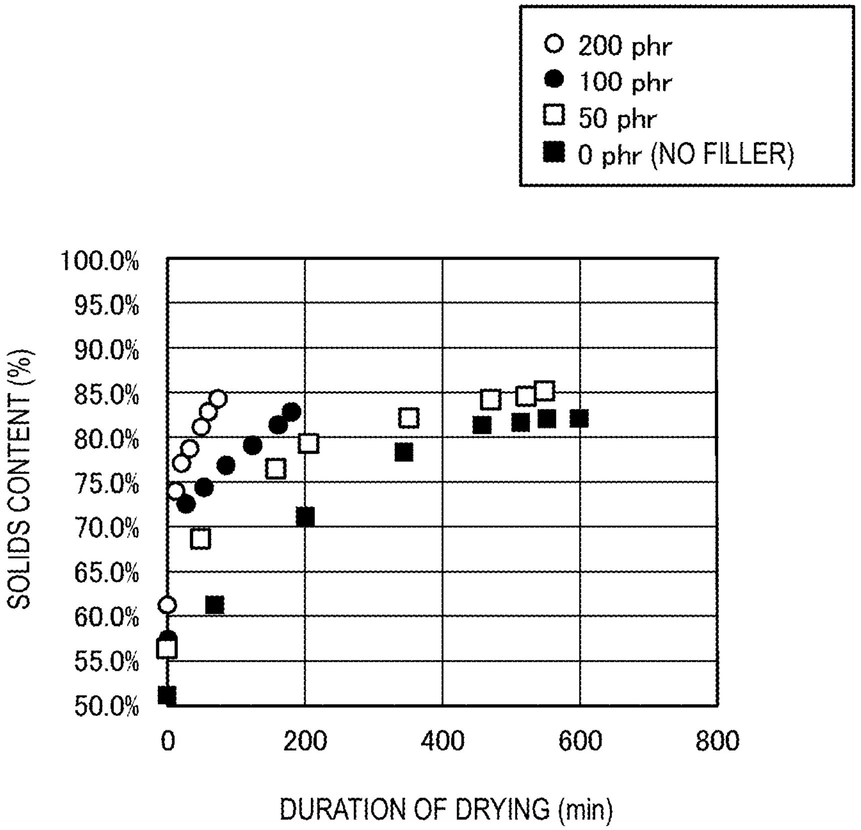
FIG. 29 is a graphical representation of experimentally determined relationships between nanosilica content and the rate of drying.

FIG. 29 is a graphical representation of relationships between the nanosilica content and the rate of drying determined through an experiment.

In this experiment, sample materials for the protective film 50 were prepared with an epoxy resin as the resin component, MEK as the solvent component, and nanosilica as the filler component. Inductors 1 were constructed by forming a protective film 50 on bodies 10 using these samples and forming outer electrodes 20 on the bodies 10. During the drying of the protective film 50, the relationship between the duration of drying, i.e., the length of time for which the bodies 10 were left, and the solids content of the protective film 50 was investigated.

Four sample materials for the protective film 50 were prepared with different amounts of nanosilica: 0 (containing no nanosilica), 50 phr, 100 phr, and 200 phr. In all samples, the average diameter of particles of the nanosilica was 45 nm.

The average diameter of the silica particles was measured as follows. The body 10 was cut in parallel with its second side surfaces 18 at the intersection of the diagonals of the top surface 14 of the inductor 1. On the upper and lower primary sides of the body 10, the cross-section of the protective film 50 was imaged with a transmission electron microscope (TEM) at each quarter of the length L of the body 10 at a magnification of ×300,000. The average diameter was determined by observing silica particles in the TEM images. The TEM was a field-emission transmission electron microscope (FE-TEM), more specifically JEOL Ltd.'s multipurpose electron microscope (JEM-F200) combined with an energy-dispersive x-ray microanalysis (EDX) system (Thermo Fischer Scientific Inc. NORAN System 7).

As can be seen from FIG. 29, the solids content increases with increasing nanosilica content, and even short drying results in a high solids content when the nanosilica content is high. Increasing the nanosilica content of the material for the protective film 50, therefore, will accelerate the drying, and therefore helps shorten the duration of drying, of the protective film 50.

In addition, observations in this experiment revealed that the "sticking," described below, of the protective film 50 occurs when the solids content upon drying is about 80% or less. When the solids content upon drying is about 90%, the protective film 50 is of good quality but has cracks in its surface.

It is therefore preferred that the protective film 50 be dried to a solids content of about 80% to about 90%.

Film Sticking

When the bodies are sprayed in the drum 203, the protective film 50 may stick between bodies 10. This can affect the quality of the protective film 50 and herein is referred to as "film sticking." The inventors have experimentally found that when the filler is nanosilica, the film sticking can be reduced by changing the diameter of particles of the nanosilica.

Figure 30:
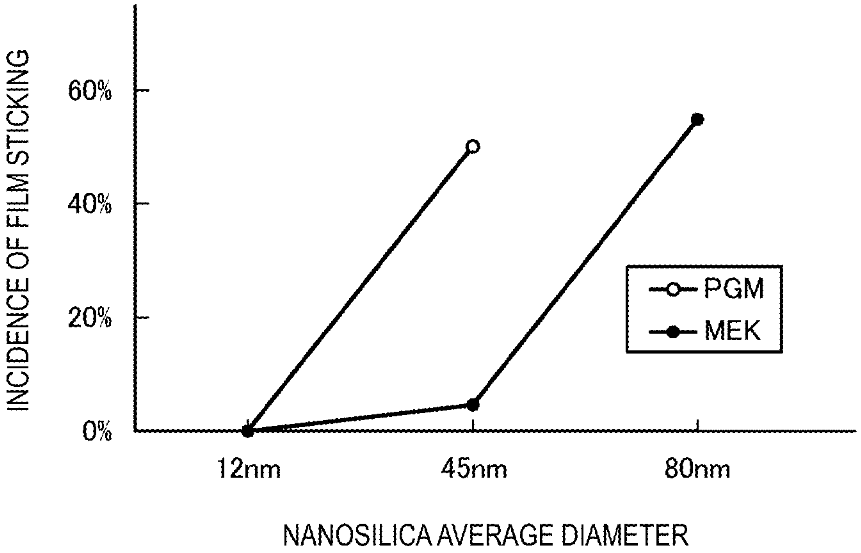
FIG. 30 is a graphical representation of experimentally determined relationships between the average diameter of nanosilica particles and the incidence of "film sticking"

FIG. 30 is a graphical representation of relationships between the average diameter of particles of nanosilica and the incidence of film sticking determined through an experiment.

In this experiment, two sample materials for the protective film 50, samples 1 and 2, were prepared.

Sample 1 was made with an epoxy resin as the resin component, PGM as the solvent component, and nanosilica as the filler component. Sample 2 was made with an epoxy resin as the resin component, MEK as the solvent component, and nanosilica as the filler component. The nanosilica content of both samples 1 and 2 was 200 phr.

A protective film 50 was formed on bodies 10 using samples 1 and 2 as described above, and then the bodies 10 were removed from the drum 203. The incidence of film sticking was determined from the number of sticking bodies 10.

As can be seen from FIG. 30, the incidence of film sticking decreases with decreasing average diameter of the silica particles.

When sample 1, made with PGM as the solvent component, and sample 2, made with MEK as the solvent component, were compared, the incidence of film sticking was lower with sample 2 for a given average diameter of silica particles.

For sample 2, furthermore, the incidence of film sticking was markedly low when the average diameter of the silica particles was 45 nm or less.

For both samples 1 and 2, the incidence of film sticking was reduced to near zero as the average diameter of the silica particles decreased to about 12 nm.

Figure 31:
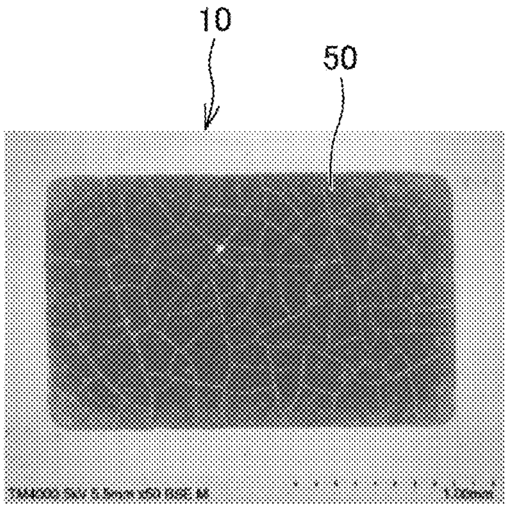
FIG. 31 is an image of cracks in a protective film.

When the average diameter of the silica particles was 12 nm, however, the protective film 50 cracked as in FIG. 31 with both samples 1 and 2, although the cracking was successfully reduced by increasing the average diameter of the silica particles to 15 nm. It is, therefore, preferred that the average diameter of the silica particles be more than about 12 nm, more preferably about 15 nm or more as this makes it more certain that the protective film 50 will not crack.

In the experiment, furthermore, the filler settled down in the material for the protective film 50 when the average diameter of silica particles exceeded 75 nm, and did not when the average diameter of silica particles was 75 nm. A protective film 50 formed from a material in which filler has settled down would be nonuniform, even though it might not stick. It is, therefore, preferred that the average diameter of the silica particles be about 75 nm or less.

In addition, if the material for the protective film 50 contains silica particles (powdered silica) with an average diameter of about 15 nm to about 75 nm and if the amount of the silica particles is such that the material dries sufficiently fast (between about 150 phr and about 250 phr), the percentage by weight of silica particles to resin in the resulting protective film 50 is between about 150% and about 250%.

In other words, a protective film 50 formed with such a silica-to-resin weight percentage dries quickly and does not stick; the protective film 50 in this case is of high quality.

Plating Marks

Figure 32:
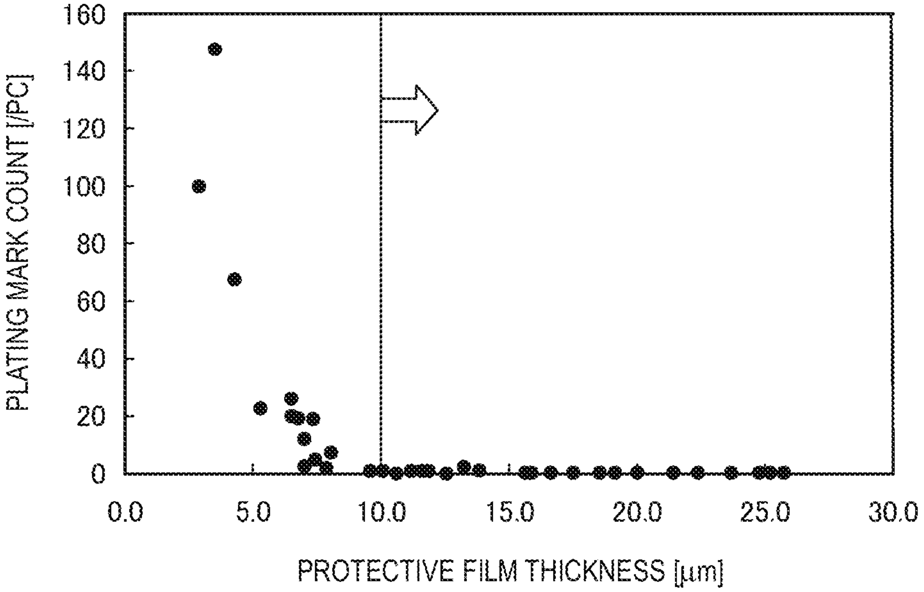
FIG. 32 is a graphical representation of a "plating mark" count with varying thickness of a protective film.

FIG. 32 is a graphical representation of the number of plating marks with varying thickness of the protective film 50.

The protective film 50 can leave areas of the body 10 exposed, and these areas may be unwantedly plated during the electrode formation. Deposits of this unwanted plating are herein referred to as "plating marks." An example of a cause of plating marks is the elimination of larger particles of the soft magnetic powder associated with grinding. The material for the protective film 50 can fail to fill the relatively large hollows left in the surface of the body 10, and in the unfilled hollows plating marks can occur.

In this measurement, the body 10 was examined for plating marks at predetermined intervals along the full length of the ridges between the top surface 14 and mount surface 12 and the first and second side surfaces 16 and 18, and the plating marks were counted.

As can be seen from the graph, many plating marks were observed when the protective film 50 was thin. When the thickness of the protective film 50 was 5 μm or more, however, the number of plating marks decreased markedly. When the thickness of the protective film 50 was 10 μm or more, few plating marks were observed.

It is, therefore, preferred that the thickness of the protective film 50 be about 10 μm or more. With such a thickness, the protective film 50 certainly protects the entire surface of the body 10 and prevents plating marks.

If the body 10 of the inductor 1 has a specified size, however, thickening of the protective film 50 will affect the performance of the inductor 1 because it means reducing the size of the body 10 excluding the protective film 50 and therefore the size of the coil 30 accordingly.

The protective film 50, furthermore, is then removed, and outer electrodes 20 are formed as described above in the areas of the inductor 1 from which the protective film 50 has been removed. If the protective film 50 is thicker than the outer electrodes 20, the contact between the outer electrodes 20 and the circuit board will be poor because the surface of the outer electrodes 20 is lower than that of the protective film 50.

It is, therefore, preferred that the thickness of the protective film 50 be smaller than, or at least roughly equal to, that of the outer electrodes 20.

More preferably, to give the inductor 1 high performance, the thickness of the protective film 50 is about 30 μm or less besides being smaller than or roughly equal to that of the outer electrodes 20.

The thickness of the outer electrodes 20 was measured as follows. That is, the body 10 was cut in parallel with its second side surfaces 18 at the intersection of the diagonals of the top surface 14 of the inductor 1. The thickness of the outer electrodes 20 on the mount surface 12 of the body 10 was measured at each quarter of the length L of the electrodes 20 using a microscope at a magnification of ×1000 and averaged (first measurement). The average first measurement of ten inductors 1 was reported as the thickness of the outer electrodes 20. The microscope was Keyence Corporation's VHX-7000.

Countermeasures Against the Elimination of Particles

As stated, since the body 10 is an article shaped from soft magnetic powder, grinding its surface involves eliminating a considerable number of particles of the powder. In the embodiments and examples described herein, the soft magnetic powder contains larger particles, which have a larger average diameter, and smaller particles, which have a smaller average diameter. The grinding, therefore, leaves relatively deep hollows in the ground surfaces (second side surfaces 18) as a result of the elimination of larger particles.

Table 18 presents data from an experiment on the thickness of the protective film 50, the depth of hollows resulting from the elimination of particles, and corrosion resistance.

This experiment was performed using the same sample materials for the protective film 50 as in the experiment in FIG. 30. The bodies 10 were shaped from soft magnetic powders in which the average diameter of the larger particles was between 21 μm and 28 μm.

The thickness of the protective film 50 was measured as follows. That is, the body 10 was cut in parallel with its second side surfaces 18 at the intersection of the diagonals of the top surface 14 of the inductor 1. The thickness of the protective film 50 on the upper and lower primary sides of the body 10 was measured at each quarter of the length L of the body 10 using a microscope at a magnification of ×1000 and averaged (second measurement). The average second measurement of ten inductors 1 was reported as measured thickness (average thickness). The microscope was Keyence Corporation's VHX-7000.

For corrosion resistance, “Fail” means the inductors 1 failed to meet predetermined quality criteria for corrosion resistance, and “Pass” means the inductors 1 met the quality criteria.

TABLE 18

| Average thickness [μm] | Depths of hollows [μm] | Average thickness/depth of hollows | Corrosion resistance |
|---|---|---|---|
| 4 | 39 | 0.10 | Fail |
| 11 | 38 | 0.29 | Fail |
| 16 | 40 | 0.40 | Pass |
| 21 | 42 | 0.50 | Pass |
| 27 | 41 | 0.66 | Pass |
| 31 | 43 | 0.72 | Pass |
| 36 | 38 | 0.95 | Pass |

As can be seen from Table 18, the protective film 50 is prone to corrosion, and therefore is not of high quality enough, when it is thin for the depth of hollows resulting from the elimination of particles. The corrosion resistance is sufficiently high when the ratio of the thickness of the protective film 50 to the depth of the hollows is about 0.4 or more. Since the depth of the hollows is roughly equal to the average diameter of the larger particles, the protective film 50 is of high quality enough when its thickness is equal to or more than about 0.4 times the average diameter of the larger particles, even if particles have been eliminated from the surfaces therebeneath.

Overall, an inductor 1 according to an embodiment of the present disclosure has a body 10 containing soft magnetic powder and resins, a coil 30 embedded in the body 10, and outer electrodes 20 on the body 10 and also has a protective film 50 on the surface of the body 10. The protective film 50 has a thickness of about 10 μm or more and contains silica particles and resin. The silica particles have an average diameter between about 15 nm and about 75 nm, and the percentage by weight of the silica particles to the resin is between about 150% and about 250%.

The protective film 50 certainly protects the entire surface of the body 10 and prevents “plating marks” by virtue of having a thickness of about 10 μm or more.

The protective film 50 also helps prevent errors that can occur when the inductor 1 is visually inspected by optical testing as its gloss has been reduced by the silica particles therein.

The protective film 50, moreover, is of high quality without being damaged by “sticking.” This is because the average diameter of the silica particles therein is between about 15 nm and about 75 nm and because the percentage by weight of the silica particles to the resin being between about 150% and about 250%.

In this embodiment, the thickness of the protective film 50 is smaller than or roughly equal to that of the outer electrodes 20.

This ensures the outer electrodes 20 will not be interfered with by the thickness of the protective film 50 when coming into contact with a circuit on a circuit board.

In this embodiment, the protective film 50 contains carbon black.

This improves the workability of the body 10 when the protective film 50 is removed by irradiation with a laser for the formation of the outer electrodes 20.

In this embodiment, the protective film 50 contains a phenoxy resin. This toughens the body 10.

In this embodiment, the protective film 50 contains a novolac resin. This makes the body 10 more resistant to heat.

In this embodiment, the thickness of the protective film 50 is equal to or more than about 0.4 times the average diameter of the larger particles. This ensures the protective film 50 is of high quality enough, even if particles have been eliminated from the surfaces therebeneath.

In this embodiment, the filler component may be titanium oxide, zirconium oxide, or aluminum oxide.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A soft magnetic powder comprising:

first soft magnetic particles, each having a first nucleus that contains a soft magnetic metal and an insulating film on a surface of the first nucleus, wherein:

the insulating film contains Si and a hydrocarbon group having a C8 or longer linear-chain moiety; and a ratio by weight of Si to C in the insulating film is from 7.6 to 42.8.

2. The soft magnetic powder according to claim 1, wherein the hydrocarbon group is an alkyl group.

3. The soft magnetic powder according to claim 2, wherein the first nucleus is made of carbonyl iron.

4. The soft magnetic powder according to claim 3, further comprising:

second soft magnetic particles, each having a second nucleus that contains a soft magnetic metal, the second nucleus having an average diameter larger than the first nucleus.

5. An inductor comprising:

a magnetic metal material made from the soft magnetic powder according to claim 3; and a coil of wire.

6. An inductor comprising:

a magnetic metal material made from the soft magnetic powder according to claim 4; and a coil of wire.

7. The soft magnetic powder according to claim 2, further comprising:

second soft magnetic particles, each having a second nucleus that contains a soft magnetic metal, the second nucleus having an average diameter larger than the first nucleus.

8. An inductor comprising:

a magnetic metal material made from the soft magnetic powder according to claim 7; and a coil of wire.

9. An inductor comprising:

a magnetic metal material made from the soft magnetic powder according to claim 2; and a coil of wire.

10. The soft magnetic powder according to claim 1, wherein the first nucleus is made of carbonyl iron.

11. The soft magnetic powder according to claim 10, further comprising:

second soft magnetic particles, each having a second nucleus that contains a soft magnetic metal, the second nucleus having an average diameter larger than the first nucleus.

12. An inductor comprising:

a magnetic metal material made from the soft magnetic powder according to claim 11; and a coil of wire.

13. An inductor comprising:

a magnetic metal material made from the soft magnetic powder according to claim 10; and a coil of wire.

14. The soft magnetic powder according to claim 1, further comprising:

second soft magnetic particles, each having a second nucleus that contains a soft magnetic metal, the second nucleus having an average diameter larger than the first nucleus.

15. An inductor comprising:

a magnetic metal material made from the soft magnetic powder according to claim 14; and a coil of wire.

16. An inductor comprising:

a magnetic metal material made from the soft magnetic powder according to claim 1; and a coil of wire.

* * * * *